US011013052B2

United States Patent
Dao et al.

(10) Patent No.: US 11,013,052 B2
(45) Date of Patent: May 18, 2021

(54) METHODS AND SYSTEMS FOR MULTICAST-BROADCAST SESSION RELEASE AND MODIFICATION

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD.

(*) Notice: Subject to any disclaimer, the term of this patent is extended or adjusted under 35 U.S.C. 154(b) by 107 days.

(21) Appl. No.: 16/246,272

(22) Filed: Jan. 11, 2019

(65) Prior Publication Data

US 2019/0223250 A1 Jul. 18, 2019

Related U.S. Application Data

(60) Provisional application No. 62/617,463, filed on Jan. 15, 2018.

(51) Int. Cl.
*H04W 76/20* (2018.01)
*H04W 76/40* (2018.01)
*H04W 76/34* (2018.01)
*H04W 36/00* (2009.01)
*H04W 72/04* (2009.01)
*H04W 76/22* (2018.01)
(Continued)

(52) U.S. Cl.
CPC ....... *H04W 76/20* (2018.02); *H04W 36/0007* (2018.08); *H04W 72/042* (2013.01); *H04W 76/22* (2018.02); *H04W 76/34* (2018.02); *H04W 76/40* (2018.02); *H04W 24/04* (2013.01); *H04W 68/00* (2013.01)

(58) Field of Classification Search
CPC . H04W 76/20; H04W 36/0007; H04W 76/22; H04W 76/34; H04W 76/40; H04W 68/00; H04W 24/04
See application file for complete search history.

(56) References Cited

U.S. PATENT DOCUMENTS

2016/0094358 A1* 3/2016 Won .................... H04L 12/1886
370/230
2017/0290014 A1 10/2017 Kim et al.
(Continued)

FOREIGN PATENT DOCUMENTS

| CN | 107040995 A | 8/2017 |
|---|---|---|
| WO | 2016140507 A1 | 9/2016 |

OTHER PUBLICATIONS

5G-Xcast_D4.3_v1.0 : Broadcast and Multicast Communication Enablers for the Fifth-Generation of Wireless Systems Deliverable D4.3 (Ref. Ares (2018)6153891-Nov. 30, 2018) (Date Nov. 14, 2018) (Year: 2018).*

(Continued)

*Primary Examiner* — Nicholas R Taylor
*Assistant Examiner* — Sanjoy Roy

(57) ABSTRACT

Methods and Systems for modifying or releasing a Multicast/Broadcast (MB) session for delivery of MB Data to a plurality of Electronic Devices (EDs) connected to a (Radio) Access Network (R)AN node is disclosed. The method includes receiving one or more triggers, and instructing the various network functions and (R)AN nodes to modify (or release) the MB session dependent on the received trigger.

31 Claims, 29 Drawing Sheets

(51) Int. Cl.
  *H04W 68/00* (2009.01)
  *H04W 24/04* (2009.01)

(56) References Cited

U.S. PATENT DOCUMENTS

2018/0263074 A1* 9/2018 Wang ................ H04W 36/0007
2018/0317201 A1* 11/2018 Cha .................. H04W 72/1242
2019/0021064 A1* 1/2019 Ryu ..................... H04W 76/27

OTHER PUBLICATIONS

3GPP TS 33.501 V0.5.0 (Dec. 2017), 3rd Generation Partnership Project; Technical Specification Group Services and System Aspects; Security Architecture and Procedures for 5G System(Release 15), 79 pages.
"System Architecture for the 5G System; Stage 2"; 3GPP TS 23.501 V2.0.1 (Dec. 2017).
"Procedures for the 5G System; Stage 2"; 3GPP TS 23.502 V2.0.0 (Dec. 2017).
U.S. Appl. No. 62/590,210, filed Nov. 22, 2017, titled Multicast and Broadcast Services.
Ericsson,"Description of SM information and PDU Session ID on N11 and N1",SA WG2 Meeting#122 S2-175036,26—Jun. 30, 2017, San Jose Del Cabo, Mexico,total 16 pages.
3GPP TS 38.413 V0.5.0 (Dec. 2017),3rd Generation Partnership Project;Technical Specification Group Radio Access Network;NG-RAN;NG Application Protocol (NGAP)(Release 15),total 90 pages.
3GPP TR 29.891 V15.0.0 (Dec. 2017);3rd Generation Partnership Project;Technical Specification Group Core Network and Terminals;5G System Phase 1;CT WG4 Aspects(Release 15);total 146 pages.

* cited by examiner

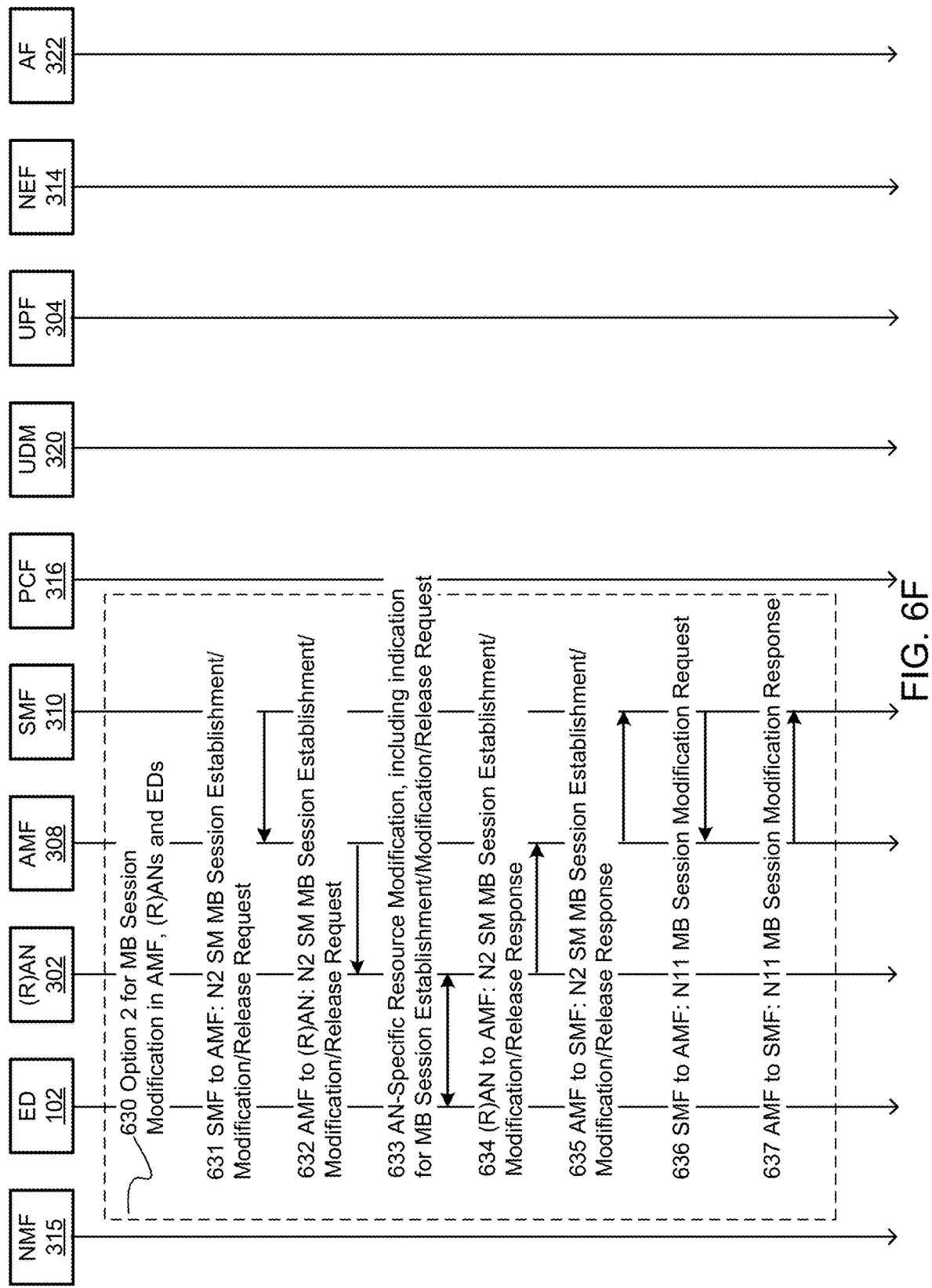

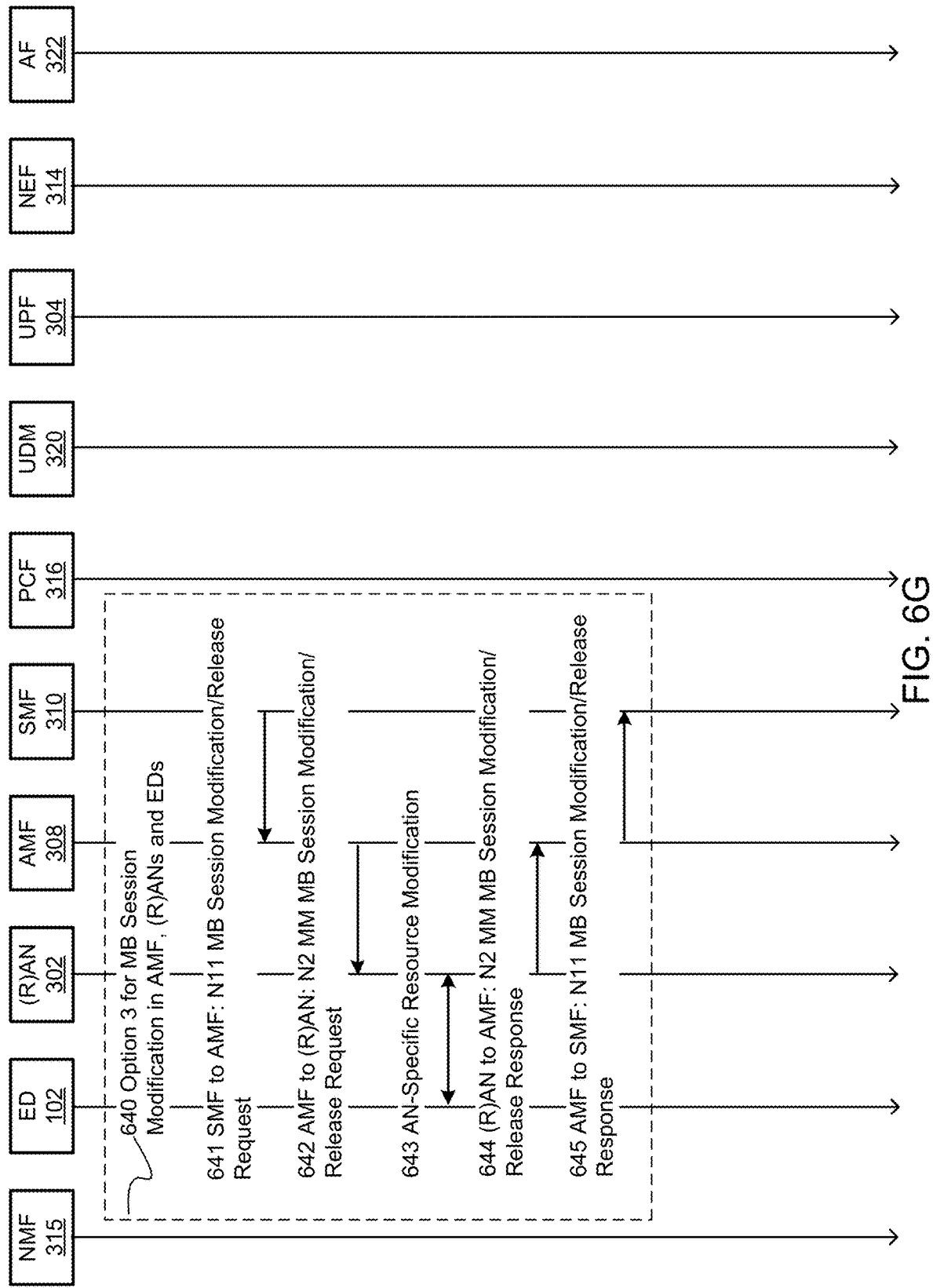

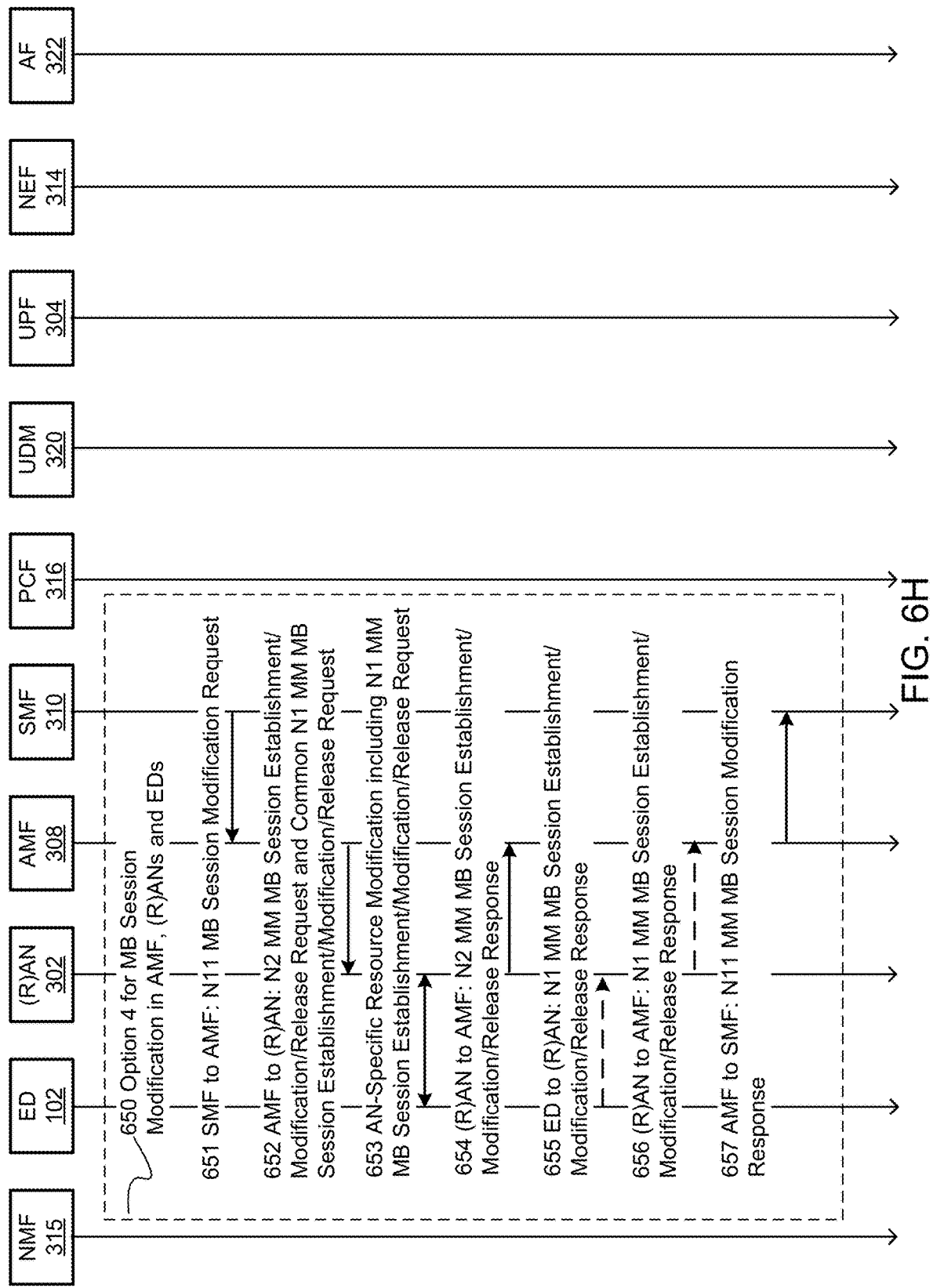

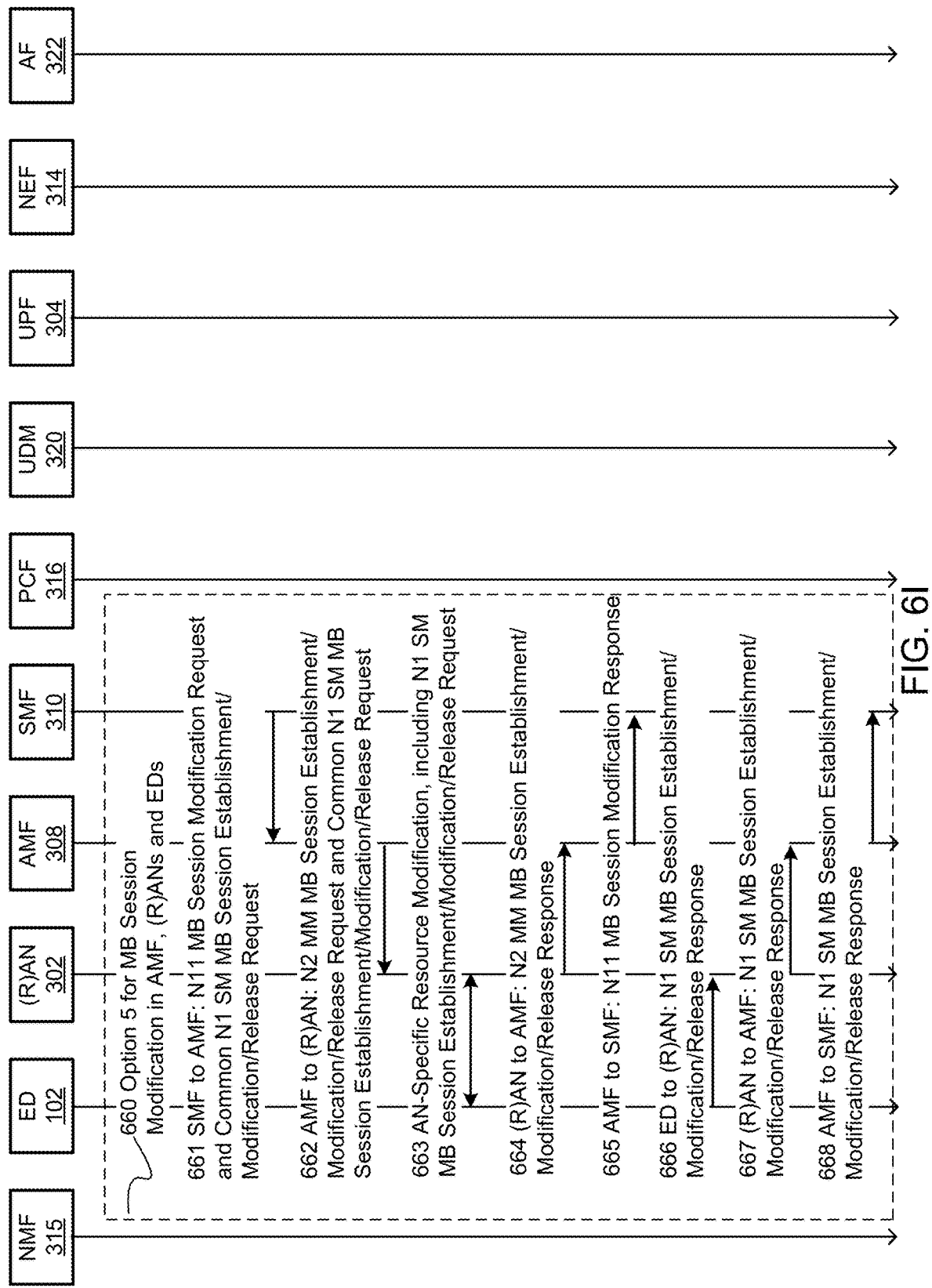

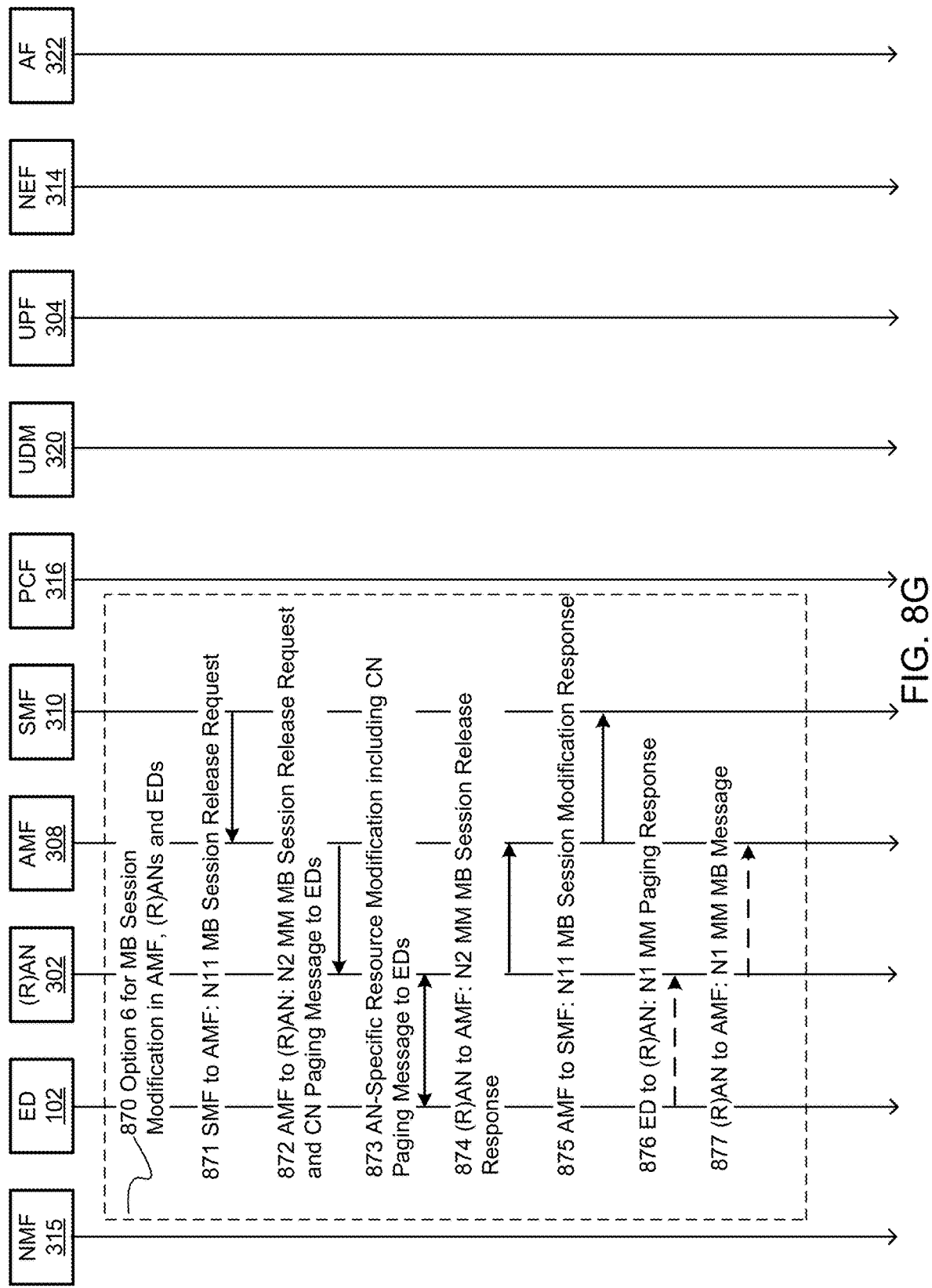

METHODS AND SYSTEMS FOR MULTICAST-BROADCAST SESSION RELEASE AND MODIFICATION

CROSS REFERENCE TO RELATED APPLICATIONS

The present application is based on, and claims benefit of, U.S. provisional Patent Application No. 62/617,463 with title METHODS AND SYSTEMS FOR MULTICAST-BROADCAST SESSION RELEASE AND MODIFICATION filed Jan. 15, 2018 the entire content of which is incorporated herein by reference.

FIELD OF THE INVENTION

The present invention generally pertains to the field of Communications Networks, and particular embodiments or aspects relate to multicast and broadcast services.

BACKGROUND

The Multicast and Broadcast Multimedia Subsystem (MBMS) has been developed for third generation (3G) and fourth generation (4G) mobile systems. The MBMS was initially designed for video broadcasting and streaming services, and has been extended for other services such as public safety, Vehicle to Vehicle or Infrastructure (V2X) communications, and Internet of Things (IoT) communications. However, many V2X and IoT devices do not support the MBMS function in 4G systems. These devices are typically very simple to reduce the cost and power consumption, but consequently lack sufficient capacity to use the MBMS. Therefore, it is desirable develop alternative solutions for fifth generation (5G) system to support multicast and broadcast transmission for V2X and IoT devices, and any other devices.

Further with the advent of V2X, IoT and other technologies, there can be large numbers of control plane messages transmitted to release or modify Multicast and/or Broadcast (MB) sessions, due to the large number of devices accessing the MB sessions. Accordingly, there is a need for methods and systems which reduce the control plane signaling used in releasing or modifying MB sessions.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Methods and Systems for modifying or releasing a Multicast/Broadcast (MB) session for delivery of MB Data to a plurality of Electronic Devices (EDs) connected to a (Radio) Access Network (R)AN node are disclosed. The method includes receiving one or more triggers, and instructing the various network functions and (R)AN nodes to modify (or release) the MB session dependent on the received trigger.

Accordingly, an aspect of the present invention provides a method of Modifying a Multicast/Broadcast (MB) session to a plurality of Electronic Devices (EDs) connected to a (Radio) Access Network (R)AN node. The method includes receiving, by a Session Management Function (SMF), a trigger for MB Session Modification. The method also includes, responsive to the trigger, configuring, by the SMF, any needed changes in the User Plane Functions (UPF) associated with the MB session. The method further includes responsive to the trigger, sending, by the SMF, instructions to an Access and Mobility Management Function (AMF) for any needed changes to the (R)AN nodes and EDs. The method further includes responsive to the trigger, sending, by the SMF, instructions to other network functions for changes resulting from the trigger. In some embodiments, the method further includes responsive to the trigger, sending, by the SMF, a request to a Policy Control Function (PCF) for policy and charging control (PCC) rules. In some embodiments, the method further includes responsive to the trigger, sending, by the SMF, a request to a Unified Data Management Function (UDM) for ED and/or MB Session information. In some embodiments, the method further includes responsive to the trigger, sending, by the SMF, MB Session data to any newly added (R)AN nodes.

Another aspect of the present invention provides a method of Modifying a Multicast/Broadcast (MB) session to a plurality of Electronic Devices (EDs) connected to a (Radio) Access Network (R)AN node. The method includes receiving, from a Session Management Function (SMF) by a Policy Control Function (PCF), a request for policy and charging control (PCC) rules relating to the MB session. The method further includes transmitting, by the PCF to the SMF, the PCC rules. In some embodiments the method further includes transmitting, by the PCF to the SMF, a MB session modification request. In some embodiments the method further includes receiving, from the SMF by the PCF a MB session modification notification.

Another aspect of the present invention provides a method of Modifying a Multicast/Broadcast (MB) session to a plurality of Electronic Devices (EDs) connected to a (Radio) Access Network (R)AN node. The method includes receiving, from a Session Management Function (SMF) by an Access and Mobility Management Function (AMF), a request to modify the MB session. The method further includes responsive to the request, instructing, by the AMF, (R)AN nodes to modify the MB session. The method further includes responsive to feedback from the (R)AN nodes, sending by the AMF to the SMF an MB Session Modification/Release response. In some embodiments, receiving, from a Session Management Function (SMF) by an Access and Mobility Management Function (AMF), a request to modify the MB session includes receiving a common request; and responsive to the request, instructing, by the AMF, (R)AN nodes to modify the MB session includes sending instructions to multiple (R)AN nodes. In some embodiments, receiving, from a Session Management Function (SMF) by an Access and Mobility Management Function (AMF), a request to modify the MB session includes receiving multiple request messages, each directed to a different (R)AN node; and responsive to the request, instructing, by the AMF, (R)AN nodes to modify the MB session includes sending an instruction to each of the (R)AN nodes.

Another aspect of the present invention provides an electronic device for use in a communication network, the electronic device including at least one processor; and a non-transitory computer readable storable medium including software instructions configured to control the at least one processor to perform steps of:

receiving, by a Session Management Function (SMF), a trigger for MB Session Modification;

responsive to the trigger, configuring, by the SMF, any needed changes in the User Plane Functions associated with the MB session;

responsive to the trigger, sending, by the SMF, instructions to an AMF for any needed changes to the (R)AN nodes and EDs; and responsive to the trigger, sending, by the SMF, instructions to other network functions for changes resulting from the trigger.

Another aspect of the present invention provides an electronic device for use in a communication network, the electronic device including: at least one processor; and a non-transitory computer readable storable medium including software instructions configured to control the at least one processor to implement any of the methods and network functions described herein.

BRIEF DESCRIPTION OF THE FIGURES

Further features and advantages of the present invention will become apparent from the following detailed description of embodiments, taken in combination with the appended drawings, in which:

FIGS. 6A-6L show message flows for the method of FIG. 5;

FIGS. 8A-8K show message flows for the method of FIG. 7.

DETAILED DESCRIPTION

In the following description, features of the present invention are described by way of example embodiments. For convenience of description, these embodiments make use of features and terminology known from communication system specifications, such as 4G and 5G networks, as defined by the Third Generation Partnership Project (3GPP). However, it shall be understood that the present invention is not limited to such networks.

In the following description, example embodiments describe techniques for selective applying cryptographic privacy protection to messages passing between an electronic device (ED) (such as a User Equipment, UE) and a Radio Access Network (RAN) node. These techniques may be used to incorporate both plaintext information and encrypted information within the same protocol data unit (PDU). Current procedures either fully encrypt the messages conveyed between the ED and the RAN or provide no privacy protection at all.

The term "PDU protection layer (PPL)" is used in this disclosure to refer to mechanisms for integrity protection and encryption similar to those provided by PDCP, however, other mechanisms may be used where appropriate. In addition, the nomenclature of 3GPP TS 33.401, "3GPP System Architecture Evolution (SAE); Security architecture", and 3GPP TS 33.501, "Security Architecture and Procedures for 5G System", is used to describe cryptographic keys and algorithms. However, an alternative nomenclature may be used where appropriate.

The term "plaintext" should be understood to refer to information (in any form) that is not encrypted.

The term "encryption" should be understood to refer to the application of cryptographic privacy protection techniques (in any suitable form) to one or more blocks of data.

Figure 1:
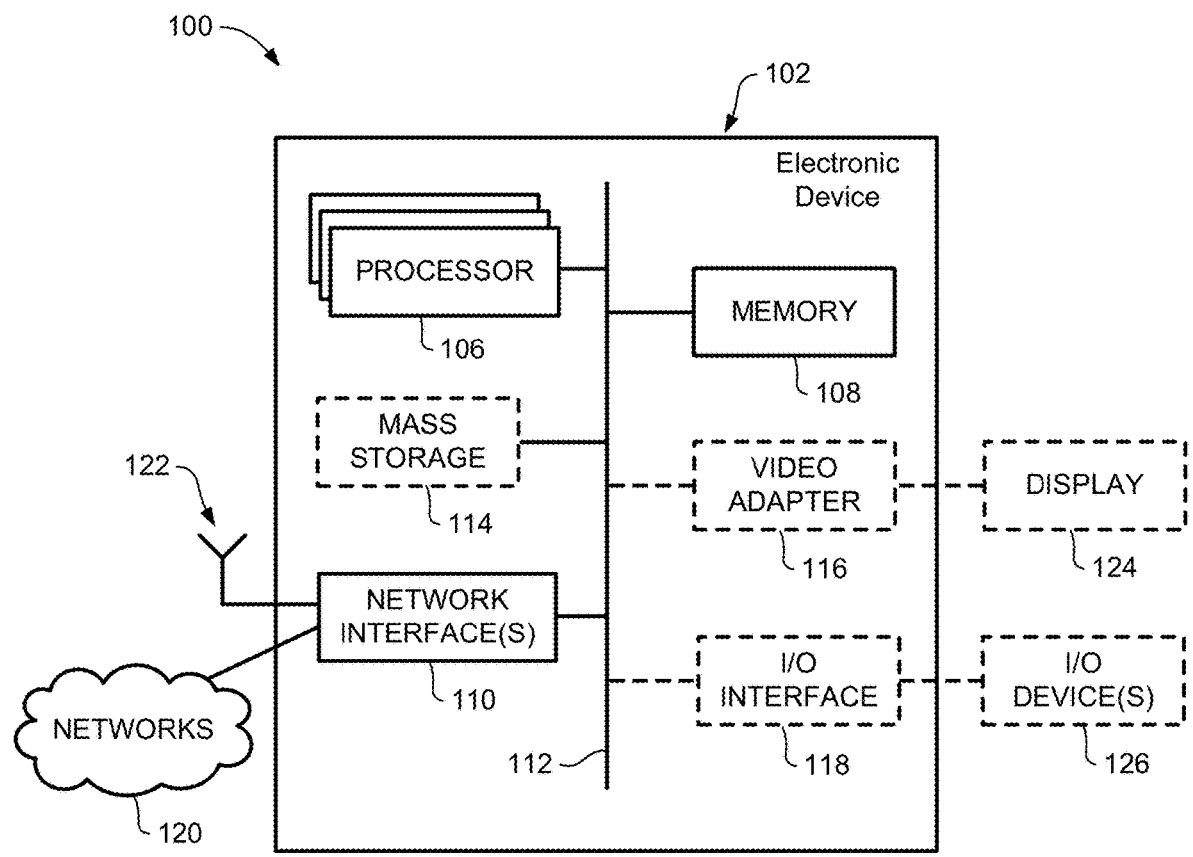
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network. In other embodiments, the electronic device (ED) 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) communication device), or another such device that may be categorized as a ED despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form a heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
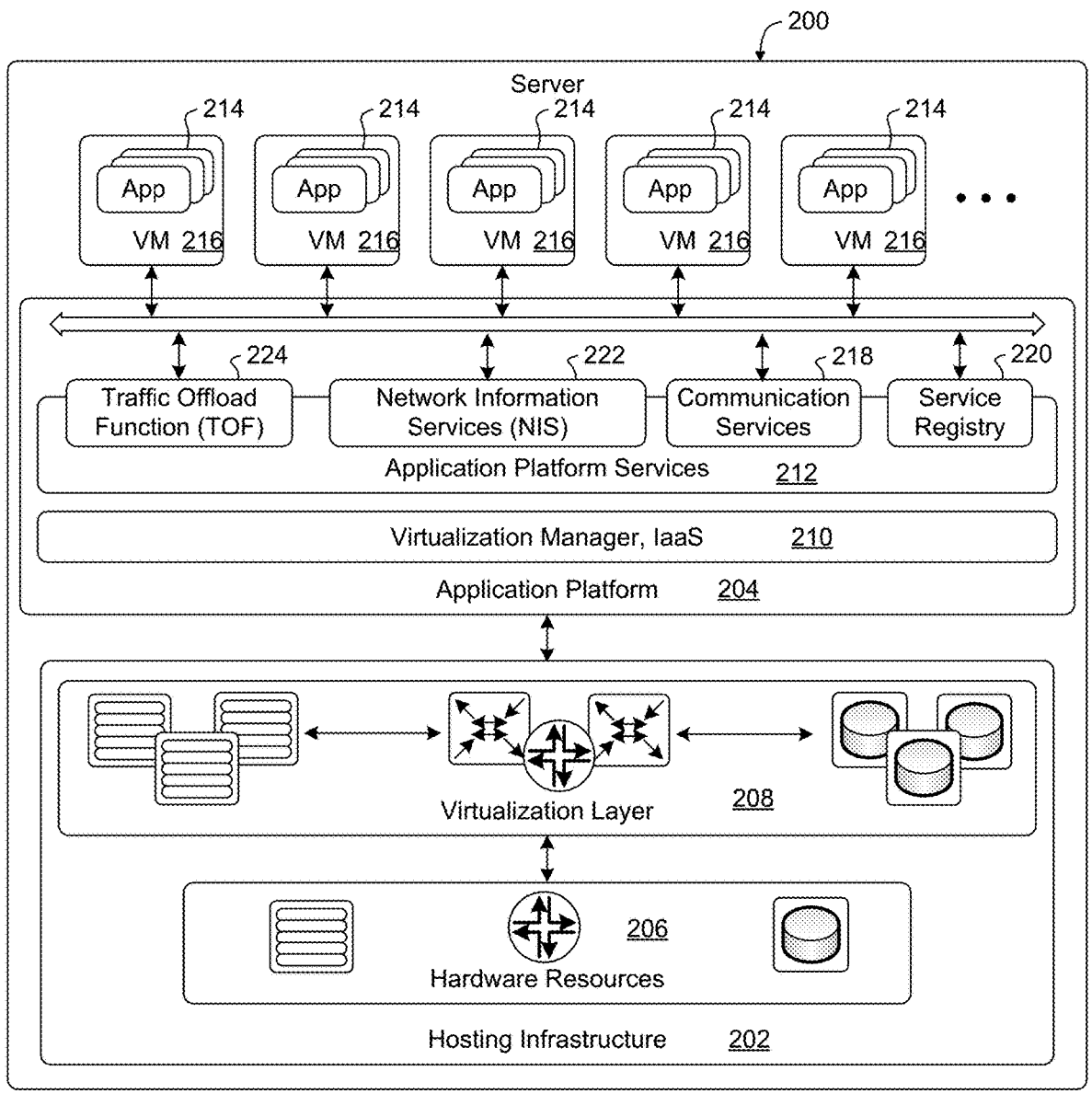
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3:
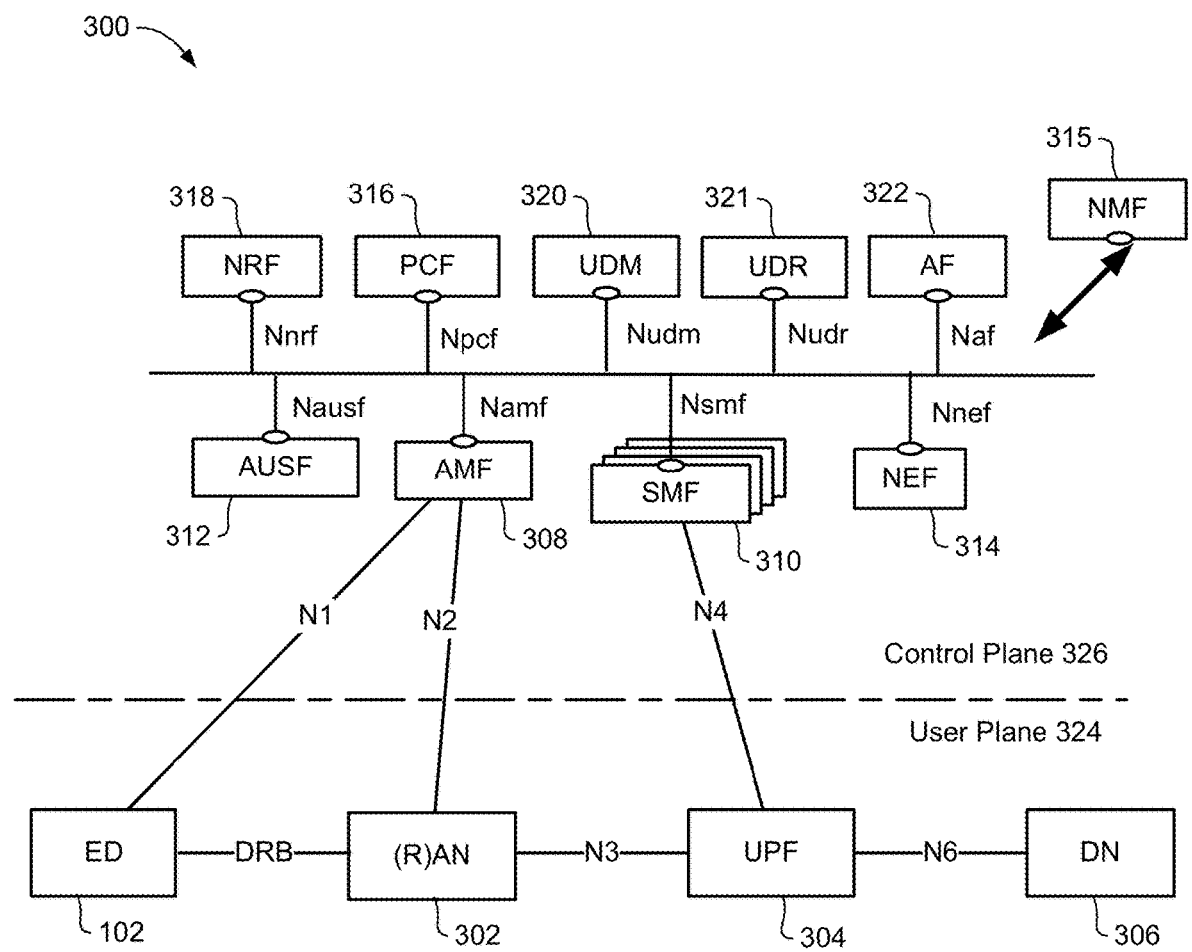
FIG. 3 is a block diagram illustrating a service-based view of a system architecture of a 5G Core Network.

FIG. 3 illustrates a service-based architecture 300 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 302 (which may, for example, be an gNodeB (gNB)), which is connected to a User Plane (UP) Function (UPF) 304 such as a UP Gateway over a network interface providing a defined interface such as an N3 interface. UPF 304 provides a logical connection to a Data Network (DN) 306 over a network interface such as an N6 interface. The radio access network connection between the ED 102 and the (R)AN node 302 may be referred to as a Data Radio Bearer (DRB).

DN 306 may be a data network used to provide an operator service, or it may be outside the scope of the standardization of the Third Generation Partnership Project (3GPP), such as the Internet, a network used to provide third party service, and in some embodiments DN 306 may represent an Edge Computing network or resource, such as a Mobile Edge Computing (MEC) network.

ED 102 also connects to the Access and Mobility Management Function (AMF) 308 through a logical N1 connection (although the physical path of the connection is not direct). The AMF 308 is responsible for authentication and authorization of access requests, as well as mobility management functions. The AMF 308 may perform other roles and functions as defined by the 3GPP Technical Specification (TS) 23.501. In a service based view, AMF 308 can communicate with other core network control plane functions through a service based interface denoted as Namf.

The Session Management Function (SMF) 310 is a network function that is responsible for the allocation and management of IP addresses that are assigned to an ED as well as the selection of a UPF 304 (or a particular instance of a UPF 304) for traffic associated with a particular session of ED 102. It will be appreciated that there will typically be multiple SMFs 310 in the network 300, each of which may be associated with a respective group of EDs 102, (R)AN nodes 302 or UPFs 304. The SMF 310 can communicate with other core network functions, in a service based view, through a service based interface denoted as Nsmf. The SMF 310 may also connect to a UPF 304 through a logical interface such as network interface N4.

The Authentication Server Function (AUSF) 312, provides authentication services to other network functions over a service based Nausf interface.

A Network Exposure Function (NEF) 314 can be deployed in the network to allow servers, functions and other entities such as those outside a trusted domain to have exposure to services and capabilities within the network. In one such example, an NEF 314 can act much like a proxy between an application server outside the illustrated network and network functions such as the Policy Control Function (PCF) 316, the SMF 310, the UDM 320, and the AMF 308, so that the external application server can provide information that may be of use in the setup of the parameters associated with a data session. The NEF 314 can communicate with other network functions through a service based Nnef network interface. The NEF 314 may also have an interface to non-3GPP functions.

A Network Repository Function (NRF) 318, provides network service discovery functionality. The NRF 318 may be specific to the Public Land Mobility Network (PLMN) or network operator, with which it is associated. The service discovery functionality can allow network functions and EDs connected to the network to determine where and how to access existing network functions, and may present the service based interface Nnrf.

PCF 316 communicates with other network functions over a service based Npcf interface, and can be used to provide policy and rules to other network functions, including those within the control plane. Enforcement and application of the policies and rules is not necessarily the responsibility of the PCF 316, and is instead typically the responsibility of the functions to which the PCF 316 transmits the policy. In one such example the PCF 316 may transmit policy associated with session management to the SMF 310. This may be used to allow for a unified policy framework with which network behavior can be governed.

A Unified Data Management Function (UDM) 320 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 320 may employ an interface, such as Nudr to connect to a User Data Repository (UDR) 321. The PCF 316 may be associated with the UDM 320 because it may be involved with requesting and providing subscription policy information to the UDR, but it should be understood that typically the PCF 316 and the UDM 320 are independent functions.

The PCF 316 may have a direct interface to the UDR 321 or can use Nudr interface to connection with UDR 321. The UDM 320 can receive requests to retrieve content stored in the UDR 321, or requests to store content in the UDR 321. The UDM 320 is typically responsible for functionality such as the processing of credentials, location management and subscription management. The UDR 321 may also support any or all of Authentication Credential Processing, User Identification handling, Access Authorization, Registration/Mobility management, subscription management, and Short Message Service (SMS) management. The UDR 321 is typically responsible for storing data provided by the UDM 320. The stored data is typically associated with policy profile information (which may be provided by PCF 316) that governs the access rights to the stored data. In some embodiments, the UDR 321 may store policy data, as well as user subscription data which may include any or all of subscription identifiers, security credentials, access and mobility related subscription data and session related data.

The Application Function (AF) 322 represents the non-data plane (also referred to as the non-user plane) functionality of an application deployed within a network operator domain and within a 3GPP compliant network. The AF 322 interacts with other core network functions through a service based Naf interface, and may access network capability exposure information, as well as provide application information for use in decisions such as traffic routing. The AF 322 can also interact with functions such as the PCF 316 to provide application specific input into policy and policy enforcement decisions. It should be understood that in many situations the AF 322 does not provide network services to other NFs, and instead is often viewed as a consumer or user of services provided by other NFs. An application outside the 3GPP network, can perform many of the same functions as AF 322 through the use of NEF 314.

The Network Management Function (NMF) 315 is a network management plane function which provides configuration, operations, maintenance and support services for the Control Plane (CP) and UP functions. The NMF may be also called OAM (Operations, Administration and Maintenance) system.

The ED 102 communicates with network functions that are in the User Plane (UP) 324, and the CP 326. The UPF 304 is a part of the CN UP 324 (DN 306 being outside the 5GCN). (R)AN node 302 may be considered as a part of a User Plane, but because it is not strictly a part of the CN, it is not considered to be a part of the CN UP 324. AMF 308, SMF 310, AUSF 312, NEF 314, NRF 318, PCF 316, and UDM 320 are functions that reside within the CN CP 326, and are often referred to as CP Functions. AF 322 may communicate with other functions within CN CP 326 (either directly or indirectly through the NEF 314), but is typically not considered to be a part of the CN CP 326.

Those skilled in the art will appreciate that there may be a plurality of UPFs, e.g., Intermediate-UPFs (I-UPF)s connected in series between the (R)AN node 302 and the DN 306, and multiple data sessions to different DNs can be accommodated through the use of multiple UPFs in parallel.

Figure 4:
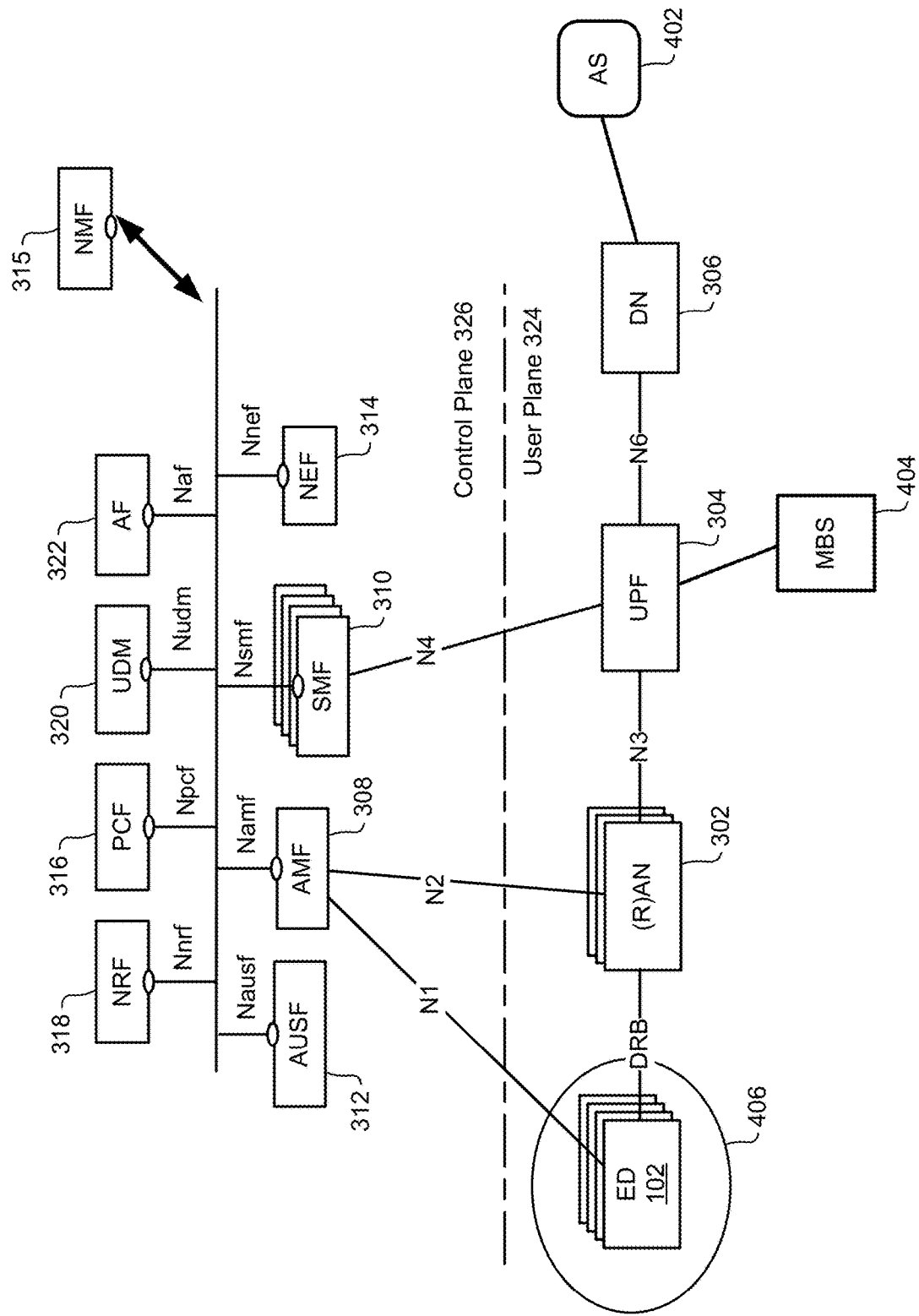
FIG. 4 is a block diagram illustrating a service-based view showing a Multicast/Broadcast Server (MBS) providing data service to many users simultaneously implemented in a 5G Core Network.

FIG. 4 is a block diagram illustrating an example Multicast/Broadcast Server (MBS) implementation with connections to the Core Network (CN) 300. The MBS 404 can provide data service to many ED 102 simultaneously. For example, the current Multicast and Broadcast Multimedia Subsystem (MBMS) may be redesigned in order to support connections with the CN 300. In the example of FIG. 4, the MBS 404 may be connected with one or more UPFs 304 and other network functions. An arbitrary number (one or more) EDs 102 may be associated with a ED group 406, which may be identified (for example in the SMF 310 and NEF 314) by a ED Group ID (EDGID). The ED Group ID could be Internal-Group Identifier (ID) as defined in 3GPP TS 23.501 Version 2.0.1, published in December 2017, or Temporary Mobile Group Identifier (TMGI), or External Group ID. The EDs 102 within a particular ED group 406 may be associated with each other by any desired criteria such as, for example, geographical location (e.g. EDs located in a particular building), function (e.g. EDs configured to perform a specific function), or service (e.g. EDs associated with a specific IoT, or V2X service or public safety, or video streaming group, or TV broadcasting group). In some embodiments, all of the EDs 102 within a particular ED group 406 may be connected to a single (R)AN node 302. In other embodiments, the EDs 102 within a particular ED group 406 may be connected to the core network via two or more different (R)AN nodes 302.

The MBS 404 may select a file to be multicast or broadcast to each of the EDs 102 within the ED Group 406. The selected file may be downloaded from the AS 402 to the MBS 404, and information identifying the ED group 406 (such as the EDGID) supplied to the UPF(s) 304 associated with the MBS 404. Based on this information, the UPF(s) 304 may obtain address information for each ED 102 within the group (from the SMF 310, for example), and set up connections to each involved ED 102. Once suitable connections have been established, the UPF(s) 304 may forward the selected file to each ED 102 within the group 406. During the course of downloading the file to a specific ED 102 within the group, the application layer of ED 102 may interact with the MBS 404 in a conventional manner to recover lost packets or correct other errors in the transmission.

Each ED 102 may be capable of application-layer error detection and handling, in order to detect whether or not the whole file has been correctly received, and request MBS 404 to re-transmit the missing packets of file if an error has occurred. This arrangement is suitable for video broadcasting and streaming services, and is usable for other specialized services such as public safety. However, many devices do not support application-layer error correction such as the methods implemented in the MBMS protocol stack. For example, some IoT devices may not support application-layer error handling at all, and may include only basic physical layer error detection and correction. Therefore, it is desirable develop alternative solutions for 5G systems to support multicast and broadcast transmission for devices that do not support MBMS protocol stack.

In the following, the term "MB Service" is used to indicate a Multicast or Broadcast type data transfer service provided by a communication network, such as the 3GPP 5G system, to send MB-Data from an Application Server to a specific group of EDs. Membership in a specific ED group may be based on any suitable criteria. For example, an ED group may be based on a combination of ED function, geographical region or distribution, service (such as an IoT service) with which the EDs are associated, or service provider with which the EDs are associated. The communication network establishes an MB Session to provide an MB Service requested by an entity, such as an Application Function, or Application Server, or by a network function of the communication network. The term "MB-Data" refers to the data that is (or is intended to be) transmitted to the member EDs of a specific ED group during the course of an MB session. MB Data typically comprises one or more packets (or, more broadly, Protocol Data Units).

Methods and systems to establish a Multicast-Broadcast (MB) Session are described in U.S. provisional application Ser. No. is 62/590,210, filed Nov. 22, 2017, titled MULTICAST AND BROADCAST SERVICES, which is hereby incorporated by reference in its entirety. However, the following additional methods are also required for MB Session management: MB Session Modification; MB Session Release; Deactivation and Activation of UP of MB Session; and Handling Mobility of ED in MB Session.

It is noted that an MB Session may be served by multiple AMF functions, multiple SMF functions, multiple NEF functions, and multiple PCF functions. Multiple UPFs may also be utilized. Further, it is noted that an MB Session can be established in many (R)AN nodes and possibly a very large number of EDs. Methods and systems are discussed herein enable MB sessions using these large number of devices while efficiently sending the signaling messages between CN functions in order reduce the signaling overhead. However, for ease of reference examples will be discussed using only single instances of these functions. Further, although common references numbers will be used to describe these functions, it is noted that in some cases, some CP functions and some UP functions may be modified in order to modify or release an MB Session. The MB Session can be served by one or multiple NF sets of NF service instances, such as one or multiple sets of AMF service instances, one or multiple sets of SMF service instances, one or multiple sets of PCF service instances, one or multiple sets of NRF service instances, and one or multiple sets of other NF service instances.

This disclosure will be organized as follows. First methods MB modification will be discussed, with reference to FIGS. 5 and 6. Then methods of MB release will be discussed with references to FIGS. 7 and 8. It is noted that FIGS. 6 and 8 are divided into multiple portions (e.g., FIGS. 6A, 6B, 6C . . . in order to fit on a single page). Further it is noted that multiple possible messages are considered, although not every message will occur. For example, multiple possible triggers will be discussed, but it should be recognized that only a single trigger may trigger a modification or release at a time. Further, subsequent steps shown in the call flows may depend on which trigger occurred. Further, it is noted that the methods discussed below can be implemented both for systems which utilize an MBS, as well as systems which do not.

Figure 5:
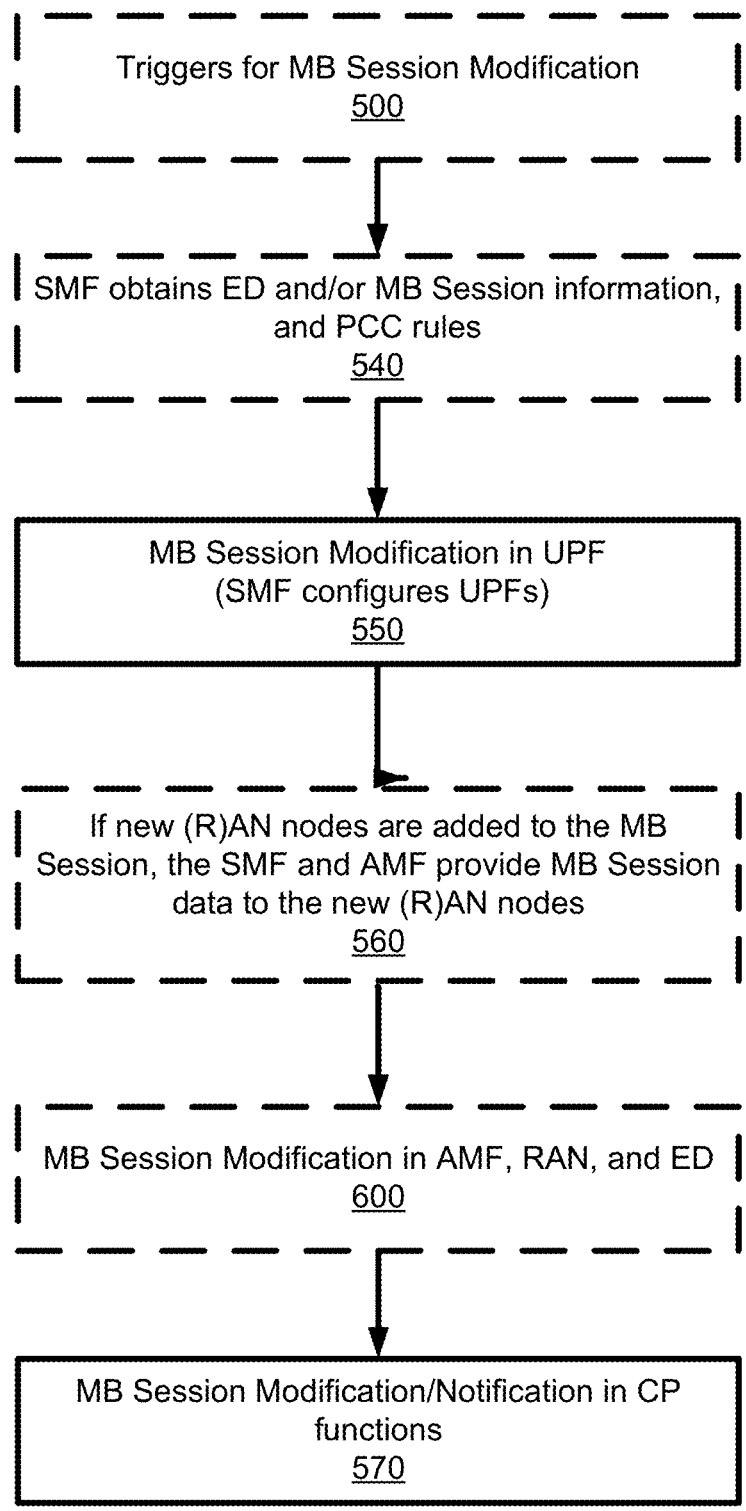
FIG. 5 is a flow chart illustrating an MB modification method in accordance with an embodiment of the present invention.

FIG. 5 is a flowchart illustrating 6 main steps in an example method to modify an MB Session, according to an embodiment. Step 500: triggers for MB Session Modification. Step 540: SMF obtains ED and/or MB Session information, and PCC rules. Step 550: MB Session Modification in UPF. Step 560: if new (R)AN nodes are added to the MB Session, the SMF and AMF provide MB Session data to the new (R)AN nodes. Step 600: MB Session Modification in AMF, RAN, and ED. Step 570: MB Session Modification/Notification in CP functions (such as PCF, UDM, NEF), AF and NMF.

The details of these steps, including various options, are discussed below with reference to the call flows illustrated in FIGS. 6A, 6B . . . . It is noted that box 500 is illustrated in dashed lines as there can be multiple triggers, one or some of which can trigger a modification to the MB session at a time. Similarly, box 560 is illustrated in dashed lines, as not all MB session modifications involve a change in (R)AN nodes. Further, in FIG. 5, box 600 is illustrated in dashed lines, as there are multiple options, depending on which trigger occurred. As can be seen in FIGS. 6D, E . . . and Table 1, seven options are discussed below.

TABLE 1

Summary of Options

| Option | How the AMF modify MB Session | How the (R)AN modify MB Session | How the ED modify MB Session |
|---|---|---|---|
| 1 | The SMF sends multiple N1 SM MB Session Modification request, each message for one ED; and multiple N2 SM MB Session Modification requests, each for one | The SMF sends multiple N2 SM MB Session Modification requests to multiple (R)AN nodes. | The SMF sends multiple N1 SM MB Session Modification requests to EDs. |

TABLE 1-continued

Summary of Options

| Option | How the AMF modify MB Session | How the (R)AN modify MB Session | How the ED modify MB Session |
|---|---|---|---|
|  | (R)AN node. After all EDs and (R)AN nodes send back to the SMF N2 SM MB Session Modification Response, the SMF sends N11 MB Session Modification request to the AMF. |  |  |
| 2 | The SMF sends multiple N2 SM MB Session Modification requests, each for one (R)AN node. After all (R)AN nodes send back to the SMF N2 SM MB Session Modification Response, the SMF sends N11 MB Session Modification request to the AMF. | The SMF sends multiple N2 SM MB Session Modification requests to (R)AN nodes. The message contains MB Session IDs. | The (R)AN may send an RRC message to the EDs that join the MB Session to remove MB DRB. The EDs implicitly understand that the MB Session is modified. |
| 3 | The SMF sends one N11 MB Session Modification request to the AMF. The message carry MB Session ID. The N11 MB Session Modification request may include a list of (R)AN nodes that receive modified parameters, and new values of parameters to be modified. The message may include the list of ED IDs to receive modified parameters, and new values of the parameters to be modified. | From the MB Session ID, the AMF creates multiple N2 MM MB Session Modification for all (R)AN nodes that informed by the SMF 310 for the MB Session ID. The message includes MB Session ID and maybe ED IDs. | Option 3.1: The (R)AN may send an RRC message to the ED to remove MB DRB. The EDs implicitly understand that the MB Session is modified. |
| 4 | The SMF sends one N11 MB Session Modification request to the AMF. The message carry MB Session ID. The N11 MB Session Modification request may include a list of (R)AN nodes that receive modified parameters, and new values of parameters to be modified. The message may include the list of ED IDs to receive modified parameters, and new values of the parameters to be modified. | From the MB Session ID, the AMF creates multiple N2 MM MB Session Modification for all (R)AN nodes that informed by the SMF 310 for the MB Session ID. The message includes MB Session ID and maybe ED IDs. The AMF may create one common N1 MM MB Session Modification request per (R)AN node. The message may include the information provided by the SMF 310, and may include additional information provided by the AMF 308, | The (R)AN may forward the common N1 MM MB Session Modification request to the ED with IDs informed by the AMF 308 or all the ED with IDs in the MB Session Context, or all EDs served by the (R)AN 302 using a broadcast channel. |
| 5 | The SMF sends one N11 MB Session Modification request to the AMF. The message carry MB Session ID. The N11 MB Session Modification request may include the list of (R)AN nodes IDs and new values of parameters to be modified. The SMF also includes one common N1 SM MB Session Modification, and may include the list of ED IDs. | From the MB Session ID, the AMF creates multiple N2 MM MB Session Modification for all (R)AN nodes that informed by the SMF 310, the MB Session ID. The message includes MB Session ID and maybe ED IDs. | The (R)AN may forward the N1 SM MB Session Modification request to ED IDs that informed by the SMF 310, or all EDs in the MB Session Context, or all the EDs connected to the (R)AN 302 by a broadcast channel. |
| 6 | The SMF sends one N11 MB Session Modification request to the AMF. The message carry MB Session | From the MB Session ID, the AMF creates multiple N2 MM MB Session Modification for | The AMF may send CN paging message to all EDs in the MB Session. |

TABLE 1-continued

Summary of Options

| Option | How the AMF modify MB Session | How the (R)AN modify MB Session | How the ED modify MB Session |
|---|---|---|---|
| | ID, and may include the list of (R)AN addresses. | all (R)AN nodes that informed by the SMF 310 or all (R)AN nodes that join the MB Session ID. The message includes MB Session ID, and paging message to EDs. | |
| 7 | the SMF 310 identifies the AMF 308, ED IDs and (R)AN nodes 302 to modify the MB Session. The SMF 310 may send to the AMF 308, one (common) N1 SM message (such as N1 SM MB Session Modification Request) and one (common) N2 SM message (e.g. N2 SM MB Session Modification Request). The SMF 310 may send one N11 message, e.g. N11 Multicast Distribution Request, to request the AMF 308 to send the N1 SM MB message and N2 SM MB message to multiple EDs and multiple (R)AN nodes, respectively. | The AMF 308 distributes the N2 SM message to the (R)AN nodes informed by the SMF 310, or by using (R)AN information stored in the MB Session Context in the AMF 308. | The AMF 308 distributes the N1 SM message to (R)AN node. The AMF 308 may include the list of ED IDs (provided by the SMF 310, or by using ED Context or MB Session Context stored in the AMF 308) to the (R)AN node. The (R)AN 302 may forward the N1 SM message to the ED IDs indicated by the AMF 308, or ED IDs in the MB Session Context stored in the (R)AN 302, or all ED IDs. |

Figure 6A:
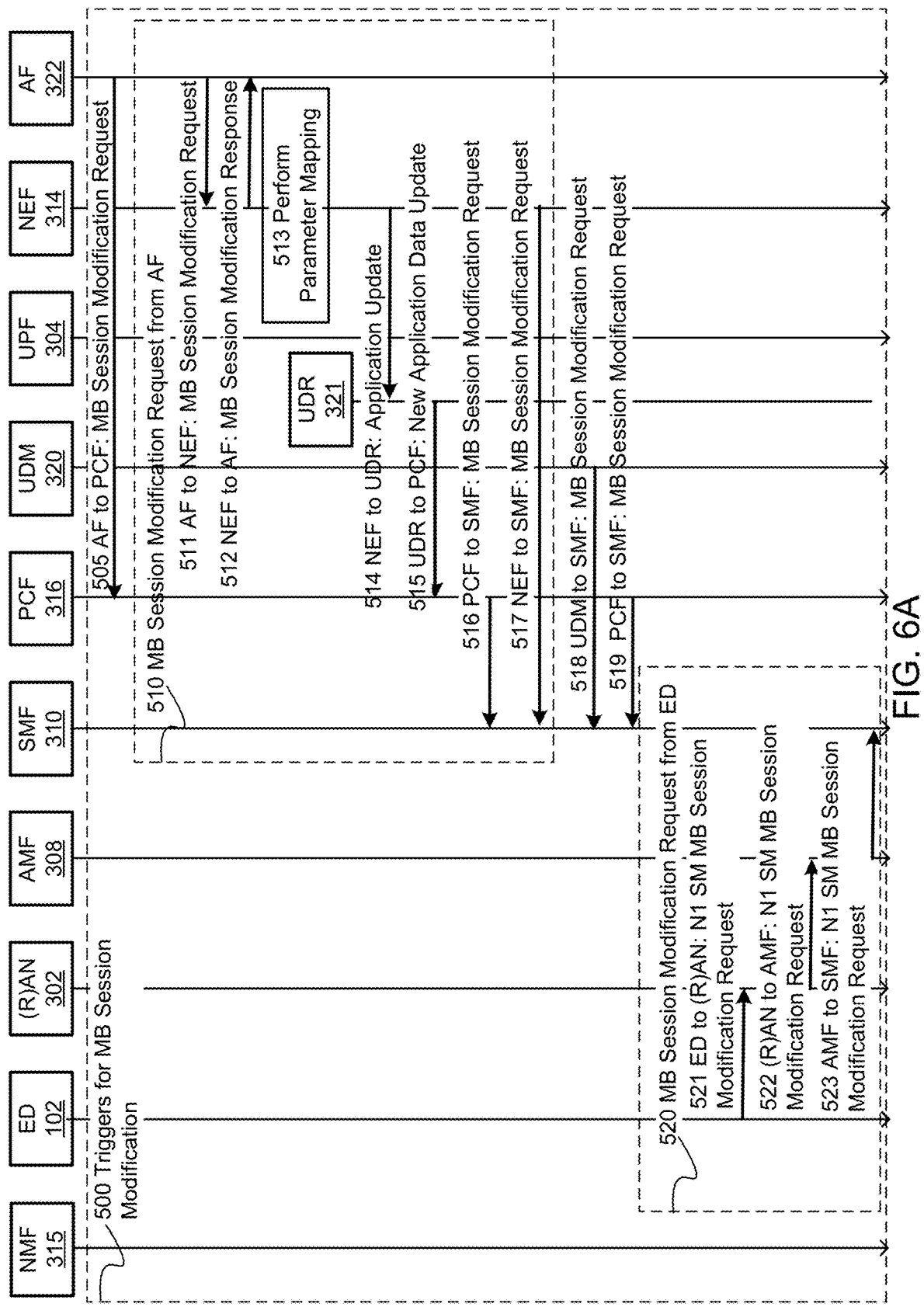
Figure 6B:
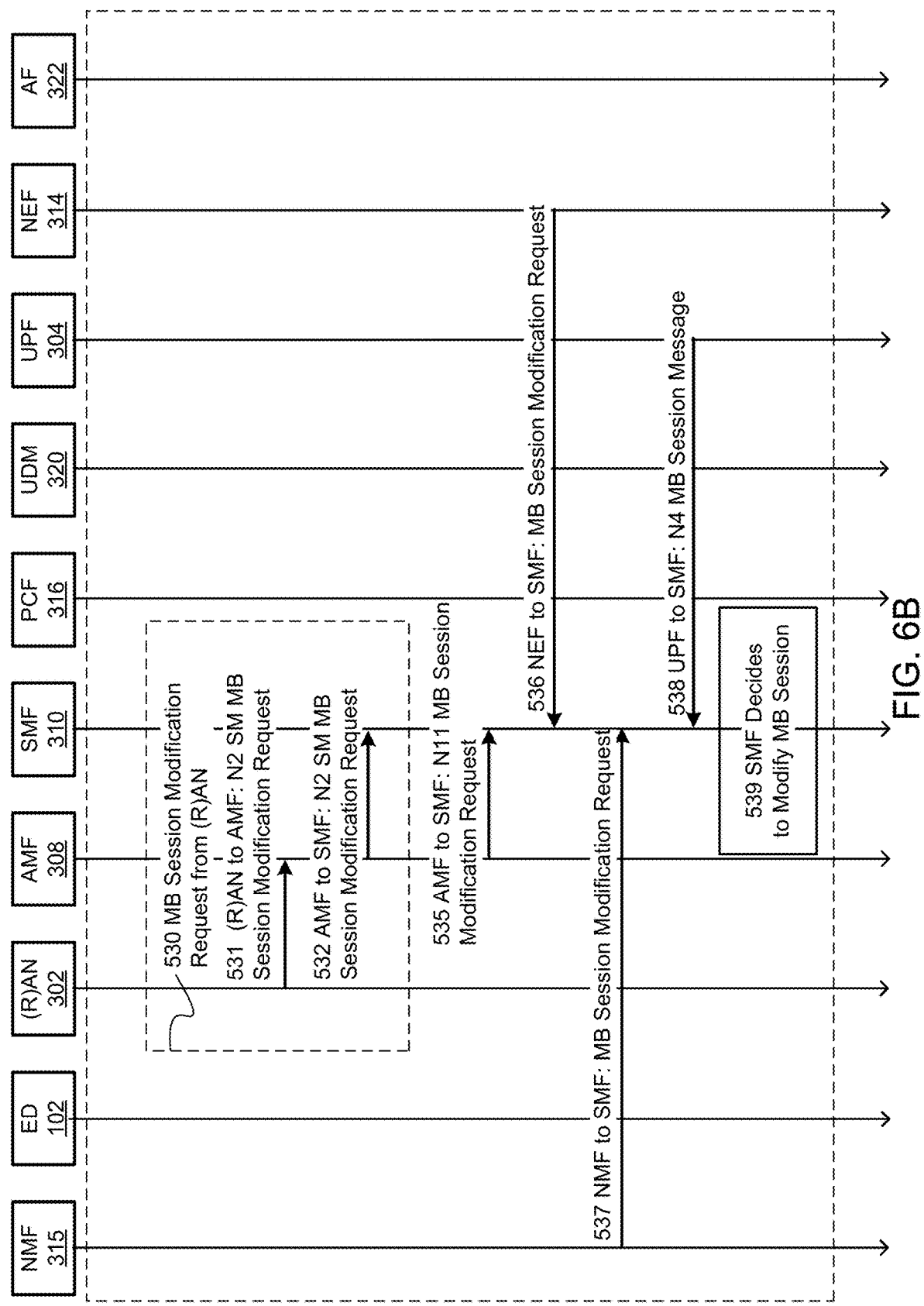

FIG. 6A . . . illustrate call flows for various possible triggers 500 for an MB Session Modification. The MB Session can be modified by one of the triggers 505, 510, 518, 519, 520, 530, 535, 536, 537, 538 and 539.

The AF 322 may send an MB Session Modification Request 505 to the PCF 316.

The AF 322 may send an MB Session Modification Request to the SMF 310. There are two options for sending this request.

For Option 1, the message may be sent from AF 322 to the SMF 310 via the NEF, as illustrated by box 510. Box 510 includes messages 511, 512, 515, 516 and 517, as well as step 513. The message 511 may contain an identifier to identify the MB Session, Location Information (e.g. Geographical Zone IDs, DNAI (Data Network Access Identifier)), Network Slice information (e.g. S-NSSAI (Single Network Slice Selection Assistance Information), NSI (Network Slice Instance Identifier)), AF and/or AS information (e.g. DNAI, AF-Service-Identifier), ED information (External Group ID, External ED ID, Generic Public Subscription Identifier (GPSI)), Time information (e.g. Start Time, End Time, or duration of MB Session), QoS (Quality of Service) information, Change Indication, Deactivation or Activation of UP connections of MB Session Indication, and Parameters to be changed. The identifier to identify the MB Session could be a Transaction ID, or could be an MB Session ID.

The Change Indication indicates whether the provided parameters will replace existing parameters, or include parameters which are to be added to, or removed from an existing MB Session. The Parameters to be added to or removed from an existing MB Session could be: Location Information: Locations to be added to or removed from an existing MB Session, or Locations to deactivate or activate the MB Session; ED Information: EDs that join or leave the MB Session; Time Information: Time parameters of MB Session: e.g. the MB Session could periodically start and/or end at certain times during the day.

Parameters to be changed could be: AF and/or AS information: e.g. new address of AS such as IP Source or DNAI, packet flow description (PFD); Time of MB Session: e.g. new Start Time or End Time of MB Session (scheduled time or periodically); QoS requirements: e.g. Maximum Bit Rate (MBR), Maximum Flow Bit Rate (MFBR), Maximum Guaranteed Flow Bit Rate (GFBR), packet delay budget (PDB), packet priority (which is related to Allocation and Retention Priority in the system); ED Information: e.g. a new set of EDs that participate in the MB Session; Network Slice information: The MB Session could be re-established for a newly provided Network Slice instance (S-NSSAI). In this case, the NEF 314 may trigger MB Session Release and MB Session Establishment for new MB Session. Other parameters to be changed can include: Deactivation or Activation of UP connections of MB Session Indication: The AF 322 may request the CN to deactivate or activate UP connections of an existing MB Session; and Amount of Data to be sent for the coming MB Session.

The NEF 314 sends MB Session Modification Request Response 512 to Acknowledge the AF. The message may include the identifier to identify MB Session.

Step 513: The NEF 314 may perform parameter mapping, which convert the parameters provided by the AF to the internal parameters of the network. For example: the External Group ID may be mapped to Internal-Group ID or International Mobile Subscriber Identity (IMSI)-Group ID, the Geographical Zone ID. If there is only one MB Session for the External Group ID or one MB Session for a Network Slice instance (indicated by S-NSSAI), the MB Session ID can be found in the MB Session Context of the NEF. From the Geographical Zone IDs, the (R)AN Address(es) may be identified. The NEF 314 may have local information to map the Location Information received from AF 322 to the Location Information that may be understood by the SMF 310 or may be used by AMF 308 later, such as (R)AN Addresses or UPF Service Area.

For some parameters such as QoS parameters, the NEF 314 sends information received from AF 322 to the UDR 321 in message 514. The UDR 321 may send an acknowledgement message (not shown) to the NEF 314 to acknowledge the Application Update. The UDR 321 stores the application data. The UDR 321 may send a message, such as New Application Data Update 515, to the PCF(s) 316 that subscribed to receive the new application data. The PCF 316 may make some decisions on QoS rules (e.g. new QoS parameters), charging policy. The PCF 316 may send a message, e.g. MB Session Modification Request 516 to the SMF 310. The message 516 may include new PCC rules, such as QoS rules and charging policy. For some parameters to be changed, the NEF 314 may send MB Session Modification Request 517 to the SMF 310. The NEF 314 may include the information received from the AF 322 and other information deduced from the information received from the AF: such as the identifier to identify MB Session (which may be available in the MB Session Context in the NEF), Internal-Group ID, Location Information (e.g. Geographical Zone ID(s), DNAI, (R)AN Addresses, UPF Service Areas, Tracking Areas, Registration Areas, SMF Service Area), Network Slice information (e.g. S-NSSAI), Application information (e.g. AF-Service Identifier, DNAI), Time information (e.g. Time to Release MB Session).

Step 510, option 2: The AF 322 may send an MB Session Modification Request to the SMF 310 directly (this option is not plotted in the call flow). The message may include the same information as described for message 511. The SMF 310 may perform a mapping from External Group ID or the identifier to identify MB Session to the Internal-Group ID (or IMSI-Group ID).

For either option 1 or option 2 of step 510, the SMF 310 may send MB Session Modification Request Acknowledgment (not shown) to the AF 322. This acknowledgement message may include the External Group ID and the identifier to identify.

Another possible trigger involves UDM 320 sending MB Session Modification Request 518 to the SMF 310. Examples of such a trigger include the subscription of some EDs changing, or the subscription of an ED group changing. The MB Session Modification Request 518 instructs the SMF 310 to update the ED or ED group subscription information. The message may contain Location Information, ED Information, ED Group Information, Time Information. Other Parameter changes include: Location Information: e.g. Geographical Zone IDs, (R)AN Address(es), UPF Service Areas, DNAI. The locations that new ED subscription data to be changed. Further parameter changes can include: ED Information: The list of ED IDs (e.g. SUPI (Subscription Permanent Identifier), 5G GUTI (Globally Unique Temporary Identifier), GPSI, TMSI (Temporary Mobile Subscription Identifier), 5G-S-TMSI (5G S-Temporary Mobile Subscription Identifier)) having subscription data changes; ED Group Information: the list of ED Group(s) (e.g. Internal-Group ID, IMSI-Group ID) having ED group subscription data changes; Time Information: Time to apply the changes; Parameters to be changed: e.g. Subscribed MB Session AMBR (Aggregate Maximum Bit Rate), subscribed ED-AMBR.

Another possible trigger involves PCF 316 sending MB Session Modification Request 519 to the SMF 310. The message 519 may contain MB Session ID, Location Information (e.g. Geographical Zone ID(s)), UPF Service Areas, RAN Addresses) to apply the new changes, PCC rule updates, Time Information (e.g. Time to apply the new changes).

Another possible trigger involves step 520 in which the ED 102 may send MB Session Modification Request to the SMF 310 via (R)AN 302 and AMF 308. This step includes ED 102 sending an MB Session Modification Request 521 to the (R)AN 302. Message 521 could be in a format of N1 SM message or N1 MM message. The ED 102 may send the message when the ED joins or leaves the MB Session. The message 521 may include MB Session ID and ED ID (such as SUPI, TMSI, 5G GUTI), and an indication to join or leave the MB Session. The (R)AN 302 forwards the received message to the AMF 308 as message 522. If the ED 102 sent an N1 SM message 522, the AMF 308 forwards the N1 SM message to the SMF 310 as message 523. If the ED 102 sent the N1 MM message, such as deregistration message, the AMF may send an N11 MB Session Modification Request as described below with reference to message 535. Another trigger in step 521 is that the ED 102 generates signalling connection release request to the (R)AN 302 so that the ED 102 enters CM-IDLE state. In this case, the (R)AN 302 will perform AN Release procedure with the AMF 308. The message 522 is replaced by message N2 ED Context Release request as described in the AN Release procedure of 3GPP TS 23.502, version 2.0.0 published in December 2017. The AMF 308 then notifies the SMF 310 to update the MB Session in step 523.

Another possible trigger involves step 530 in which the (R)AN 302 may send MB Session Modification Request to the SMF 310 via the AMF 308. The (R)AN(s) 302 may send an N2 SM MB Session Modification Request 531 to the AMF 308. The message may contain MB Session ID, Location information (e.g. RAN Addresses), MB Session Report, Parameters to be changed, and an indication of the Cause for the trigger (hereafter Cause). The Parameters to be changed can include QoS parameters, MB Session Report and Cause. QoS parameters may include e.g. GFBR, MFBR, Packet Delay Budget (PDB), Indication to change QoS parameter. If the (R)AN node(s) may not support one or several QoS parameters, or the (R)AN may support better QoS parameters (e.g. higher bit rate), the (R)AN may send to the SMF an indication to change the QoS parameters and new value of QoS parameters. MB Session Report: The (R)AN may send MB Session Report to the SMF. The MB Session Report may include the ED information (e.g. the list of ED IDs that successfully received the MB message, the list of ED IDs that failed to receive the MB message, the list of ED IDs that fail to join the MB Session). The Cause indicates the reason to modify the MB Session, for example (R)AN errors, network function maintenance (e.g. (R)AN node shutdown, (R)AN node migration), policy change (e.g. the MB Session QoS is no longer supported by (R)AN), Successful delivery of data to EDs, End of MB Session duration.

The AMF 308 forwards the message received 531 from (R)AN 302 to the SMF 310 as message 532. If the (R)AN 302 does not include the location information (e.g. (R)AN address), the AMF 308 may include the Location Information (e.g. (R)AN address) in message 532.

The AMF 308 may send an N11 MB Session Modification Request 535 to the SMF 310. The message may contain the MB Session ID, ED Information (e.g. ED IDs to join or leave MB Session), Location Information, Time Information (time to apply changes), and Cause. ED Information may include a list of ED IDs (such as 5G GUTI, SUPI, GPSI), ED Group Information (e.g. Internal-Group ID, IMSI-Group ID, TMGI) to be added to the MB Session, or to be removed from MB Session. The Location Information may include the Locations (e.g. Geographical Zone ID(s)), UPF Service Areas, RAN Addresses) of MB Session may be added to or removed from an existing MB Session. Time Information may include the time to apply new modifications to the MB Session. The Cause indicates the reason to modify the MB Session, for example internal errors, network function maintenance (AMF shutdown), network function migration (e.g. AMF, SMF, PCF, UDM, NEF, AF), end of MB Session Time, successful data delivery to the EDs, Deactivation or Activation of UP connection of MB Session in some geographical locations.

As another possible trigger, the NEF 314 may send an MB Session Modification Request 536 to the SMF. In case an NEF function 314 no longer supports the MB Session, the NEF function 314 may send the MB Session Modification Request 536 to the SMF 310 to notify the information of new NEF function. The message may contain the MB Session ID, New NEF Information, Time Information (time to apply changes), and Cause. The New NEF Information may include the information of new NEF, e.g. NEF Address (IP address or Fully Qualified Domain Name (FQDN)), and may also include the UP connection information (Tunnel information) between NEF and UPF if the AF sends MB data to NEF. Time Information may include the time to apply new modifications to the MB Session. The Cause indicates the reason to modify the MB Session, for example internal errors, network function maintenance (NEF shutdown), network function migration (e.g. AMF, SMF, PCF, UDM, NEF, AF). Note that the NEF may send its MB Session Context to the New NEF. The current NEF or new NEF may notify the AF function about the new NEF and establish UP or CP connections for the existing MB Session.

Another possible trigger involves the NMF 315, for example the OAM system, sending MB Session Modification Request 537 to the SMF 310 to modify an MB Session. The message may include the MB Session ID, ED Information, Time Information, Location Information, NF information, and Cause. ED Information may be a list of ED IDs (such as 5G GUTI, SUPI, GPSI), ED Group Information (e.g. Internal-Group ID, IMSI-Group ID, TMGI) to be added to the MB Session, or to be removed from MB Session. Location Information may include the Locations of MB Session may be added to or removed from an existing MB Session. Time Information may include e.g. Periodical Time to Start or End the MB Session, time to apply new modifications to the MB Session. NF Information may include the new Address of NF(s) (e.g. IP Address or FQDN) that serve the MB Session, e.g. new NEF, AMF, PCF, UDM, UPF. The Cause indicates the reason to modify the MB Session, for example internal errors, network function maintenance (e.g. AMF shutdown), network function migration (e.g. AMF, SMF, PCF, UDM, NEF, AF), EDs want to join or leave the MB Session, MB Service is not provided in some geographical locations, Deactivation or Activation of MB Session in some geographical locations.

Another possible trigger involves the UPF 304 sending a message N4 MB Session message 538 to the SMF 310, such as DL Data Notification and DL Data Inactivity. For DL Data Notification, if the UP of MB Session is deactivated and the DL MB packet arrives, the UPF sends the DL Data Notification to the SMF. The message may include MB Session ID. For DL Data Inactivity, if the UPF finds that the MB Session has no data activity for a period of time, the UPF sends the DL Data Inactivity message to the SMF. The SMF may decide to deactivate the UP connections of the MB Session.

Another possible trigger involves SMF 310 deciding to modify the MB Session at step 539. The reason could be any combinations of the following factors: receiving one or more of the above described trigger messages; periodical updates of the MB Session (periodical activation or deactivation of UP of MB Session); the SMF receives notification messages from (R)AN and/or UPF and/or NEF to confirm the end of MB Data Transmission after successfully sending MB data to the EDs, the SMF may decide to deactivate UP connections of MB Session; and the SMF may activate UP connections of MB Session periodically, or at a scheduled time. For example, the SMF 310 may receive a request from the AF 322 that indicates periodical transmission of MB data to a group of EDs 102 at certain time period of the day. The SMF may activate or deactivate the UP connections at the time indicated in the request message of the AF 322.

Step 540 involves the SMF 310 obtaining ED Location Information, and/or MB Session Information. For some MB Session Modification Requests, e.g. from UE, (R)AN, NEF, AF, NMF, the SMF may need to obtain ED Location, Subscription data of EDs, or ED group, or MB Session, PCC rules. The SMF 310 may send a message, for example N11 MB Session Modification Request 541 to the AMF 308. The message may be used to add new ED to the MB Session, when the SMF 310 does not know the ED locations. The SMF may send the ED ID(s) (e.g. SUPI, TMSI, 5G GUTI, GPSI), to the AMF 308. It is noted, for example that this may occur in response to trigger 510 from the AF 322. However, this may not be needed in response to trigger 520 received from the ED 102. The AMF 308 may store the ED IDs to the ED Group Context, or to the MB Session Context. The AMF may send a message 542, e.g. N11 MB Session Modification Response to the SMF 310. The message may include the (R)AN Address(es), and List of ED IDs that are being served by a corresponding (R)AN 302.

The SMF 310 may send a message, for example ED and/or MB Session Information Request 543, to the UDM 320. The message may include MB Session ID, ED Information, ED Group Information. ED Information can include: the list of ED IDs, which may include the current ED IDs and/or new ED IDs to join the MB Session; the corresponding ED Location Information (e.g. (R)AN Address). The ED Group Information can include the Internal-Group IDs, IMSI-Group ID, or TMGI. In response, the UDM 320 may send a message, e.g. ED and/or MB Session Information Response 544, to provide subscription data of EDs or ED group, or MB Session. The SMF 310 uses the subscription data to determine, e.g., whether an ED could use MB service.

The SMF 310 may send a message, for example ED and/or MB Session PCC Request 545, to the PCF 316. The message 545 may include MB Session ID, ED Information, ED Group Information. The ED Information can include the list of ED IDs and the ED Location Information. The List of ED IDs may include the current ED IDs and/or new ED IDs. The ED Group Information can include the Internal-Group IDs and IMSI-Group ID, or TMGI. The PCF 316 may send a message, e.g. ED and/or MB Session Information Response 546, to provide PCC rules for EDs or ED group, or MB Session.

In step 550, MB Session Modification in UPF, the SMF 310 configures the UPFs. For some MB Session Modification Request, the SMF 310 needs to select a new Intermediate UPF (I-UPF) 305 to connect the (R)AN nodes and MB Session Anchor UPF. The I-UPF may be needed, for example, when activating UP connection of an MB Session, when the some or all EDs have moved to a new location, where there may be no direct connection between the new (R)AN node and the MB Session Anchor UPF. The SMF 310 may send a message, e.g. N4 MB Session Establishment/Modification/Release Request 551, to an I-UPF 305. If a new I-UPF is selected, the SMF may send an N4 MB Session Establishment Request, to the newly selected I-UPF. The message may include QoS rules, N3 tunnel information ((R)AN Addresses and DL TEID, and optionally the UL TEID) to connect I-UPF and (R)AN nodes, N9 tunnel information (UPF Addresses and UL and DL TEID(s)) to connect the I-UPF and the MB Session Anchor UPF, error correction protocol for N3 and N9. If an existing I-UPF is modified, the SMF may send an N4 MB Session Modification Request, to the I-UPF. The message may include QoS rules, N3 tunnel information to connect I-UPF and (R)AN nodes, N9 tunnel information (MB Session Anchor UPF Address and DL and UL TEID) to connect the I-UPF and MB Session Anchor UPF. If an existing I-UPF is released, the SMF may send an N4 MB Session Release Request, to the I-UPF.

The I-UPF 305 may send a message, e.g. N4 MB Session Establishment/Modification/Release Response 552, to the SMF 310 to acknowledge the request 551 from the SMF 310. If the I-UPF 305 is in charge of assigning UL TEID, the I-UPF includes the UL TEID(s) to be used by (R)AN nodes in the response 552.

The SMF 310 may send a message, e.g. an N4 MB Session Modification Request 553, to the UPF(s) 304 over N4 interface. From the information received in steps 500 and 540, and 551, the SMF 310 identifies the (MB Session Anchor) UPF(s) 304 that currently serves the MB Session. The N4 MB Session Modification Request 553 may include ED Group Information, MB Session ID, PCC rules, I-UPF Information, (R)AN Information, UP Information. ED Group Information: information to identify ED group, e.g. Internal-Group ID, IMSI-Group ID, TMGI. PCC rules: e.g. New QoS rules and/or charging rules for the MB Session. I-UPF Information: e.g. New I-UPF Address(es) and N9 tunnel information (UL and DL TEIDs) to be added to the MB Session; or I-UPF Address(es) to be released from the MB Session. (R)AN Information: The (new) (R)AN nodes that join or leave the MB Session. For new (R)AN nodes, the message may include the (R)AN Address(es) and UL TEID(s) (for each (R)AN node to send UL message to the MB Session Anchor UPF). Note that the DL TEID can be the same or different for all (R)AN nodes joining the MB Session. UP Information: The UP Information may include information of N3, N6 and N9 interfaces. The UP connections may be activated for a scheduled MB Session to start; or deactivated for at the end of MB Session, or at a scheduled time, or at after MB data is successfully sent to EDs. The UP connections may be Modified: for example, Modified the TEID of UL or DL of N3 tunnel; New (R)AN nodes: the (R)AN Address(es) and UL TEID(s) are provided; New NEF: the NEF Address and UL and DL TEIDs between the UPF and NEF may be updated; New AS: the N6 tunnel information may be updated (e.g. AS Address, or PFD); New I-UPF: the I-UPF Address and UL and DL TEIDs for N9 tunnel will be included; in case of removing I-UPF and/or (R)AN nodes, the Address of I-UPF and/or (R)AN nodes will be included.

The UPF(s) 304 may update the ED Group Context and/or MB Session Context. The UPF 304 may send a message, e.g. an N4 MB Session Modification Response 554, to the SMF 310 over the N4 interface. If the UPF is in charge of assigning UL TEID, the UPF includes the UL TEID(s) to be used by (R)AN 302, or I-UPF 305.

Figure 6C:
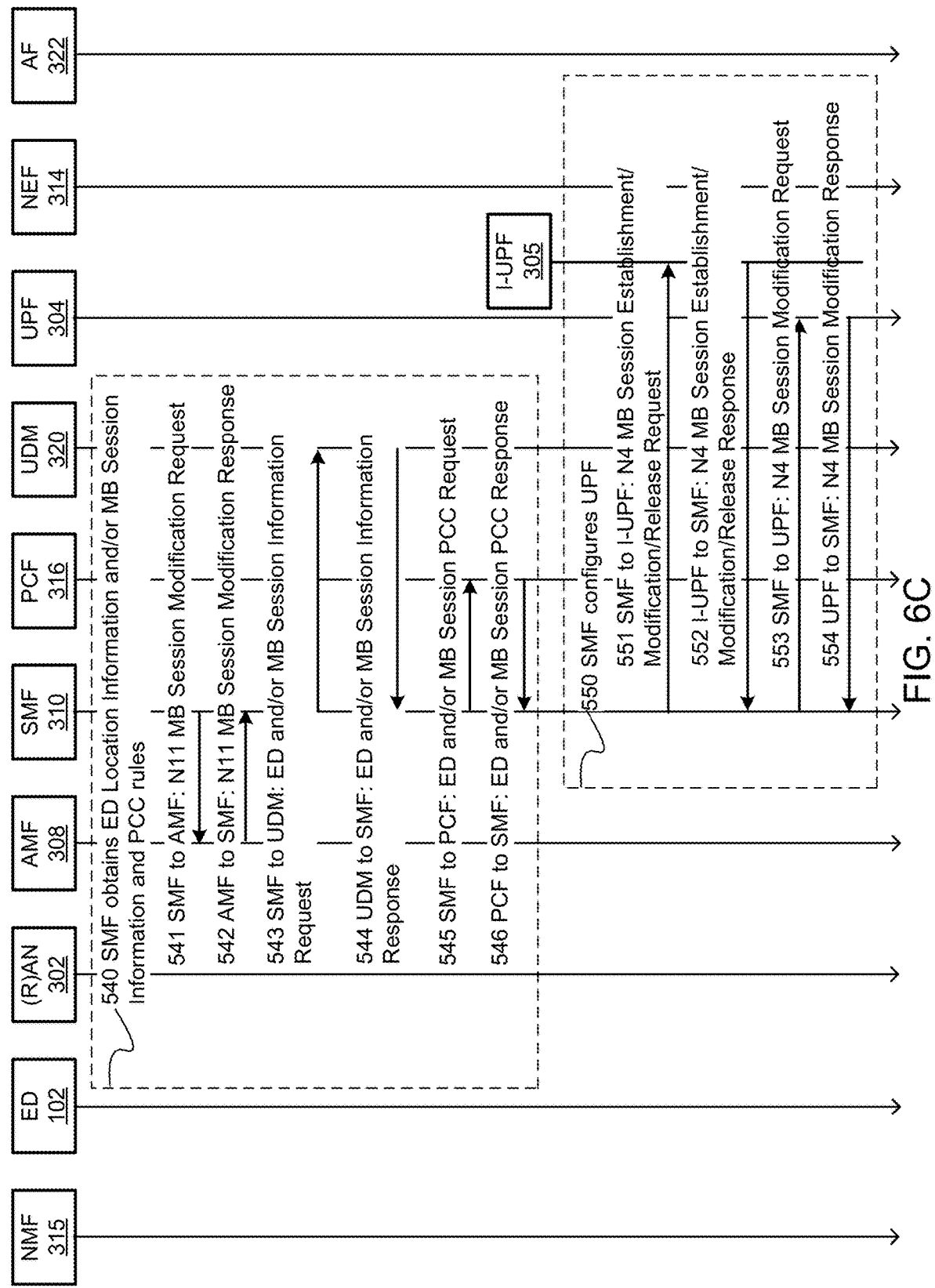
Figure 6D:
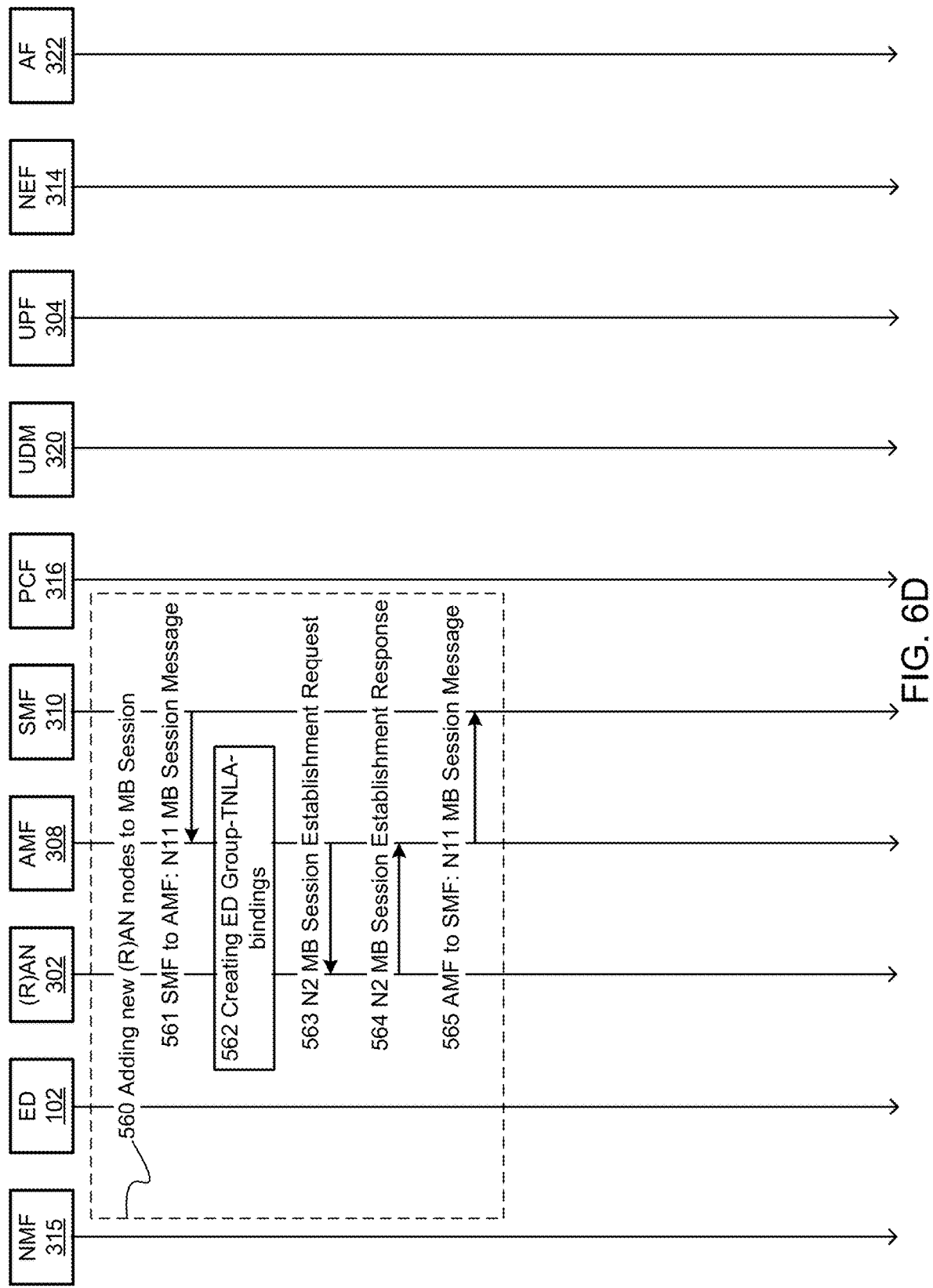
Figure 6E:
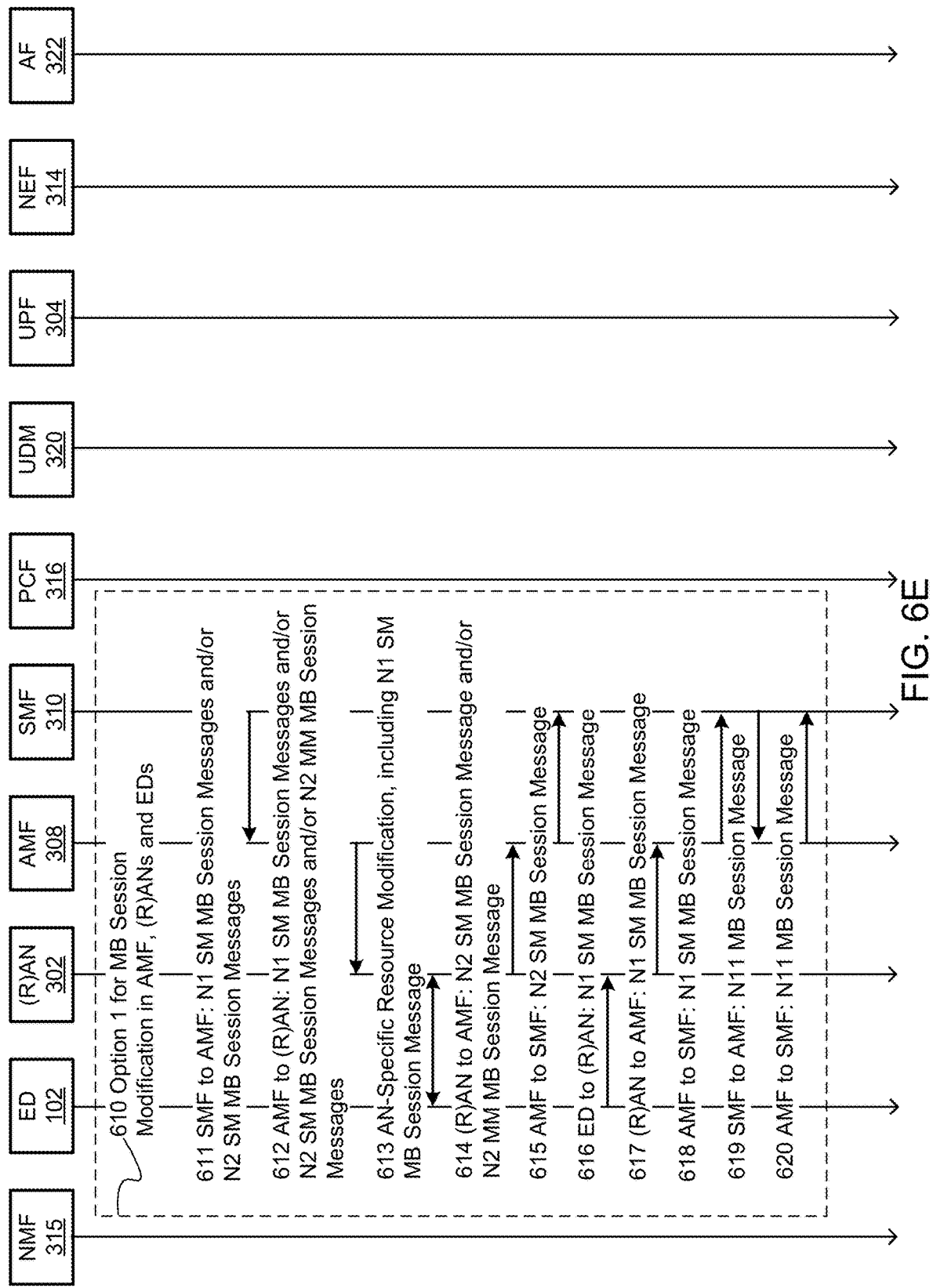

The step 550 may be also used to replace an anchor UPF 304 by another anchor UPF 306 (not shown in FIG. 6C). The steps are similar to the steps 551, 552, 553 and 554, with the following modifications.

In step 551, the SMF 310 sends N4 MB Session Establishment to the newly selected UPF 306. The SMF 310 sends information to configure the UPF 306, which is similar to the information required to configure the I-UPF 305, except the N9 tunnel information as no connection from the newly selected UPF 306 to the UPF 304. Additionally, the SMF 310 provides information about PCC rules (e.g. packet detection, enforcement and reporting rules to be installed on the UPF 306 for this PDU Session) for the N6 interface if the MB data is sent from the Data Network (not shown in FIG. 6C), or for the interface information of the NEF 314 if the MB data is sent to the NEF 314, then forwarded to the UPF 306.

In step 552, the UPF 306 sends N4 MB Session Establishment Response, which is similar to the N4 MB Session Establishment Response sends from the I-UPF 305 to the SMF 310.

In step 553, the SMF 310 sends N4 MB Session Release Request to the UPF 304 to release the MB Session Context.

In step 554, the UPF 304 sends N4 MB Session Release Response to the SMF 310.

At step 560, If new (R)AN nodes 302 are added to the MB Session, the SMF 310 and AMF 308 provide MB Session data to the new (R)AN nodes. Step 560 may be required if new (R)AN nodes join the MB Session. Otherwise, these steps may be skipped. From the information received in steps 500, 540, and 550, the SMF may identify the new (R)AN nodes 302 need to be added to the MB Session. For example, if a ED wants to receive MB data of an existing MB Session. This ED is served by a (R)AN node that is not currently joined the MB Session, the SMF 310 may decide to add this (R)AN node to the MB Session. The SMF 310 may send an N11 MB Session Message, such as MB Session Modification Request 561, to the AMF 308. The message may include ED Group ID, MB Session ID, Location Information (e.g. Geographical Zone IDs, or (R)AN Addess(es)) to be added to MB Session, N2 SM MB Session Establishment Request, N1 SM MB Session Establishment Message. N2 SM MB Session Establishment Request for each (R)AN node 302. The message may include MB Session Context information, which contains any combinations of the following information: MB Session ID, MB Session ID, ED Group ID, ED Information, MB Session Information, and if the SMF 310 knows the (R)AN address(es), the SMF 310 may include the (R)AN address(es). ED Group ID: such as Internal-Group ID, TMGI, IMSI-Group. ED Information: e.g. list of ED IDs to join the MB Session. MB Session Information: Scheduled MB Session Start Time and/or MB Session End Time, Periodical MB Session Start Time and/or End Time, Amount of MB Data, QoS parameters (e.g. QFI(s) and corresponding QoS Profile(s)), method for reliable MB data delivery for air interface and/or for N3 interface, UPF information (UPF Address, UL and DL TEID), MB Session-AMBR (Aggregated Maximum Bit Rate), MB Session type, network slice information (e.g. S-NSSAI). The SMF 310 may include N1 SM MB Session Establishment Message to be sent to EDs 102. The N1 MB Session Establishment message may include any combinations of the following information: MB Session ID, MB Session Information, QoS parameters (e.g. QFI(s) of QoS flows and corresponding QoS Profile(s)), MB Session-AMBR, and network slice information (e.g. S-NS-SAI). MB Session Information may include Scheduled MB Session Start Time and/or MB Session End Time, or Periodical MB Session Start Time and/or End Time, Amount of MB Data. Note that the Session End Time could be omitted if the MB Session has no scheduled end time. The QoS Profile for the ED 102 (which for the ED is referred to as QoS rule(s)) contains QoS parameters that the ED 102 may use in case the ED 102 needs to receive the MB data in the downlink, or to send UL data to the application server in the data network to respond to the DL MB data. For example, the MB data may contain a message to request the ED 102 to send UL data. The ED 102 may use the QoS rule(s) provided by the SMF 310 to send the UL data.

The AMF 308 then creates the ED group-TNLA-bindings 562. The TNLA stands for Transport Network Layer Association. In case new (R)AN nodes need to be added to the MB Session, the AMF may establish TNL association for the ED Group with the new (R)AN node(s), which is NGAP (Next Generation Application Protocol) ED Group-TNLA-binding, for sending control information for the ED Group ID and MB Session. The AMF 308 may know the (R)AN Addresses by some of the following information: the SMF 310 provides (R)AN Address(es) from 561; the AMF 308 checks the ED Contexts from the provided ED IDs and reads the ED Location, which could be the (R)AN Address(es) that serve the ED(s); MB Session Context; and ED Group Context.

The AMF 308 may send the N2 MB Session Establishment Request and N1 MB Session Establishment message 563. The message may contain: N2 SM Message received in message 561 to the (R)AN 302; N1 MB Session Establishment message for ED that have ED IDs in the N2 SM message; Access and Mobility parameters: e.g. Encryption information that is used to encrypt the MB data over the air interface. The (R)AN node 302 may create an ED Group Context for the ED group and the MB Session Context. If the N1 MB Session Establishment message sent from the AMF 308, the (R)AN 302 may store this message in the MB Session Context and sends this message to the ED 102 in a radio control channel (not shown in FIG. 6D).

The (R)AN 302 may send the N2 SM MB Session Establishment Response 564 to the AMF 308. The message may include the MB Session ID. After receiving all N2 SM MB Session Establishment Response messages from (R)AN nodes 302, the AMF 308 forwards the N2 SM MB Session Establishment Responses and may also send MB Session Modification Response 565 to the SMF.

Step 600: MB Session Modification in AMF, RAN, and EDs will now be discussed. This general step has multiple options, depending on the situation (e.g., which trigger was received). The options 1-7 of Table 1 correspond to steps 610, 630, 640, 650, 660, 670 and 680.

Step 610 represents option 1 of step 600, and includes the sending of messages 611-620. Option 1 can be used for an MB Session that serves a group of EDs, in which the SMF 310 may send N1 SM messages to individual EDs. Step 610 includes the following steps. The SMF 310 sends messages 611 to the AMF 308. From the information received in steps 500, 540 and 550, the SMF identifies the EDs and (R)AN nodes to modify the MB Session. The SMF 310 may send to the AMF 308 multiple N1 SM MB Session messages and multiple N2 SM MB messages as follows.

If some new EDs join the MB Session (e.g. triggers 511 or 520), the SMF 310 may send an N1 SM MB Session Establishment Request 611 to the AMF 308 for each new ED. The message may include MB Session ID, ED ID, QoS parameters, and MB Session Parameters. The MB Session Parameters may include: Scheduled MB Session Start Time and/or MB Session End Time, Periodical MB Session Start Time and/or End Time, Amount of MB Data. The QoS parameters may include QFI and QoS rules, consisting of Session-AMBR for non-GBR MB Session, or MFBR and MGBR for GBR MB Session.

If the MB Session needs to be modified, the SMF 310 may send an N1 SM MB Session Modification Request 611 to the AMF 308 for each ED. The message may include MB Session ID, ED ID, and Parameters to be changed. The Parameters to be changed may be: Scheduled MB Session Start Time and/or MB Session End Time, Periodical MB Session Start Time and/or End Time, Amount of MB Data, QoS parameters.

If the network or AF 322 decided that some EDs leave the MB Session, the SMF 310 may send an N1 SM MB Session Release Request 611 to the AMF 308 for each ED. The message may include MB Session ID, ED ID, and Cause. The Cause indicates reason to release the MB Session, e.g. End of MB Session, Network Maintenance.

If the ED 102 decided to leave the MB Session, the SMF 310 may send an N1 SM MB Session Release Response message 611 to the AMF 308 for each ED that leaves the session. If the ED 102 sent N1 SM MB Session Release Request in step 520, the SMF 310 may send N1 SM MB Session Release Response. The message may include MB Session ID, ED ID, and Cause. The Cause indicates reason to release the MB Session, e.g. ED Request to leave the MB Session.

If the MB Session is established in new (R)AN nodes 302, the SMF 310 may send an N2 SM MB Session Establishment Request 611 to the AMF 308 for each new (R)AN node, which may include: (R)AN Address(es): for the AMF 308 to send the N2 SM MB Session message to the (R)AN nodes 302; Network Slicing information: e.g. S-NSSAI; MB Session ID; ED Group ID: such as Internal-Group ID, TMGI, IMSI-Group; ED Information: e.g. list of ED IDs to join the MB Session; and MB Session Parameters: Scheduled MB Session Start Time and/or MB Session End Time, Periodical MB Session Start Time and/or End Time, Amount of MB Data, QoS parameters, method for reliable MB data delivery for air interface or for N3 interface, UPF information (UPF Address, UL and DL TEID).

If the MB Session is modified, the SMF 310 may send an N2 SM MB Session Modification Request 611 to the AMF 308 for each (R)AN node. The message may include MB Session Context information: (R)AN Address(es), MB Session ID, ED Group ID (e.g., Internal-Group ID, TMGI, IMSI-Group), ED Information (e.g. list of ED IDs to join or leave the MB Session), and MB Session Parameters to be changed. (R)AN Address(es): for the AMF 308 to send the N2 SM MB Session message to the (R)AN nodes 302. The MB Session Parameters to be changed can include, for example, Scheduled MB Session Start Time and/or MB Session End Time, Periodical MB Session Start Time and/or End Time, Amount of MB Data, QoS parameters, method for reliable MB data delivery for air interface or for N3 interface, UPF information (UPF Address, UL and DL TEID).

If the MB Session is released in some (R)AN nodes 302, the SMF 310 may send an N2 SM MB Session Release Request 611 to the AMF 308 for each (R)AN node 302 to be released. If the SMF 310 received a request to remove (R)AN node(s) 302, the SMF 310 may send the N2 SM MB Session Release Request 611 to the AMF 308 for each of the (R)AN nodes 302 to be released. The message may include the (R)AN Address, Cause. The Cause indicate the reason to release the MB Session at (R)AN node, which the SMF 310 received in Step 1.

N2 SM MB Session Release Response: If the SMF 310 received a request from (R)AN node(s) to leave an MB Session, the SMF 310 sends N2 SM MB Session Release Response 611 to the AMF 308 for the requested (R)AN node 302. The leaving (R)AN node may delete the MB Session Context.

N2 SM UP Deactivation Request: If in step 500, the SMF 310 received a request to deactivate the UP connections of MB Sessions, for example from AF, or at the scheduled End Time of MB Session, or the UPF reports MB Session Inactivity (i.e., no data transfer detected by the UPF for this MB Session), the SMF 310 may send N2 SM UP Deactivation Request message 611 to the AMF 308 for each (R)AN node. The (R)AN node shall delete the MB Session Context. The (R)AN node 302 may perform an RRC procedure with the EDs to release the radio resources.

N2 SM UP Activation Request: If in step 500, the SMF 310 received a request to activate the UP connections, e.g. from the AF 322, or at the time of Scheduled Start Time of MB Session, the SMF 310 may send N2 SM UP Activation Request 611. The content of N2 MB UP Activation Request message 611 may be the same as the content of N2 SM MB Session Establishment Request message.

The AMF 308 forwards the messages received from the SMF 310 to (R)AN nodes 302 as message(s) 612. If some new (R)AN nodes 302 are added to the MB Session, the AMF 308 may send an N2 MM message 612, such as N2 MM MB Session Establishment Request to the new (R)AN node. The message 612 may include the whole N2 SM MB Session Establishment Request, or the information in the N2 SM MB Session Establishment Request. The N2 MM message 612 may include the access and mobility management information, e.g., the encryption information that an ED needs to decode the MB Data in the air interface, and the Network Slice Information (e.g. S-NSSAI).

If the MB Session Context is to be deleted or established, the (R)AN node 302 may perform AN-specific procedure to release or establish the radio resources with the EDs 102. The (R)AN 302 sends the N1 SM MB Session Message 613 to each ED indicated by the SMF 310.

Each (R)AN node 302 may send to the AMF 308 an N2 SM MB Session Message 614 to response to the N2 SM MB Session Message 612 that the AMF 308 sent. For MB Session Establishment in (R)AN, the (R)AN node 302 may send an N2 SM MB Session Establishment Response to the SMF 310, which may include the list of ED IDs that successfully joined the MB Session and/or the list of ED IDs that have not joint the MB Session. The (R)AN node 302 may send an N2 SM MB Session Establishment Response to the AMF 308.

The AMF 308 then forwards the N2 SM MB Session Message 615 to the SMF 310.

Each ED 102 may send to (R)AN 302 an N1 SM MB Session Message 616 in response to N1 SM MB Session message 611 sent by the SMF 310.

The (R)AN 302 forwards the N1 SM message 617 to the AMF 308 via N2 interface.

The AMF 308 forwards the N1 SM message 618 to the SMF 310.

After receiving all N1 SM MB Session Message Responses 616 from EDs 102 and N2 SM MB Session Message Responses 616 from (R)AN node(s) 302, the SMF 310 may send an N11 Session Modification Request 619 to the AMF 308. The Message 619 may include the (R)AN nodes that join or leave the MB Session and the list of ED IDs that join or leave the MB Session.

The AMF 308 updates the MB Session Context and may send subscribe or unsubscribe messages (not shown) to the CP functions, e.g. UDM 320, PCF 316, NEF 314, if the AMF 308 wants to receive or stop receiving notification services for the (R)AN locations or EDs, from these functions. The AMF 308 sends an N11 Session Modification Response 620 to the SMF 310. The message 620 may include the MB Session ID.

Step 630 represents option 2 of step 600, and includes the sending of messages 631-637. In this embodiment, the SMF 310 does not send N1 SM MB Session messages (such as N1 SM MB Session Establishment/Modification/Release Request) to the individual EDs. Rather, the SMF sends N2 SM MB Session Establishment/Modification/Release messages to individual (R)AN nodes. Each (R)AN nodes may send RRC message to the EDs. After performing the MB Session Establishment/Modification/Release Request in the (R)AN 302, the SMF 310 notifies the AMF 308 about MB Session Modification. Step 630 includes the sending messages 631-637.

From the information received in steps 500, 540, 550, 560, the SMF 310 may identify the EDs 102 and (R)AN 302 nodes to modify or release the MB Session. The SMF 310 may send to the AMF 308 multiple N2 SM MB Session Modification (or Establishment, or Release) Requests 631. It is noted that in some embodiments, each N2 SM MB Session Modification (or Establishment, or Release) Request 631 is for one (R)AN node 302, with a N2 SM MB Session Modification (or Establishment, or Release) Request 631 being sent to each (R)AN node involved in the MB session. The message 631 may include MB Session ID, information to identify ED Group (such as Internal Group ID, TMGI, IMSI-Group), and information to identify specific EDs (e.g. list of ED IDs (SUPI, TMSI, 5G GUTI, GPSI), S-NSSAI), Parameters to be changed and their new values, and Cause. The Cause is used to indicate the reason to modify or release the MB Session, for example network maintenance, network error, end of MB Session. The parameters to be changes are described above with reference to Step 610. If a (R)AN 302 will join an existing MB Session, the SMF 310 may provide information similar to that described in message 611 (N2 SM MB Session message).

The AMF 308 forwards the messages 632 received from the SMF 310 to (R)AN nodes 302. If a (R)AN 302 will join an existing MB Session, the AMF 308 may provide information similar to that described in message 612 (N2 MM MB Session message).

The (R)AN node 302 may perform AN-specific procedure, such as sending RRC messages 633 to the EDs, to modify the radio resources if the QoS parameters are changed, or to release the radio resources if the MB Session is released in this (R)AN node 302. The RCC message 633 may include the MB Session ID, the Cause, ED IDs. If a (R)AN will join an existing MB Session, the AMF 308 may provide information similar to that described in message 612 (N2 MM MB Session message).

Each (R)AN node 302 may send to the AMF 308 an N2 SM MB Session Establishment, or Modification, or Release Response 634 over N2 interface for the SMF 310. The message 634 may include MB Session ID. If a (R)AN 302 joins an existing MB Session, the AMF 308 may provide information similar to that described in message 614 (N2 SM MB Session message). It is noted that the N2 SM MB Session Establishment, or Modification, or Release Response 634 is a response of the group of ED's involved in the MB session and served by the (R)AN node sending the message.

The AMF 308 forwards the N2 SM MB Session Establishment, or Modification or Release Response 635 to the SMF 310. The message 635 may include MB Session ID. After receiving all N2 SM MB Session Release Establishment, or Modification or Response 635 from (R)AN node(s) 302, the SMF 310 may send an N11 Session Modification Request 636 to the AMF 308 if some EDs or (R)AN nodes join or leave the MB Session. The message 636 may include: MB Session ID, ED Group ID; the list of ED IDs that left or joint the MB Session; and the list of (R)AN Address(es) that joint or left the MB Session.

The AMF 308 updates the MB Session Context and may send Subscribe or Unsubscribe messages (not shown) to the CP functions, e.g. UDM, PCF, NEF, if the AMF wants to receive or stop receiving notification services of these functions for some (R)AN locations or for some ED ID(s). The AMF 308 sends an N11 Session Modification Response 637 to the SMF 310. The message may include the MB Session ID. The SMF 310 and AMF 308 update all the MB Session Context. The SMF may send Subscribe or Unsubscribe messages to CP functions, such as UDM, PCF, NEF, AMF to subscribe or unsubscribe notification services for the new ED IDs or the ED that left the MB Session.

In option 2 (step 630), the SMF 310 sends N2 SM messages to (R)AN nodes 302. Accordingly, the SMF 310 need not send N1 SM messages to the individual EDs. This solution is suitable for broadcast scenario or multicast to a large group of EDs, as it reduces the control plane signaling compared to sending a message to the individual EDs.

FIG. 6G illustrates step 640, which represents option 3 of step 600, and includes the sending of messages 641-645. Generally in this embodiment, the SMF sends only one N11 message to the AMF 308 to request MB Session Modification. The signaling overhead is minimal. More specifics of the steps and messages of this option 3 are as follows.

From the information received in steps 500, 540, 550, 560, the SMF 310 identifies the (R)AN node(s) to modify the MB Session. The SMF 310 sends to each AMF 308 a message, such as N11 MB Session Modification Request 641, to modify or release the MB Session in some (R)AN nodes. This message 641 is sent to the AMF 308 for a group of (R)AN node(s), for example including the (R)AN nodes that have joint the MB Session and the (R)AN nodes that were bound to the MB Session in step 562 of FIG. 6D. The message may include: MB Session ID; ED Group information: e.g. such as Internal-Group ID, TMGI, IMSI-Group; (R)AN information: such as Geographical Zone IDs, (R)AN address(es), to be added or removed from MB Session; ED information: e.g. list of ED IDs (SUPI, TMSI, 5G GUTI, GPSI), S-NSSAI, to be added or removed from MB Session; parameters to be changed and their new values: e.g. the parameters described above with respect to Option 1; and Cause. The Cause is used to indicate the reason to release the MB Session, for example network maintenance, network error, end of MB Session, policy change, the MB service is no longer available to the ED Group.

From the information received from SMF 310 and the MB Session Context and/or ED Group Context, and/or ED Context, the AMF 308 identify the (R)AN nodes 302 to send messages to. The AMF 308 creates a message, such as N2 MM MB Session Establishment, or Modification or Release Request 642, to send to each (R)AN node 302. The message may include the information received in message 641.

The N2 MM MB Session Establishment Request: If the SMF 310 sends the list of (R)AN nodes 302 to join an existing MB Session, the SMF 310 may include information to establish MB Session Context in the (R)AN node 302. This information is similar to that described in message 611 (N2 SM MB Session message) of FIG. 6E. The AMF 308 shall include the information received from the SMF 310 in the N2 MM MB Session Establishment Request. The AMF 308 also includes access and mobility management information, which is similar to that described in message 612 (N2 MM MB Session Messages, e.g. security information) in FIG. 6E. The N2 MM MB Session Modification Request 642 may include, e.g. MB Session ID, ED Group ID; List of EDs to be added or to be removed from the MB Session; SM Parameters to be changed and their new values, MM parameters to be changed (e.g. new security information). Alternatively, an N2 MM MB Session Release Request 642 may include, e.g. MB Session ID, and ED Group ID.

The (R)AN node 302 may perform AN-specific procedure, such as exchanging RRC messages to the EDs, to establish or release the radio resources with the EDs. The RCC message 643 may include the MB Session ID, the Cause, ED IDs.

Each (R)AN node 302 may send to the AMF 308 a message, such as N2 MM MB Session Establishment, or Modification, or Release Response 644, over N2 interface to confirm the establishment, or modification or release of MB Session. The message 644 may include MB Session ID, ED Group ID, RAN information (e.g. RAN Address), and a list of ED IDs that successfully added to the MB Session or a list of ED IDs that leave the MB Session.

After receiving all the responses from (R)AN nodes, the AMF 308 may send a message, such as N11 MB Session Modification Response 645, to the SMF. The message 645 may include MB Session ID, information on ED Group (e.g. Internal-Group ID, TMGI, IMSI-Group ID), and a list of ED IDs that successfully added to the MB Session, or the list of ED IDs that left the MB Session.

FIG. 6H illustrates step 650, which represents option 4 of step 600, and includes the sending of messages 651-657. Generally in this embodiment, the SMF 310 sends only one N11 message to the AMF 308, to establish, modify, or release the MB Session. The AMF may send an N1 MM common message to individual EDs 102. This can have the advantage for reducing N1 SM messages transmitted between AMF and SMF. More specifics of the steps and messages of this option 4 are as follows.

From the information received in steps 500, 540, 550, 560, the SMF 310 identifies the AMF(s) and (R)AN nodes to modify the MB Session. The SMF may send to each AMF a message, such as N11 MB Session Modification Request 651, to modify the MB Session. The message may include: MB Session ID; ED Group information: e.g. such as Internal-Group ID, TMGI, IMSI-Group; (R)AN information: such as Geographical Zone IDs, (R)AN address(es), to be added or removed from MB Session; ED information: e.g. list of ED IDs (SUPI, TMSI, 5G GUTI, GPSI), S-NSSAI, to be added or removed from MB Session; parameters to be changed: e.g. the parameters described above with respect to Option 1; Cause: the Cause is used to indicate the reason to release the MB Session, for example network maintenance, network error, end of MB Session, policy change, the MB service is no longer available to the ED Group.

From the information received from SMF 310, ED Group Context, and/or MB Session Context, and/or ED Context, the AMF identify the (R)AN nodes to send messages to. The AMF creates a message, such as N2 MM MB Session Establishment/Modification/Release Request 652, to send to each (R)AN node. The N2 MM MB Session Establishment Request: If the SMF 310 sends the list of (R)AN nodes to join an existing MB Session, the SMF 310 may include information to establish MB Session Context in the (R)AN node 302. This information is similar to that described in message 611 (N2 SM MB Session message) if FIG. 6E. The AMF 308 shall include the information received from the SMF 310 in the N2 MM MB Session Establishment Request. The AMF 308 also includes access and mobility management information, which is similar to that described in message 612 (N2 MM MB Session Messages, e.g. security information) in FIG. 6E. The N1 MM MB Session Establishment Request may contain the information received from the SMF 310 to be sent to the ED 102, this information is similar to that described in message 611 (N1 SM MB Session Messages) of FIG. 6E. The N2 MM MB Session Modification Request 652 may include, e.g. MB Session ID, ED Group ID; List of EDs to be added or to be removed from the MB Session; SM Parameters to be changed, MM parameters to be changed (e.g. new security information). Alternatively, an N2 MM MB Session Release Request 652 may include, e.g. MB Session ID, and ED Group ID.

The message 652 may include a common N1 MM MB Session Establishment/Modification/Release Request, for (R)AN 302 to send to individual EDs. The message may include the MB Session ID, the ED ID, the Cause. The Cause is the Cause received above (message 651). The N1 MM MB Session Establishment/Modification/Release Request may contain the session management information received from the SMF 310 in message 651 corresponding to MB Session Establishment, or Modification, or Release.

The (R)AN node 302 may perform AN-specific procedure, such as exchanging RRC messages 653 to the EDs, to release the radio resources with the EDs. The (R)AN 302 may send the N1 MM message to the ED.

Each (R)AN node 302 may send to the AMF 308 a message, such as N2 MM MB Session Establishment, or Modification or Release Response 654, over N2 interface to confirm the establishment, or modification or release of MB Session. The message may include MB Session ID, ED Group ID, RAN information (e.g. RAN Address).

Each ED 102 may send a message, such as N1 MM MB Session Establishment/Modification/Release Response 655, towards the AMF 308 via (R)AN 302. The message may include the MB Session ID, the ED ID.

The (R)AN 302 forwards the N1 MM message to the AMF 308 as message 656.

After receiving all the responses from (R)AN nodes 302, and optionally from all EDs, the AMF 308 may send a message, such as N11 MB Session Modification Response 657, to the SMF 310. The message may include MB Session ID, information on ED Group (e.g. Internal-Group ID, TMGI, IMSI-Group ID).

FIG. 6I illustrates step 660, which represents option 5 of step 600, and includes the sending of messages 661-668. Generally in this embodiment, the SMF 310 sends an N11 message to the AMF 308 and an N1 SM message to all EDs. Each ED 102 can confirm MB Session modification or release individually.

More specifics of the steps and messages of this option 5 are as follows.

From the information received in steps 500, 540, 550, 560, the SMF 310 identifies the AMF(s) to modify the MB Session. The SMF 310 sends to each AMF 308 a message, such as N11 MB Session Modification Request 661, to modify the MB Session. The message may include: MB Session ID; ED Group information: e.g. such as Internal-Group ID, TMGI, IMSI-Group; (R)AN information: such as Geographical Zone IDs, (R)AN address(es), to be added or removed from MB Session; ED information: e.g. list of ED IDs (SUPI, TMSI, 5G GUTI, GPSI), S-NSSAI, to be added or removed from MB Session; Parameters to be changed: e.g. the parameters described above with respect to Option 1; Cause; the Cause is used to indicate the reason to release the MB Session, for example network maintenance, network error, end of MB Session, policy change, the MB service is no longer available to the ED Group. Note that for adding new EDs to an existing MB Session, the SMF 310 may include the ED information, but no (R)AN information. The AMF 308 may identify the (R)AN node(s) 302 that serve the EDs by using ED Context information in the AMF 308. In some other embodiments, if the new (R)AN nodes 302 are added to an existing MB Session, the SMF 310 may include MB Session information as described in option 1 to establish MB Session in a (R)AN node 302.

The SMF 310 may also include in the N11 message a common N1 SM message, such as a common N1 SM MB Session Establishment, or Modification or Release Request 661 via (R)AN. The common N1 SM message 661 may include the new parameters of SM Session, which are described above with respect to Option 1.

From the information received from the SMF 310, the AMF 308 identifies the (R)AN nodes 302 currently serving the MB Session, or new (R)AN nodes to join the MB Session. The AMF 308 may create a message, such as N2 MM MB Session Modification or Release Request 662, to send to each (R)AN node 302. The N2 MM MB Session Modification Request 662 may include the MB Session ID, the information to identify ED Group (e.g. Internal-Group ID, TMGI, IMSI-Group), information to identify EDs (e.g. ED IDs (5G GUTI, SUPI, TMSI)), and access and mobility parameters (e.g. security information), and other parameters to be changed received from the SMF. The message may include information received from the SMF 310 to establish MB Session in the (R)AN node. Alternatively, the N2 MM MB Session Release Request 662 may include the MB Session ID, the information to identify ED Group (e.g. Internal-Group ID, TMGI, IMSI-Group), and Cause. The Cause is the Cause received from the SMF.

The AMF 308 may also include in the N2 message 662 the common N1 SM MB Session Release Request received in message 661 to be sent to individual EDs.

The (R)AN node 302 may perform AN-specific procedure, such as exchanging RRC messages 663 with the EDs 102, to modify or release the radio resources with the EDs 102. Based on the ED information in the N2 MM message 662, the (R)AN node 302 identifies to which EDs to send the N1 SM message 663.

Each (R)AN node 302 may send to the AMF 308 a message, such as N2 MM MB Session Establishment, or Modification or Release Response 664, over N2 interface. The message 664 may include MB Session ID, ED Group ID, RAN information (e.g. RAN Address).

After receiving all the responses from (R)AN nodes 302, the AMF 308 may send a message, such as N11 MB Session Modification/Release Response 665, to the SMF 310. The message 665 may include MB Session ID, information on ED Group (e.g. Internal-Group ID, TMGI, IMSI-Group ID).

Each ED 102 may send a message, such as N1 SM MB Session Establishment/Modification/Release Response 666, to the SMF 310 via (R)AN 302 and AMF 308. The message 666 may include the MB Session ID, the ED ID.

The (R)AN 302 forwards the N1 SM message 666 to the AMF 308 as message 667.

The AMF 308 forwards the N1 SM message 667 to the SMF 310 as message 668. The AMF 308 may wait to receive all N1 SM messages from the ED(s) and send them all to the SMF 310. Alternatively, the AMF 308 may send individual N1 SM message to the SMF 310.

Figure 6J:
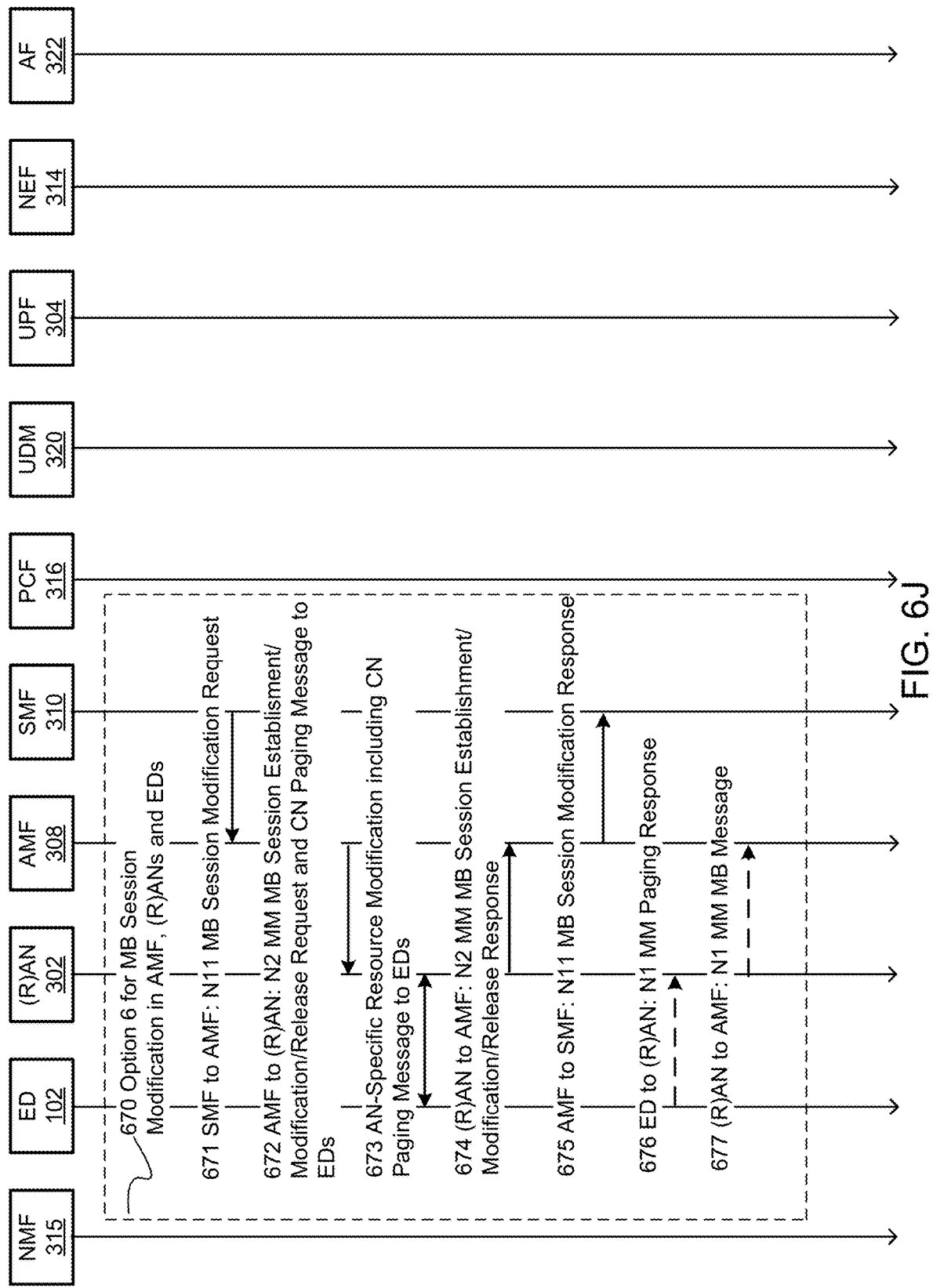

FIG. 6J illustrates step 670, which represents option 6 of step 600, and includes the sending of messages 671-677. More specifics of the steps and messages of this option 6 are as follows.

From the information received in steps 500, 540, 550, 560, the SMF 310 identifies the AMF(s) and/or (R)AN nodes to modify or release the MB Session. The SMF 310 sends to each AMF 308 a message, such as N11 MB Session Modification Request 671, to modify the MB Session. The message may include: MB Session ID; ED Group information: e.g. such as Internal-Group ID, TMGI, IMSI-Group; (R)AN information: such as Geographical Zone IDs, (R)AN address(es), to be added or removed from MB Session; ED information: e.g. list of ED IDs (SUPI, TMSI, 5G GUTI, GPSI), S-NSSAI, to be added or removed from MB Session; Parameters to be changed: e.g. the parameters described above with respect to Option 1; Cause: the Cause is used to indicate the reason to release the MB Session, for example network maintenance, network error, end of MB Session, policy change, the MB service is no longer available to the ED Group.

The SMF 310 may include other information as described in option 1 for the (R)AN 302 to establish MB Session if some (R)AN nodes 302 are added to an existing MB Session. The SMF 310 may include other information as described in option 1 for EDs 102 to establish MB Session if some EDs 102 join to an existing MB Session.

From the information received from SMF 310, the AMF 308 identifies the (R)AN nodes 302 currently serving the MB Session. The AMF 308 creates a message, such as N2 MM MB Session Establishment, or Modification or Release Request 672, to send to each (R)AN node.

If a (R)AN node 302 is added to an existing MB Session, the AMF 308 includes the information received from the SMF 310 to establish MB Session. The AMF 308 also include access and mobility information as described in option 1 for the (R)AN node 302 to establish a new MB Session Context.

If some parameters are to be modified in the (R)AN node 302, the N2 MM MB Session Modification Request may include the MB Session ID, the information to identify ED Group (e.g. Internal-Group ID, TMGI, IMSI-Group), information to identify EDs (e.g. ED IDs (5G GUTI, SUPI, TMSI)), and access and mobility parameters (e.g. security information), and other parameters to be changed received from the SMF (such as QoS parameters).

If some parameters in the ED 102 need to be changed, the AMF 308 include in the N2 MM MB Session Modification Request the parameters to be modified and their new values in the message.

If some EDs 102 are added or removed from an MB Session, the AMF indicate these ED IDs in the N2 MM MB Session Modification Request and an indication to add or remove ED IDs.

If an MB Session is released in a (R)AN node 302, the N2 MM MB Session Release Request may include the MB Session ID, the information to identify ED Group (e.g. Internal-Group ID, TMGI, IMSI-Group), and Cause. The Cause is the Cause received from the SMF.

The (R)AN node 302 may send the messages 673 to the ED based on the ED information received from the AMF 308, using some methods such as paging channel, radio control channel, or radio broadcast channel. After sending the messages to EDs 302, the (R)AN 308 may modify or release the MB Session Context.

Each (R)AN node 302 may send to the AMF 308 a message, such as N2 MM MB Session Establishment, or Modification or Release Response 674, over N2 interface to confirm the establishment, or modification or release of MB Session. The message may include MB Session ID, ED Group ID, RAN information (e.g. RAN Address).

After receiving all the responses from (R)AN nodes 302, the AMF 308 may send a message, such as N11 MB Session Modification Response 675, to the SMF 310. The message may include MB Session ID, information on ED Group (e.g. Internal-Group ID, TMGI, IMSI-Group ID).

Each ED 102 may optionally send a message, such as N1 MM paging response 676, to the AMF 308 to confirm the MB Session establishment, or modification, or release.

The (R)AN may forward the N1 MM message to the AMF 308 as message 677.

The message 675 may be sent after the AMF 308 received all the messages from the EDs 102 or after a timer in the AMF 308 is expired. The timer was started when the AMF sent the message 672 to the (R)AN 302.

Figure 6K:
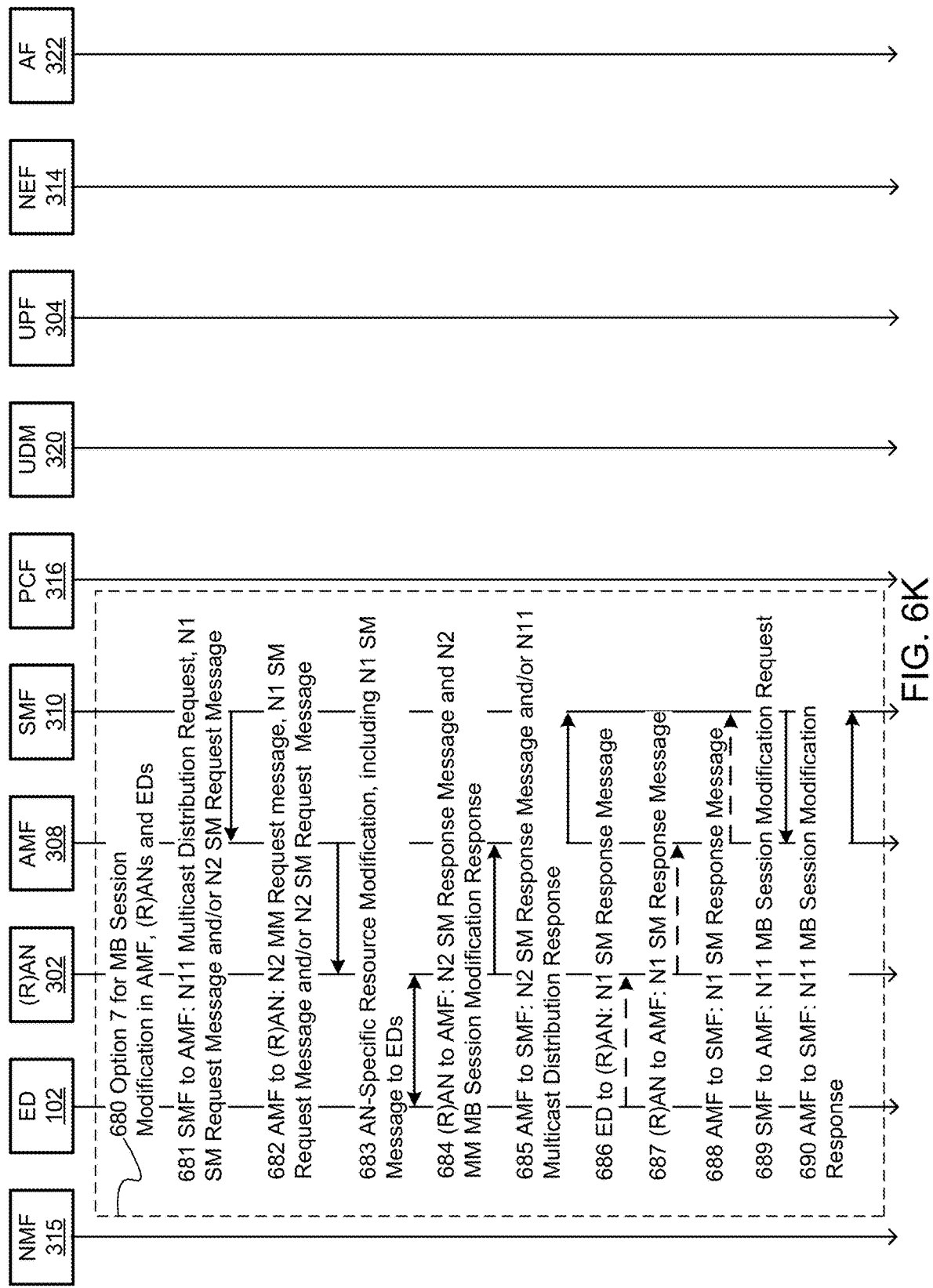

FIG. 6K illustrates step 680, which represents option 7 of step 600, and includes the sending of messages 681-690. More specifics of the steps and messages of this option 7 are as follows.

From the information received in steps 500, 540, 550, 560, the SMF 310 identifies the AMF, EDs and (R)AN nodes to modify the MB Session. The SMF 310 may send to the AMF 308, one (common) N1 SM message (such as N1 SM MB Session Modification Request) and one (common) N2 SM message (e.g. N2 SM MB Session Modification Request) 681. The SMF 310 may send one N11 message, e.g. N11 Multicast Distribution Request, to request the AMF 308 to send the N1 SM MB message and N2 SM MB message to multiple EDs and multiple (R)AN nodes 302, respectively.

The N11 Multicast Distribution Request message may include the MB Session ID, the ED Group ID, list of ED IDs to send the N1 SM message, the list of (R)AN Addresses to send the N2 SM message to. In some embodiments, the list of (R)AN Addresses may be omitted. The AMF 308 may identify the (R)AN Addresses from the list of ED IDs.

The N1 SM Request message could be an N1 SM MB Session Modification Request, which is to be sent to all EDs that have been identified by the information in the N11 Multicast Distribution Request. The message may include MB Session ID, SM parameters, and new QoS parameters and/or new QoS rules.

The N1 SM Request message could be an N1 SM MB Session Establishment Request, which is to be sent to EDs 102 that have been identified by the information in the N11 Multicast Distribution Request. The message may include MB Session ID, SM parameters, and new QoS parameters and/or new QoS rules. The information to establish MB Session is similar to that described in option 1.

The N2 SM Request message could be an N2 SM MB Session Modification Request, which is to be sent to all (R)AN nodes 102. The message may include MB Session ID, ED Group ID (such as Internal-Group ID, TMGI, IMSI-Group), list of ED IDs (e.g. SUPI, GPSI, TMSI), SM parameters, and new QoS parameters and/or new QoS profiles. The SM parameters may contain the list of ED to be added to the MB Session, or the list of ED IDs to be removed from the MB Session.

The N2 SM Request message could be an N2 SM MB Session Establishment Request, which is to be sent to all (R)AN nodes 302 that join the MB Session. The information to establish MB Session in the (R)AN node is similar to those described in option 1.

The AMF 308 may distribute the N1 SM and N2 SM messages received from the SMF 310 to (R)AN nodes 302 via messages 682. From the information in N11 Multicast Distribution Request and the information in the MB Session Context of AMF 302, ED Context or ED Group Context, the AMF 308 identifies the (R)AN nodes 302 to send the N1 SM messages and N2 SM messages. The AMF 308 sends the N1 SM message and the N2 SM message to the identified (R)AN nodes 302. The AMF 308 may include an N2 MM Session Modification Request message that may include the list of ED IDs (e.g. SUPI, IMSI, GPSI), MB Session ID, access and mobility parameters (e.g. security information for air interface connection between the ED 102 and (R)AN node 302).

In case the N2 SM MB Session Establishment Request is to add new (R)AN nodes 302 to an existing MB Session, the AMF 308 may establish a new control channel for the MB Session as described in option 1; this step is not shown in FIG. 6K. The AMF 308 may send additional access and mobility information in the N2 MM Request message, as described in option 1 for (R)AN node 302 to establish the MB Session.

From the information received in the N2 MB SM Session Modification Request, and/or the N2 MM Request messages, and/or the MB Session Context of (R)AN node, the (R)AN node 302 may identify the ED IDs in case the (common) N1 SM message is received together with the N2 SM message. The (R)AN 302 may perform AN-specific procedure to establish the radio resources with the new EDs, or modify the radio resources according to the new QoS profile and new ED information, or to release radio resources in the EDs that leave the MB Session. The (R)AN may send the (common) N1 SM Request message 683 to the EDs 102 if the N1 SM Request message is received using a UE-specific control channel, or a paging channel, or a broadcast channel.

Each (R)AN node 302 sends to the AMF 308 an N2 SM Response message, such as N2 SM MB Session Establishment, or Modification, or Release Response 684. The message may include MB Session ID and the list of ED IDs that have received the N1 SM message. The (R)AN 302 node may or may not wait for the N1 SM Response message before sending the N2 SM Response message to the AMF 308.

The AMF 308 forwards the N2 SM Response message to the SMF 310 in message 685. Alternatively, the AMF 308 may collect all the responses from the (R)AN nodes 302 and send only one N11 Multicast Distribution Response to the SMF 310.

In case the N1 SM Request message (e.g. N1 SM MB Session Modification Request) is sent to the ED, each ED 102 may send an N1 SM Response 686, e.g. N1 SM MB Session Establishment, or Modification, or Release Response, to the SMF 310 via (R)AN 102.

The (R)AN 302 forwards 687 the N1 SM message to the AMF 308 via N2 interface.

The AMF 308 forwards the N1 SM message to the SMF 310 via message 688. Alternatively, the AMF 308 may collect all the responses from the (R)AN nodes 302 and EDs 102, and may send only one N11 Multicast Distribution Response to the SMF 310.

After a timer expires or after receiving all N1 SM Response message, e.g. N1 SM MB Session Modification Response, from EDs 102 and N2 SM Response message, such as N2 SM MB Session Modification Response from (R)AN node(s) 302, the SMF 310 may send an N11 Session Modification Request 689 to the AMF 308. The message may include: the (R)AN nodes 302 that joined or left the MB Session, and list of ED IDs 102 that joint or left the MB Session.

The AMF 308 may update the MB Session Context and/or ED Group Context. The AMF 308 may send unsubscribe messages to the CP functions, e.g. UDM 320, PCF 316, NEF 314, if the AMF 308 subscribed to notification services of these functions, the notification messages are related to the (R)AN addresses, or to the ED IDs, or to the MB Session. The AMF 308 may send an N11 Session Modification Response 690 to the SMF 310. The message may include an identifier to identify the MB Session ID.

Figure 6L:
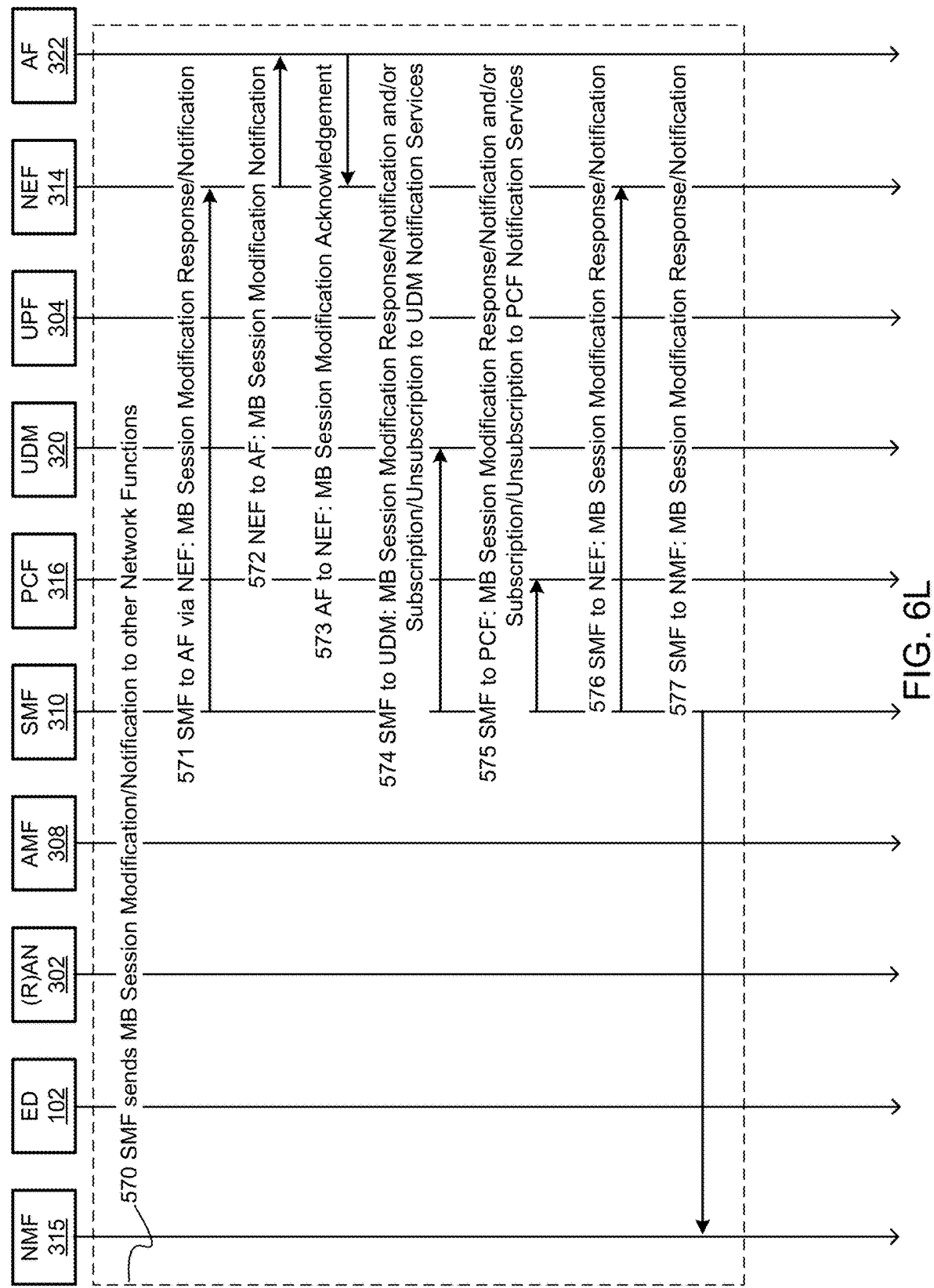

FIG. 6L illustrates step 570, which typically follows one of the options of step 600, in which the SMF 310 sends MB Session Modification Notifications to other Network Functions, and includes the sending of messages 571-577. The type of notification and the destination of the notification can depend on such factors as which trigger occurred, and which option of step 600 occurred. More specifics of the steps and messages of this step 570 are as follows.

Messages 571, 572 and 573 relate to method steps of the SMF 310 sending MB Session Modification Response or Notifications to the AF 322 via NEF 314. The SMF 310 sends MB Session Modification Response or Notification 571 to the NEF 314.

If the AF 322 sent MB Session Modification Request in step 500, the SMF 310 sends MB Session Modification Response to the AF 322 via NEF 314 to confirm the completion of MB Session modification. The message may include the MB Session ID, ED Group ID (e.g. Internal-Group ID, IMSI-Group ID, TMGI, or External Group ID), List of ED IDs that the changes have been successfully made, or the List of ED IDs that the changes have not been made, Cause. The Cause indicates the reason for unsuccessful modification, such as MB Service not available in some geographical locations, or in some (R)AN nodes. The message may include a transaction ID, which is sent in the request of AF 322.

If other functions, not AF 322, have sent the MB Session Modification Request in step 500, the SMF 310 may send an MB Session Modification Notification to the AF 322 to notify the changes. The message may include MB Session ID, ED Group Information, ED Information, Location Information, QoS Information, NF information, Cause. ED Group Information: the ED group ID that have modifications, e.g. External Group ID, Internal-Group ID, IMSI-Group, TMGI. ED Information: e.g. the list of ED IDs joining the MB Session, the list of ED IDs leaving the MB Session, the list of ED IDs that are unreachable or out of service failing to perform registration procedure. Location Information: the Locations (e.g. Geographical Zone IDs, (R)AN Address(es)) that have been added or removed from the MB Session. QoS Information: the QoS parameters of MB Session that have been changed, e.g. MFBR, GFBR. NF Information: e.g. new UPF (IP Address, Port number, new error correction protocol for N6 interface), new NEF Address (new IP Address of NEF), new PCF (e.g. new IP Address of PCF). Cause: indicates the reason for MB Session modification, e.g. the NF maintenance or failure, radio resources shortage or outage, unavailable radio network coverage.

The NEF 314 sends an MB Session Modification Notification message 572 to the AF 322. The message 572 can include information received from the SMF. If the SMF provides Internal-Group ID or IMSI-Group ID, and the AF 322 may not understand these ID, the NEF 314 may replace the Internal-Group ID or IMSI-Group ID by External Group ID and sends External Group ID together with the other information to the AF. The NEF 314 may also replace the Internal-Group ID or IMSI-Group ID provided by the SMF 310 by TMGI. The NEF 314 may send the TMGI together with other information received from the SMF to the AF 322.

The AF 322 sends to the NEF 314 an MB Session Modification Acknowledgment 573.

The SMF 310 may send some of following messages 574 to the UDM 320: MB Session Modification Response message if the UDM sent the MB Session Modification Request in step 500; MB Session Modification Notification to notify the UDM about changes in the MB Session, or ED IDs (such as SUPIs, or GPSIs), that joined or left the MB Session; Subscription to Notification Services of UDM for subscription changes of newly joint ED IDs: the message may include the ED IDs (such as SUPIs, or GPSIs); Un-Subscription to Notification Services of UDM for ED IDs that left the MB Session or failed to join the MB Session: the message may include the ED IDs (such as SUPI, or GPSIs).

The SMF 310 may send some of following messages 575 to the PCF 316: MB Session Modification Response message if the PCF sent the MB Session Modification Request in step 500; MB Session Modification Notification to notify the PCF about changes in the MB Session, or ED IDs (such as SUPIs, or GPSIs) that joined or left the MB Session; Subscription to Notification Services of PCF for subscription changes of newly joint ED IDs: the message may include the ED IDs (such as SUPIs, or GPSIs); Un-Subscription to Notification Services of PCF (e.g. for PCC rule changes) for ED IDs that left the MB Session or failed to join the MB Session: the message may include the ED IDs (such as SUPIs, or GPSIs).

The SMF 310 may send some of following messages 576 to the NEF 314. If the NEF sent the MB Session Modification Request in step 500, the SMF sends an MB Session Modification Response to the NEF. The message may include UPF information (UPF Address, UP tunnel information to connect the UPF and NEF, or N6 interface information to connect the UPF with AS (e.g. UPF IP Address)). If other functions sent MB Session Modification Request in step 500, the SMF 310 may send an MB Session Modification Notification to the NEF 314 to notify the changes of MB Session. The message may include MB Session ID, ED Group Information (e.g. Internal-Group ID, TMGI), and UPF information (UPF Address, UP tunnel information to connect the UPF and NEF, or N6 interface information to connect the UPF with Application Server (AS) (e.g. UPF IP Address)) in the Data Network (DN). The AS is not shown in FIG. 6L.

The SMF 310 may send some of following messages 577 to the NMF 315. If the NMF sent the MB Session Modification Request in step 500, the SMF 310 sends an MB Session Modification Response to the NMF. The message may include the MB Session ID, ED Group ID, List of ED that successfully joint the MB Session, and/or the List of ED that failed to join the MB Session. If other functions sent MB Session Modification Request in step 500, the SMF 310 may send an MB Session Modification Notification to the NMF 315 to notify the changes of MB Session. MB Session ID, ED Group ID, List of ED that successfully joint the MB Session, and/or the List of ED that failed to join the MB Session, NF information (e.g. the Address(es) of NF(s) that serve the MB Session).

Methods of MB release will now be discussed with references to FIGS. 7 and 8. Once again FIG. 8 is divided into multiple portions (e.g., FIGS. 8A, 8B, 8C . . . 8L). Further it is once again noted that multiple possible messages are considered, although not every message will occur. For example, multiple possible triggers will be discussed, but it should be recognized that maybe only a single trigger may trigger a release at a time. Further, subsequent steps shown in the call flows may depend on which trigger occurred. Further, it is noted that the methods discussed below can be implemented both for systems which utilize an MBMS, as well as systems which do not.

It is again noted that an MB Session may be served by multiple AMF functions, multiple SMF functions, multiple NEF functions, and multiple PCF functions. Multiple UPFs may also be utilized. Further, it is noted that an MB Session can be established in many (R)AN nodes and possibly a very large number of EDs. Methods and systems are discussed herein which enable MB sessions using these large number of devices to be released while efficiently sending the signaling messages between CN functions in order reduce the signaling overhead. However, for ease of reference examples will be discussed using only single instances of these functions. Further, although common references numbers will be used to describe these functions, it is noted that in some cases, some CP functions and some UP functions may be modified in order to release an MB Session.

Figure 7:
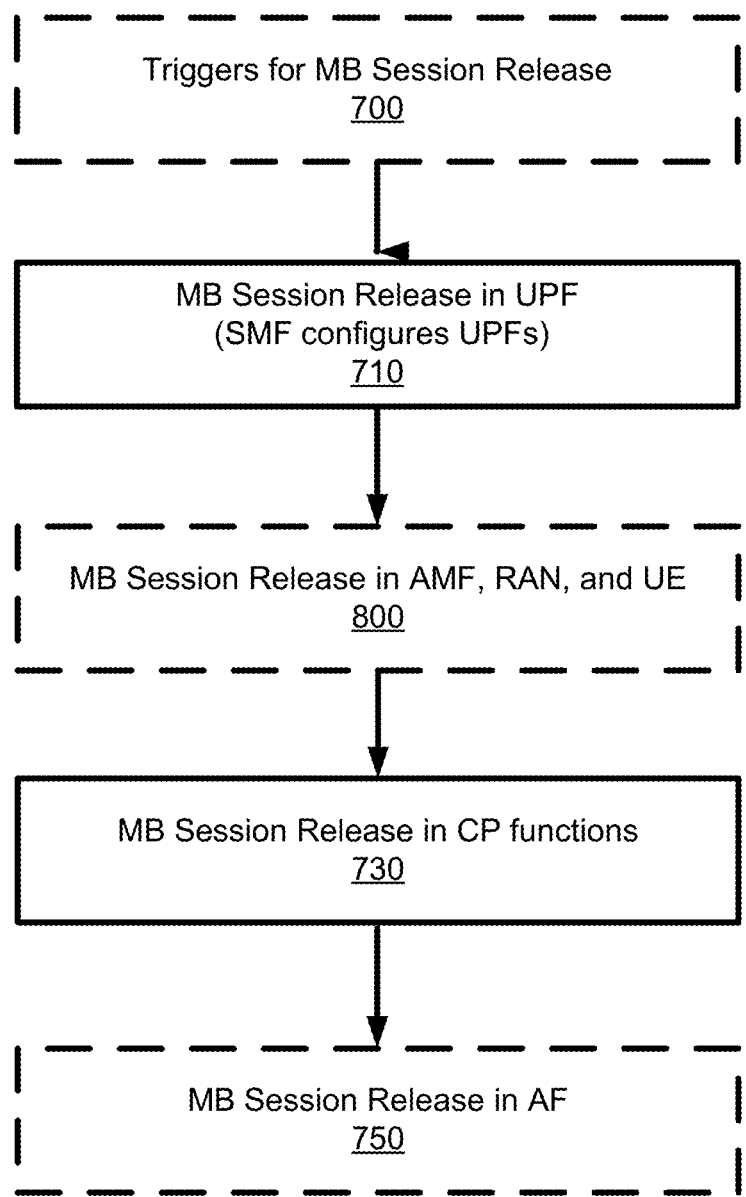
FIG. 7 is a flow chart illustrating an MB release method in accordance with an embodiment of the present invention.

FIG. 7 is a flowchart illustrating 5 main steps in an example method to release an MB Session, according to an embodiment. Step 700: Triggers for MB Session Release. Step 710: MB Session Release in UPF. Step 800: MB Session Release in AMF, RAN, and ED. Step 730: MB Session Release in CP functions (PCF, UDM, NEF) and NMF. Step 750: MB Session Release in AF.

The details of these steps, including various options, are discussed below with reference to the call flows illustrated in FIGS. 8A, 8B . . . 8L. It is noted that box 700 is illustrated in dashed lines as there can be multiple triggers, only one of which can trigger a release of the MB session. Further step 800 and FIG. 8 is illustrated in dashed lines, as there are multiple options, depending on which trigger occurred. Further step 750 is illustrated in dashed lines, as there are multiple options, depending on which trigger occurred. As can be seen in FIGS. 8B . . . 8H and Table 2, seven options are discussed below.

The table below summarizes options for step 800.

TABLE 2

Summary of Options for Step 800

| Option | How the AMF release MB Session | How the (R)AN release MB Session | How the ED release MB Session |
|---|---|---|---|
| 1 | The SMF sends multiple N1 SM MB Session Release requests, each for | The SMF sends multiple N2 SM MB Session Release requests to | The SMF sends multiple N1 SM MB Session Release |

TABLE 2-continued

Summary of Options for Step 800

| Option | How the AMF release MB Session | How the (R)AN release MB Session | How the ED release MB Session |
|---|---|---|---|
| | one ED; and multiple N2 SM MB Session Release requests, each for one (R)AN node. After all EDs and (R)AN nodes send back to the SMF N2 SM MB Session Release Response, the SMF sends N11 MB Session Release request to the AMF. | multiple (R)AN nodes. | requests to EDs. One SM message for each ED. |
| 2 | The SMF sends multiple N2 SM MB Session Release requests, each for one (R)AN node. After all (R)AN nodes send back to the SMF N2 SM MB Session Release Response, the SMF sends N11 MB Session Release request to the AMF. | The SMF sends multiple N2 SM MB Session Release requests to (R)AN nodes. The message contains MB Session IDs. | The (R)AN may send an RRC message to the EDs that join the MB Session to remove MB DRB. The EDs implicitly understand that the MB Session is released. |
| 3 | The SMF sends one N11 MB Session Release request to the AMF. The message carries MB Session ID. | From the MB Session ID, the AMF creates multiple N2 MM MB Session Release for all (R)AN nodes that join the MB Session ID. The message includes MB Session ID and maybe ED IDs. | The (R)AN may send an RRC message to the ED to remove MB Data Radio Bearer (DRB). The EDs implicitly understand that the MB Session is released. |
| 4 | The SMF sends one N11 MB Session Release request to the AMF. The message carries MB Session ID. | From the MB Session ID, the AMF creates multiple N2 MM MB Session Release for all (R)AN nodes that join the MB Session ID. The message includes MB Session ID and maybe ED IDs. The AMF may create one common N1 MM MB Session Release request per (R)AN node. | The (R)AN may forward the N1 MM MB Session Release request to EDs. |
| 5 | The SMF sends one N11 MB Session Release request to the AMF. The message carries MB Session ID. The SMF also includes one common N1 SM MB Session Release. | From the MB Session ID, the AMF creates multiple N2 MM MB Session Release for all (R)AN nodes that join the MB Session ID. The message includes MB Session ID and maybe ED IDs. | The (R)AN may forward the N1 SM MB Session Release request to EDs. |
| 6 | The SMF sends one N11 MB Session Release request to the AMF. The message carries MB Session ID. | From the MB Session ID, the AMF creates multiple N2 MM MB Session Release for all (R)AN nodes that join the MB Session ID. The message includes MB Session ID, and paging message to EDs. | The AMF may send CN paging message to all EDs in the MB Session. |
| 7 | The SMF sends one N1 Common SM MB Session Release request and one N2 Common SM MB Session Release requests to (R)AN nodes. After all EDs and/or (R)AN nodes send back to the SMF N2 SM MB Session Release Response, or a timer expires, the SMF | The SMF sends one N2 Common SM MB Session Release requests to multiple (R)AN nodes via AMF. The AMF uses its Multicast Distribution Service to send the N2 Common SM MB Session Release Request message to the (R)AN nodes. | The SMF sends one N1 Common SM MB Session Release requests to EDs. The (R)AN node distributes the N1 Common SM message to EDs that join the MB Session. |

TABLE 2-continued

Summary of Options for Step 800

| Option | How the AMF release MB Session | How the (R)AN release MB Session | How the ED release MB Session |
|---|---|---|---|
| | sends N11 MB Session Release request to the AMF. | | |

In the following, only one embodiment is presented as a general framework. But it should be understood that there are multiple embodiments for step 800 and step 750.

Figure 8A:
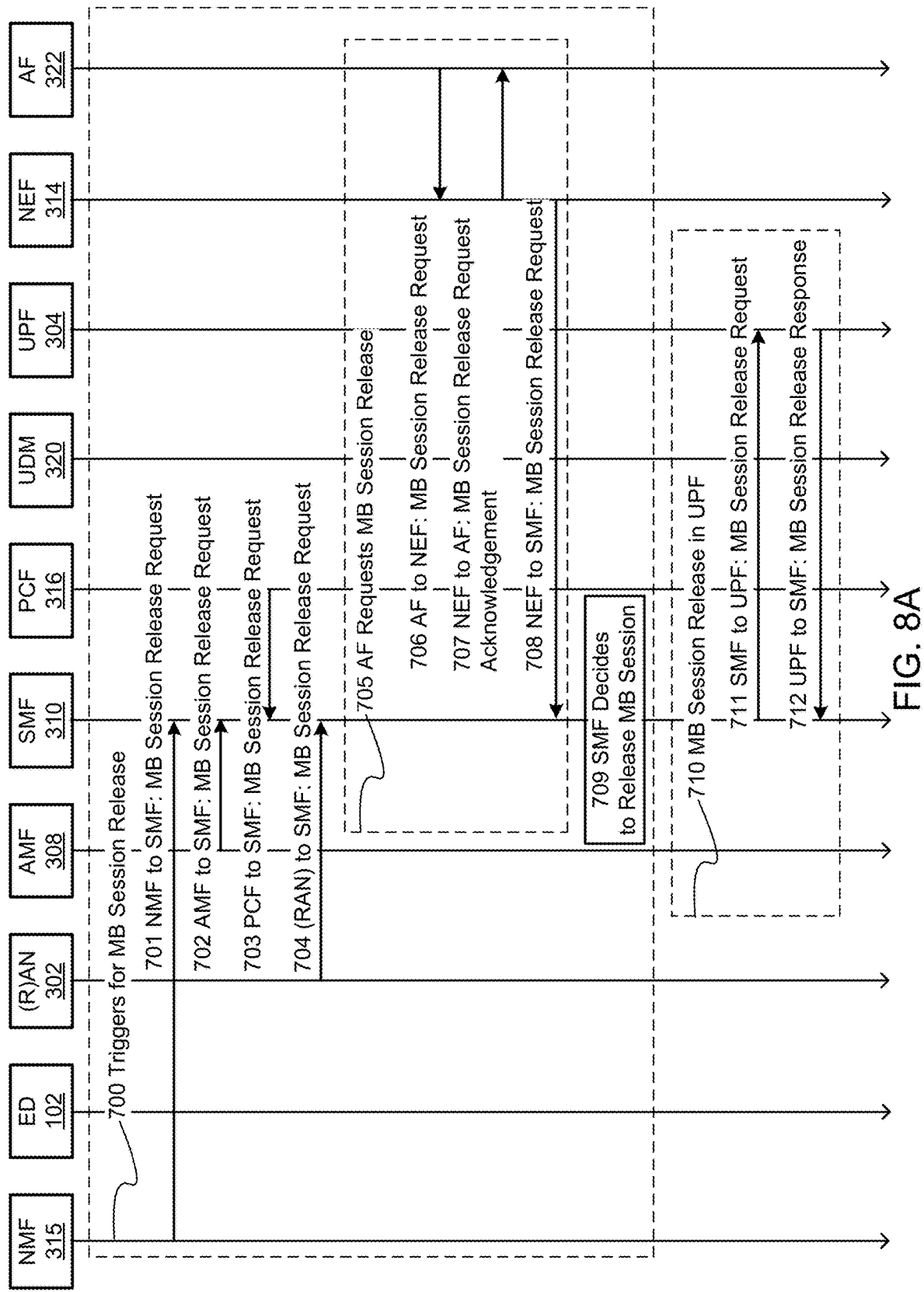
Figure 8B:
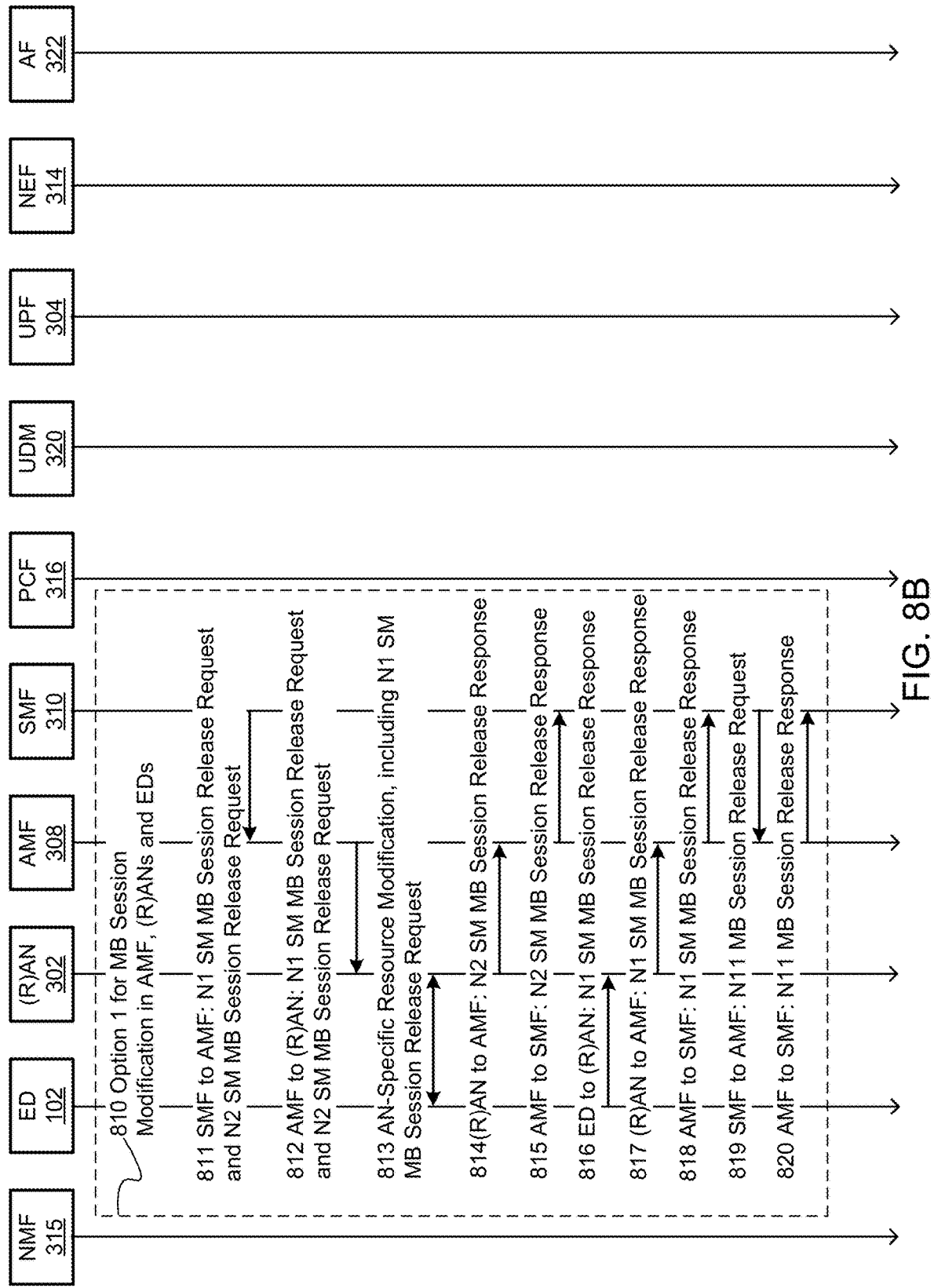

FIG. 8A illustrates call flows for steps 700 and 710. It is noted that for step 700 the call flows illustrate various possible triggers for an MB Session release. The MB Session can be released by one of the triggers 701-704, 705 and 709.

One possible trigger includes NMF 315 sending MB Session Release Request 701 to the SMF 310 to release MB session. The message 701 may include the MB Session ID, the time to release the MB Session, or the location information, to release MB Session if the MB Session is run in multiple areas (e.g. multiple Geographical Zone ID(s)), multiple UPF Service Areas, multiple service area of SMF, multiple service areas of AMF, multiple public land mobile networks (PLMN)), and Cause. The Cause indicates the reason to release the MB Session, which could be a request from Service Provider to release MB Session, end of time of MB Session, network maintenance, network function errors, migration of network functions such as SMF, AMF.

Another possible trigger includes the AMF 308 sending MB Session Release Request 702 to the SMF 310. The message 702 may contain the MB Session ID, location information (e.g. Geographical Zone ID(s)), UPF Service Areas, RAN Addresses), Time to Release MB Session, and Cause. The Cause indicates the reason to release the MB Session, for example internal errors, network function maintenance (AMF shutdown), network function migration (e.g. AMF, SMF, PCF, UDM, NEF, AF), end of MB Session Time, successful data delivery to the EDs.

Another possible trigger includes the PCF 316 sending MB Session Release Request 703 to the SMF 310. The message 703 may contain MB Session ID, location information (e.g. Geographical Zone ID(s)), UPF Service Areas, RAN Addresses (e.g. IP Address or FQDN)), Time to Release MB Session, and Cause. The Cause indicates the reason to release the MB Session, for example internal errors, network function maintenance (PCF shutdown), network function migration (e.g. AMF, SMF, PCF, UDM, NEF, AF), policy change (e.g. the MB Session QoS is no longer supported by (R)AN).

Another possible trigger includes the (R)AN(s) 302 sending MB Session Release Request 704 to the SMF 310. The message 704 may contain MB Session ID, location information (e.g. RAN Addresses (e.g. IP Address or FQDN)), MB Session Report, Time to Release MB Session, and Cause. The Cause indicates the reason to release the MB Session, for example (R)AN errors, network function maintenance (e.g. (R)AN node shutdown, (R)AN node migration), network function migration (e.g. AMF migration), policy change (e.g. the MB Session QoS is no longer supported by (R)AN), Successful delivery of data to EDs, End of MB Session duration. The MB Session Report may contain the list of ED IDs that have been received the MB data, and/or the list of ED IDs that failed to receive the MB data, or unreachable. The message 704 is first sent to the AMF 308, and then the AMF 308 forwards the message 704 to the SMF 310.

Another possible trigger includes the AF 322 sending an MB Session Release Request to the SMF 310. The message may be sent directly from AF 322 to the SMF 310, or indirectly via the NEF 314 or PCF 316. This can be done via two options. Option 1 is illustrated as step 705, in which AF 322 transmits MB Session Release Request 706 to NEF 314. The message 706 may contain MB Session ID, location information (e.g. Geographical Zone IDs, DNAI), Network Slice information (e.g. S-NSSAI), AF information (e.g. DNAI, AF-Service-Identifier), Time to release the MB Session, External Group ID or TMGI, and Cause. The Cause indicates the reason to release the MB Session, for example function migration (e.g. AF migration), Successful delivery of data to EDs, End of MB Session duration. The NEF 314 sends MB Session Release Request Acknowledgment 707 to the AF 322. The message may include MB Session ID and/or TMGI. The NEF 314 sends MB Session Release Request 708 to the SMF 310. The NEF may include MB Session ID (which may be available in the MB Session Context in the NEF), Internal-Group ID (which may be mapped from External Group ID by NEF) or TMGI, Location Information (e.g. Geographical Zone ID(s), DNAI, (R)AN Addresses (e.g. IP Address or FQDN), UPF Service Areas, Tracking Areas, Registration Areas), Network Slice information (e.g. S-NSSAI), Application information (e.g. AF-Service Identifier, DNAI), Time to Release MB Session, and Cause. The Cause may indicate the reason to release the MB Session, e.g. Successful data delivery, end of MB Session.

The NEF 314 may have local information to map the Location Information received from AF 322 to the Location Information that may be understood by the SMF or may be used by AMF 308 later.

As another option to the steps illustrated in step 705, the AF 322 can send an MB Session Release Request to PCF 316 (this option is not plotted in the call flow). This option is similar to the option that the AF 322 sends MB Session Release Request to the NEF 314, where the role of the NEF 314 is replaced by the PCF 316.

As an option to the steps illustrated in step 705, the AF 322 can send an MB Session Release Request to SMF 310 directly (this option is not plotted in the call flow). The message may include MB Session ID, External Group ID, or Internal-Group ID or TMGI, Location Information (e.g. Geographical Zone ID(s), DNAI, (R)AN Addresses (e.g. IP Address or FQDN), UPF Service Areas, Tracking Areas, Registration Areas), Network Slice information (e.g. S-NSSAI), Application information (e.g. AF-Service Identifier, DNAI), Time to Release MB Session, and Cause. The Cause may indicate the reason to release the MB Session, e.g. successful data delivery, end of MB Session.

The SMF 310 may send MB Session Release Request Acknowledgment to the AF 322. The message may include External Group ID, or Internal-Group ID or TMGI, MB Session ID.

Another possible trigger includes the SMF 310 deciding to Release MB Session 709. The reason could be the scheduled or preconfigured Time to end the MB Session, internal errors of SMF, maintenance of SMF (e.g. SMF shutdown, SMF migration), Successful data delivery confirmed by (R)AN 302, UPF 304, or NEF 314. Another reason is ED subscription change or ED Group subscription change, the UDM 320 notifies the SMF 310 about subscription changes.

Step 710 involves the MB Session Release in UPF(s) 304 as the SMF 310 configures the UPFs. The SMF 310 sends a N4 MB Session Release Request 711 to the UPF(s) over N4 interface. From the information received in step 700, the SMF 310 identifies the UPF(s) that currently serve the MB Session. The N4 MB Session Release Request 711 may include MB Session ID, ED Group ID (such as Internal-Group ID, TMGI). The UPF(s) delete MB Session Context and send an N4 MB Session Release Response 712 to the SMF. The SMF release the IP Address(es) or IP Prefix(es) that were assigned to the UPF for communicating with data network and/or application server.

Figure 8C:
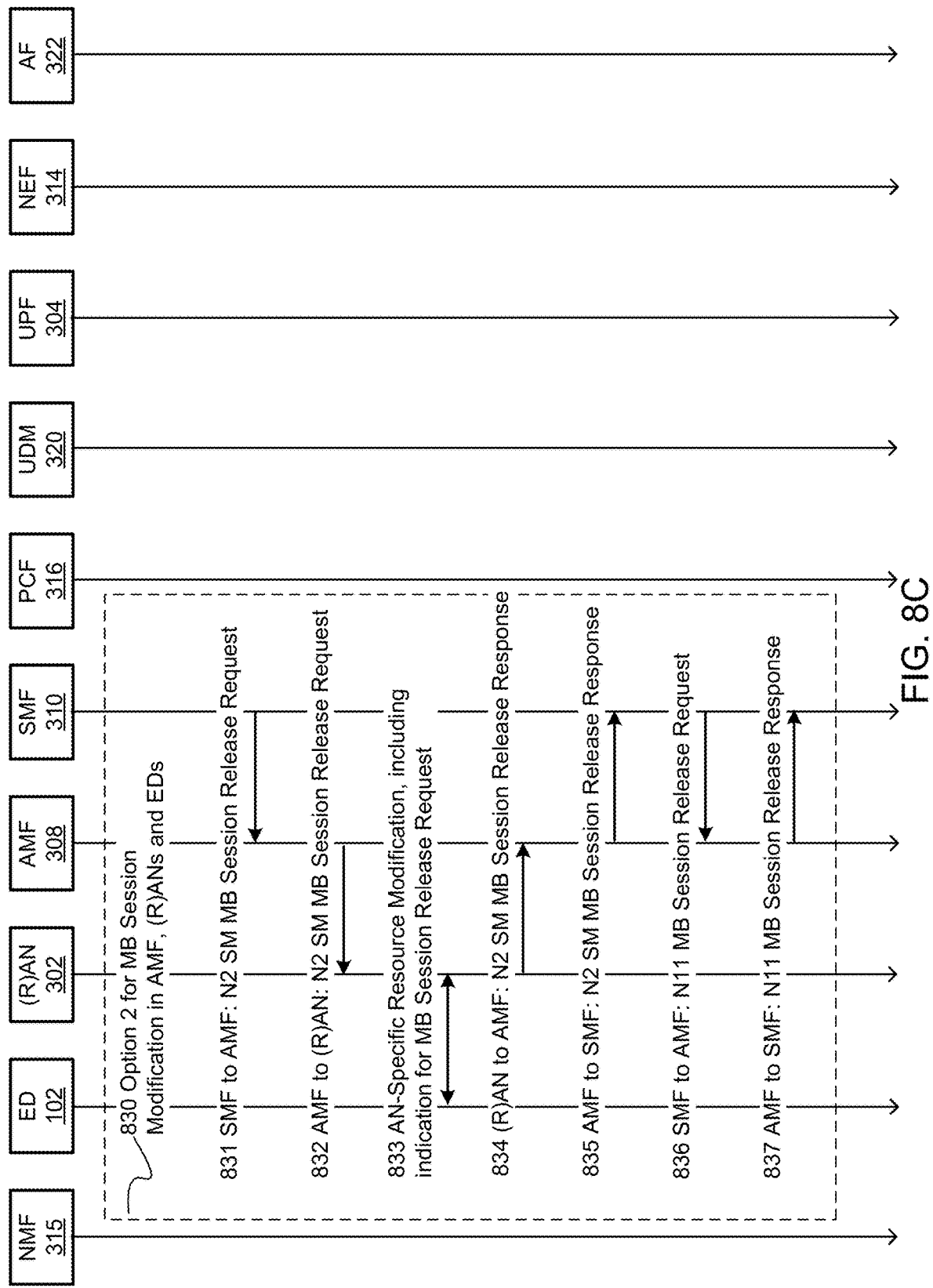
Figure 8D:
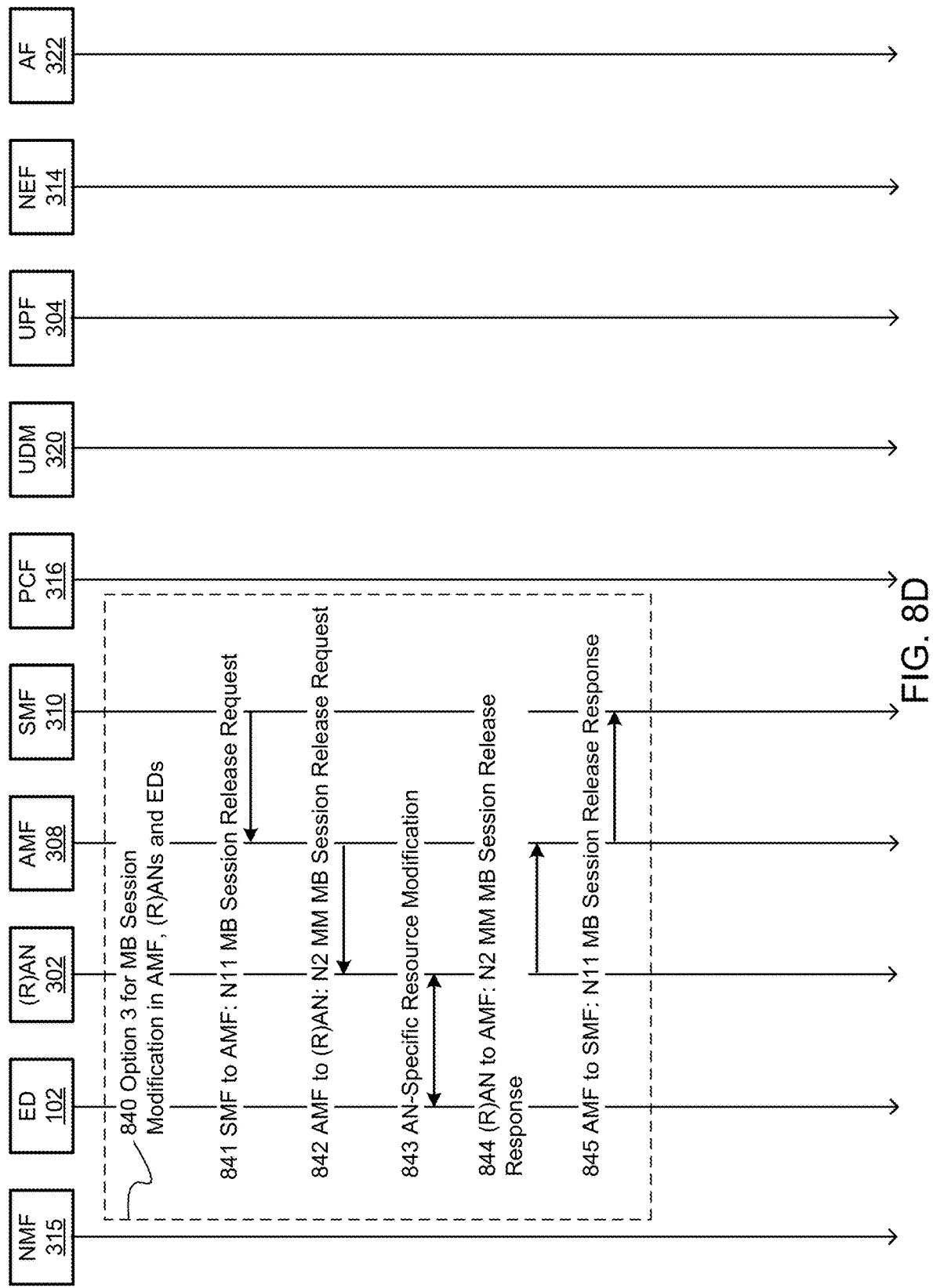
Figure 8E:
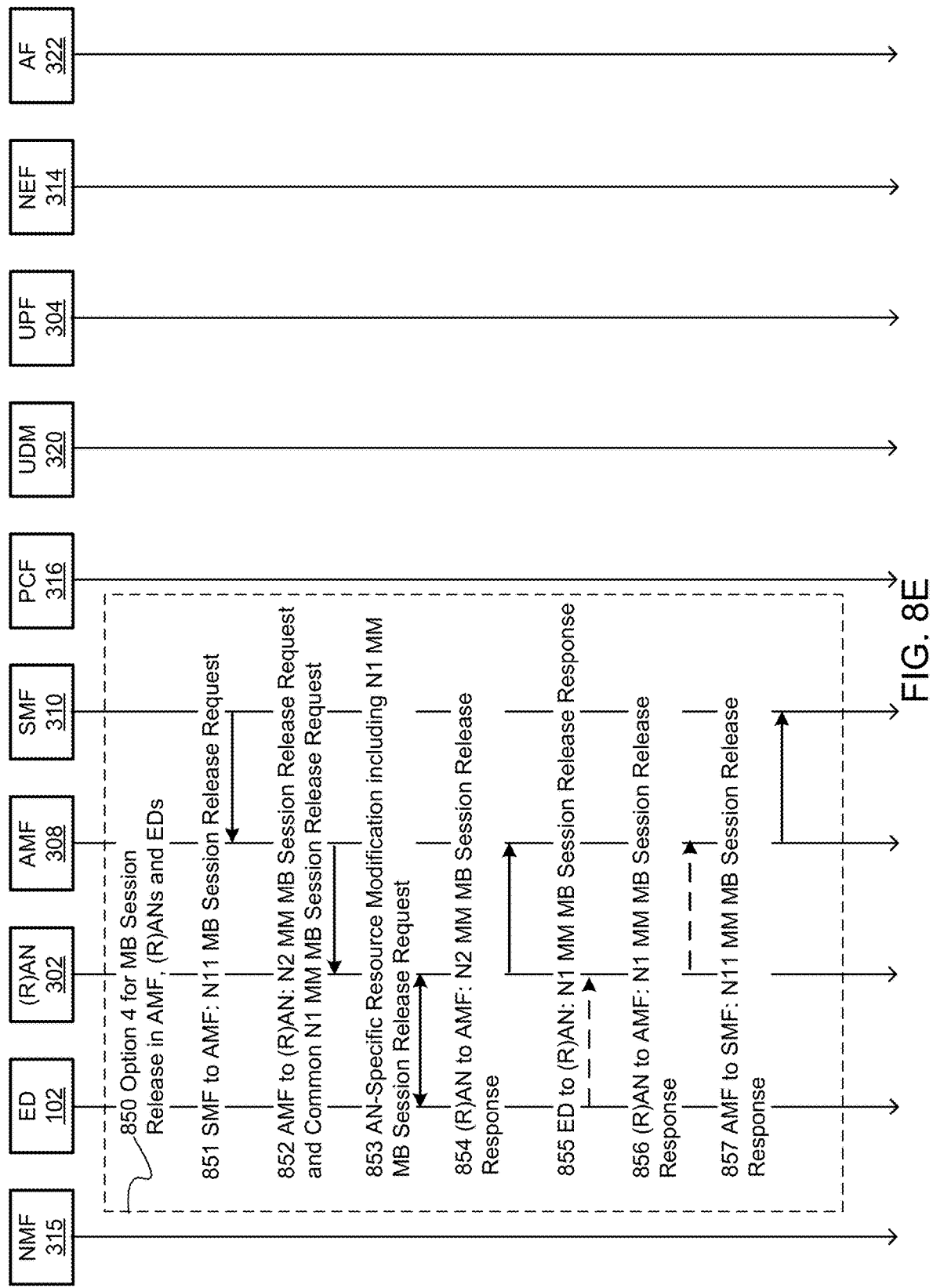
Figure 8F:
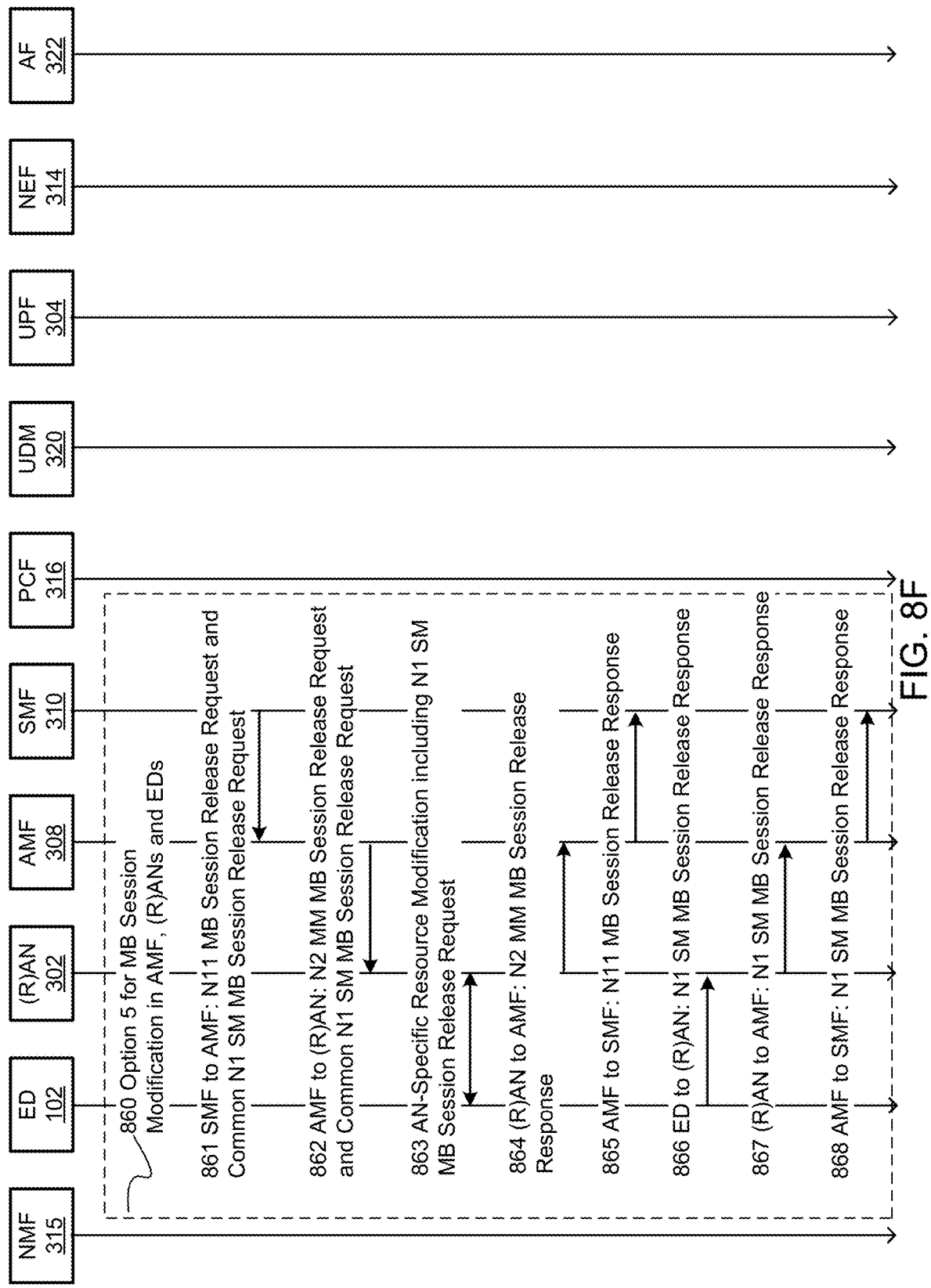
Figure 8H:
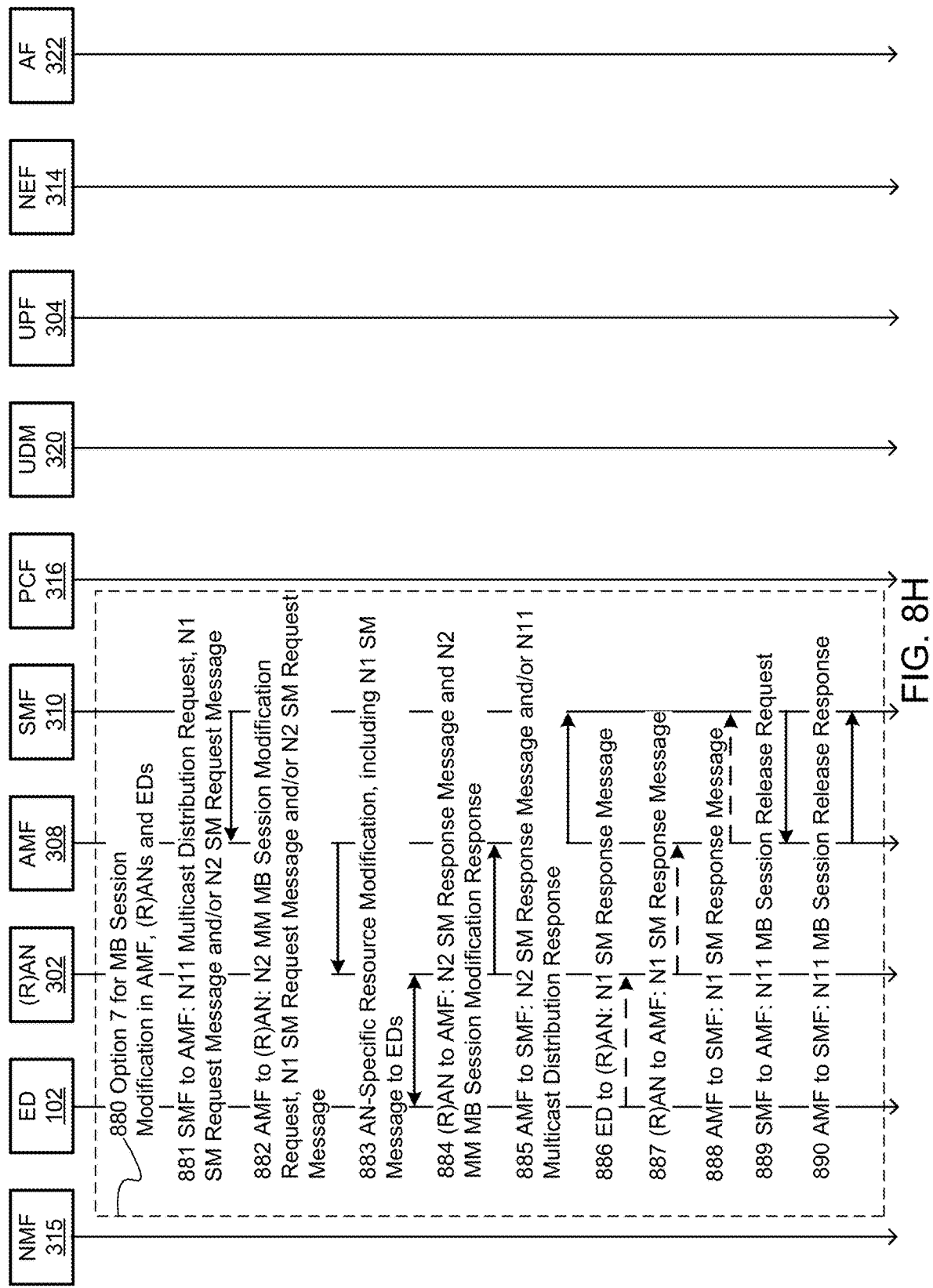

Step 800, which involves MB Session Release in AMF, RAN, and EDs will now be discussed. This general step has multiple options, depending on the situation (e.g., which trigger was received). The options 1-7 of Table 2 correspond to steps 810 as illustrated in FIG. 8B, 830 as illustrated in FIG. 8C, 840 as illustrated in FIG. 8D, 850 as illustrated in FIG. 8E, 860 as illustrated in FIG. 8F, 870 as illustrated in FIG. 8G and 880 as illustrated in FIG. 8H.

FIG. 8B illustrates call flows for Step 810 which represents option 1 of step 800, and includes the sending of messages 811-820. Option 1 is designed for MB Session that serves a small group of EDs. Accordingly, the SMF may send N1 SM to individual EDs.

From the information received in step 700, the SMF 310 identifies the EDs 102 and (R)AN nodes 302 to release the MB Session. The SMF 310 sends to AMF 308 multiple N1 SM MB Session Release Request and/or multiple N2 SM MB Session Release Request as illustrated at 811.

Each N1 SM MB Session Release Request is for one ED. The message may include MB Session ID, ED ID, and Cause. The Cause indicates reason to release the MB Session, e.g. End of MB Session, Network Maintenance.

Each N2 SM MB Session Release Request is for one (R)AN node 302. The message may include MB Session ID, ED Group ID (such as Internal-Group ID, TMGI, IMSI-Group), and Cause. The Cause indicates reason to release the MB Session, e.g. End of MB Session, Network Maintenance.

The AMF 308 forwards the messages 811 received from the SMF to (R)AN nodes 302 as messages 812.

The (R)AN node 302 performs AN-specific procedure to release the radio resources with the EDs. The (R)AN 302 sends the N1 SM MB Session Release Request 813 to each ED.

Each (R)AN node 302 sends to the AMF 308 an N2 SM MB Session Release Response 814.

The AMF 308 forwards the N2 SM MB Session Release Response 815 to the SMF 310. The message may include MB Session ID and ED ID.

Each ED 102 sends an N1 SM MB Session Release Response 816 to the SMF 310 via (R)AN 302.

The (R)AN 302 forwards the N1 SM message 816 to the AMF 308 as N1 SM message 817 via N2 interface.

The AMF 308 forwards the N1 SM message 817 to the SMF 310 in an N11 message 818.

After receiving all N1 SM MB Session Release Response from EDs 102 and N2 SM MB Session Release Response from (R)AN node(s) 302, the SMF 310 sends an N11 Session Release Request 819 to the AMF 308.

The AMF 308 deletes the MB Session Context and may send unsubscribe messages to the CP functions, e.g. UDM 320, PCF 316, NEF 314, if the AMF 308 subscribed to notification services of these functions for the notification related to the MB Session, or the notifications related to the EDs that joint the MB Session. The AMF 308 sends an N11 Session Release Response 820 to the SMF 310. The message 820 may include the MB Session ID or TMGI.

FIG. 8C illustrates call flows for Step 830 which represents option 2 of step 800, and includes the sending of messages 831-837. In Option 2, the SMF 310 sends only N2 SM message to (R)AN nodes. The SMF 310 need not send N1 SM messages to the EDs 102. This solution is suitable for broadcast scenario or multicast to a large group of EDs.

From the information received in step 700, the SMF 310 identifies the EDs 102 and (R)AN nodes 302 to release the MB Session. The SMF 310 sends to AMF 308 multiple N2 SM MB Session Release Request 831. Each N2 SM MB Session Release Request 831 is for one (R)AN node. The message may include MB Session ID, information to identify ED Group (such as Internal Group ID, TMGI, IMSI-Group), and information to identify specific EDs (e.g. list of ED IDs (SUPI, TMSI, 5G GUTI), S-NSSAI), and Cause. The Cause is used to indicate the reason to release the MB Session, for example network maintenance, network error, end of MB Session.

The AMF 308 forwards the messages received from the SMF 310 to (R)AN nodes 302 as message 832.

The (R)AN 302 node may perform AN-specific procedure, such as exchanging RRC messages 833 with the ED 102, to release the radio resources used for MB Session with the EDs. The RCC message may include the MB Session ID, TMGI, the Cause, ED IDs. The ED 102 implicitly recognizes that the MB Session is released. The ED 102 releases the MB Session context in the ED.

Each (R)AN node 302 may send to the AMF 308 an N2 SM MB Session Release Response 834 over N2 interface for the SMF 310. The message may include MB Session ID and/or TMGI.

The AMF 308 forwards the N2 SM MB Session Release Response 834 to the SMF 308 in message 835. The message 835 may include MB Session ID and/or TMGI.

After receiving all N2 SM MB Session Release Response from (R)AN node(s) 302, the SMF 310 sends an N11 Session Release Request 836 to the AMF 308. The message may include MB Session ID and/or TMGI.

The AMF 308 deletes the MB Session Context and may send unsubscribe messages to the CP functions, e.g. UDM 320, PCF 316, NEF 314, if the AMF 308 subscribed to notification services of these functions. The AMF 308 sends an N11 Session Release Response 837 to the SMF 310. The message 837 may include the MB Session ID and/or TMGI.

The SMF 310 and AMF 308 delete all the MB Session Context, include subscription for notification services. The SMF 310 sends unsubscribe messages to the CP functions, e.g. UDM 320, PCF 316, NEF 314, if the SMF 310 subscribed to notification services of these functions related to the MB Session.

FIG. 8D illustrates call flows for Step 840 which represents option 3 of step 800, and includes the sending of messages 841-845. Option 3 is designed for the SMF 310 sending only one N11 message to the AMF 308 to request MB Session Release. The signaling overhead for the control plane is thus less than if the SMF sent messages towards each RAN/ED.

From the information received in step 700, the SMF 310 identifies AMF(s) to release the MB Session. The SMF 310 sends to each AMF 308 a message, such as N11 MB Session Release Request 841, to release the MB Session. The message 841 may include MB Session ID, information to identify ED Group (such as Internal-Group ID, TMGI, IMSI-Group), and information to identify specific EDs (e.g. list of ED IDs (SUPI, TMSI, 5G GUTI), S-NSSAI), information to identify location (such as Geographical Zone IDs, (R)AN address(es)), and Cause. The Cause is used to indicate the reason to release the MB Session, for example network maintenance, network error, end of MB Session, policy change, the MB service is no longer available to the ED Group.

From the information received from SMF 310, the AMF 308 identify the (R)AN nodes 302 currently serve the MB Session. The AMF 308 creates a message, such as N2 MM MB Session Release Request 842, to send to each (R)AN node 302. The message 842 may include the MB Session ID, the information to identify ED Group (e.g. Internal-Group ID, TMGI, IMSI-Group), information to identify EDs (e.g. ED IDs (5G GUTI, SUPI, TMSI)), and Cause. The Cause is the Cause received from the SMF 310.

The (R)AN node 302 may perform AN-specific procedure, such as exchanging RRC messages 843 with the ED 102, to release the radio resources that was assigned to MB Session with the EDs 102. The RCC message may include the MB Session ID, the Cause, ED IDs. Alternatively, the (R)AN may not need to send any RRC messages to the ED if the MB Session has a configured end time in the ED. The (R)AN may simply delete its MB Session Context. The ED 102 may implicitly recognize that the MB Session is released. The ED 102 may delete the MB Session context stored in the ED 102.

Each (R)AN node 302 may send to the AMF 308 a message, such as N2 MM MB Session Release Response 844, over N2 interface to confirm the release of MB Session. The message 844 may include MB Session ID, ED Group ID (such as TMGI, Internal Group ID), RAN information (e.g. RAN Address).

After receiving all the responses from (R)AN nodes 302, the AMF 308 may send a message, such as N11 MB Session Release Response 845, to the SMF 310. The message 845 may include MB Session ID, information on ED Group (e.g. Internal-Group ID, TMGI, IMSI-Group ID).

FIG. 8E illustrates call flows for Step 850 which represents option 4 of step 800, and includes the sending of messages 851-857. Option 4 is designed for SMF 310 sending only one N11 message to the AMF 308, to release the MB Session. The AMF 308 may send N1 MM message to individual EDs 102. This saves N1 SM messages sending between AMF 308 and SMF 310.

From the information received in step 700, the SMF 310 identifies the AMF(s) to release the MB Session. The SMF 310 sends to each AMF 308 a message, such as N11 MB Session Release Request 851, to release the MB Session. The message 851 may include MB Session ID, information to identify ED Group (such as Internal-Group ID, TMGI, IMSI-Group), and information to identify specific EDs (e.g. list of ED IDs (SUPI, TMSI, 5G GUTI), S-NSSAI), information to identify location (such as Geographical Zone IDs, (R)AN address(es)), and Cause. The Cause is used to indicate the reason to release the MB Session, for example network maintenance, network error, end of MB Session, policy change, the MB service is no longer available to the ED Group.

From the information received from SMF 310, the AMF 308 identifies the (R)AN nodes 302 currently serving the MB Session. The AMF 308 creates a message, such as N2 MM MB Session Release Request 852, to send to each (R)AN node 302. The message 852 may include the MB Session ID, the information to identify ED Group (e.g. Internal-Group ID, TMGI, IMSI-Group), information to identify EDs (e.g. ED IDs (5G GUTI, SUPI, TMSI)), an Cause. The Cause is the Cause received from the SMF 310. The message may include a common N1 MM MB Session Release Request, for (R)AN to send to individual EDs. The message may include the MB Session ID, the ED ID, the Cause. The Cause is the Cause described above.

The (R)AN node 302 may perform AN-specific procedure, such as exchanging RRC messages 853 to the EDs, to release the radio resources assigned to the MB Session with the EDs. The (R)AN 302 may send the N1 MM message to the ED 102.

Each (R)AN node 302 may send to the AMF 308 a message, such as N2 MM MB Session Release Response 854, over N2 interface to confirm the release of MB Session. The message may include MB Session ID, ED Group ID (such as TMGI), RAN information (e.g. RAN Address).

Each ED 102 may send a message, such as N1 MM MB Session Release Response 855, to the AMF 308 via (R)AN 302. The message may include the MB Session ID, the ED ID, TMGI.

The (R)AN 302 forwards the N1 MM message 855 to the AMF 308 as message 856.

After receiving all the responses from (R)AN nodes 302, the AMF 308 may send a message, such as N11 MB Session Release Response 857, to the SMF 310. The message may include MB Session ID, information on ED Group (e.g. Internal-Group ID, TMGI, IMSI-Group ID). In another embodiment, the AMF 308 waits to collect responses from all EDs before sending message 857. In another embodiment, the AMF 308 may wait to collect responses from EDs and may send message 857 after a timer expires. The timer was started when the AMF 308 sent message 852.

FIG. 8F illustrates call flows for Step 860 which represents option 5 of step 800, and includes the sending of messages 861-868. In Option 5, the SMF 310 sends one N11 message to the AMF and one N1 SM message towards all EDs. Each ED can confirm MB Session release individually.

From the information received in step 700, the SMF 310 identifies the AMF(s) to release the MB Session. The SMF 310 sends to each AMF 308 a message, such as N11 MB Session Release Request 861, to release the MB Session. The message may include MB Session ID, information to identify ED Group (such as Internal-Group ID, TMGI, IMSI-Group), and information to identify specific EDs 102 (e.g. list of ED IDs (SUPI, TMSI, 5G GUTI), S-NSSAI), information to identify location (such as Geographical Zone IDs, (R)AN address(es)), and Cause. The Cause is used to indicate the reason to release the MB Session, for example network maintenance, network error, end of MB Session, policy change, the MB service is no longer available to the ED Group.

The SMF 310 may also include in the N11 message 861 a common N1 SM message, such as a common N1 SM MB Session Release Request via (R)AN 302.

From the information received from SMF 310, the AMF 308 identifies the (R)AN nodes 302 currently serving the MB Session. The AMF 308 creates a message, such as N2

MM MB Session Release Request 862, to send to each (R)AN node 302. The message may include the MB Session ID, the information to identify ED Group (e.g. Internal-Group ID, TMGI, IMSI-Group), information to identify EDs (e.g. ED IDs (5G GUTI, SUPI, TMSI)), an Cause. The Cause is the Cause received from the SMF 310.

The AMF 308 also includes in the N2 message the common N1 SM MB Session Release Request received as part of message 861 to be sent to individual EDs 102.

The (R)AN node 302 may perform AN-specific procedure, such as exchanging RRC messages 863 with the EDs 102, to release the radio resources assigned to the MB Session with the EDs 102. Based on the ED information in the N2 MM message, the (R)AN node 302 identifies to which the EDs 102 to send the N1 SM message.

Each (R)AN node 302 may send to the AMF 308 a message, such as N2 MM MB Session Release Response 864, over N2 interface to confirm the release of MB Session. The message may include MB Session ID, ED Group ID, RAN information (e.g. RAN Address).

After receiving all the responses from (R)AN nodes 302, the AMF 308 may send a message, such as N11 MB Session Release Response 865, to the SMF 310. The message 865 may include MB Session ID, information on ED Group (e.g. Internal-Group ID, TMGI, IMSI-Group ID).

Each ED 102 may send a message, such as N1 SM MB Session Release Response 866, to the SMF 310 via (R)AN 302. The message 866 may include the MB Session ID, the ED ID, TMGI.

The (R)AN 302 forwards the N1 SM message 866 to the AMF 308 as message 867.

The AMF 308 forwards the N1 SM message 867 to the SMF 310 message 868.

In another embodiment, the AMF 308 may wait to collect all the responses from EDs 102, or wait for responses from EDs 102 for a certain timer parameter, before sending message 865 to the SMF 310. The timer was started when the AMF 308 sent message 862.

FIG. 8G illustrates call flows for Step 870 which represents option 6 of step 800, and includes the sending of messages 871-877.

From the information received in step 700, the SMF 310 identifies the AMF(s) to release the MB Session. The SMF 310 sends to each AMF 308 a message, such as N11 MB Session Release Request 871, to release the MB Session. The message 871 may include MB Session ID, information to identify ED Group (such as Internal-Group ID, TMGI, IMSI-Group), and information to identify specific EDs (e.g. list of ED IDs (SUPI, TMSI, 5G GUTI), S-NSSAI), information to identify location (such as Geographical Zone IDs, (R)AN address(es)), and Cause. The Cause is used to indicate the reason to release the MB Session, for example network maintenance, network error, end of MB Session, policy change, the MB service is no longer available to the ED Group.

From the information received from SMF 310, the AMF 308 identifies the (R)AN nodes 302 currently serve the MB Session. The AMF 308 creates a message, such as N2 MM MB Session Release Request 872, for each (R)AN node. The message 872 may include the MB Session ID, the information to identify ED Group (e.g. Internal-Group ID, TMGI, IMSI-Group), information to identify EDs (e.g. ED IDs (5G GUTI, SUPI, TMSI)), an Cause. The Cause is the Cause received from the SMF 310.

The AMF 308 also includes in the N2 message a paging message, such as CN paging, to be sent to individual EDs to release MB Session. The CN Paging message may include the MB Session ID, the ED Group ID (such as TMGI, and/or Internal Group ID), or optionally ED IDs, and the Cause (as described above).

The (R)AN node 302 may send the paging messages 873 to the ED with IDs based on the ED information received from the AMF 308. After sending the paging messages, the (R)AN 302 may release the MB Context.

Each (R)AN node 302 may send to the AMF 308 a message, such as N2 MM MB Session Release Response 874, over N2 interface to confirm the release of MB Session. The message may include MB Session ID, ED Group ID (such as TMGI, and/or Internal Group ID), RAN information (e.g. RAN Address).

After receiving all the responses from (R)AN nodes 302, the AMF 308 may send a message, such as N11 MB Session Release Response 875, to the SMF 310. The message may include MB Session ID, information on ED Group (e.g. Internal-Group ID, TMGI, IMSI-Group ID).

Each ED 102 may optionally send a message, such as N1 MM paging response 876, to the AMF 308 to confirm the MB Session release.

The (R)ANs 302 may optionally forward the N1 MM messages 876 to the AMF 308 as messages 877.

FIG. 8H illustrates call flows for Step 880 which represents option 7 of step 800, and includes the sending of messages 881-890.

From the information received in step 700, the SMF 310 identifies the EDs 102 and (R)AN nodes 302 to release the MB Session. The SMF 310 may send to the AMF 308, one (common) N1 SM message (such as N1 SM MB Session Release Request) and one (common) N2 SM message (e.g. N2 SM MB Session Release Request), shown collectively at 881. The SMF 310 may send one N11 message, e.g. N11 Multicast Distribution Request, to request the AMF to send the N1 SM MB message and N2 SM MB message to multiple EDs and multiple (R)AN nodes respectively.

The N11 Multicast Distribution Request message may include the MB Session ID, the ED Group ID (such as TMGI, and/or Internal Group ID), and optionally the list of ED IDs to send the N1 SM message, the list of (R)AN Addresses to send the N2 SM message to.

The N1 SM MB Session Release Request is to be sent to all EDs that have been identified by the information in the N11 Multicast Distribution Request, or the AMF 308 may identify the ED IDs stored in the MB Session Context. The message may include MB Session ID, and/or TMGI, Cause. The Cause indicates reason to release the MB Session, e.g. End of MB Session, Network Maintenance.

The N2 SM MB Session Release Request is to be sent to all (R)AN nodes 302. The message may include MB Session ID, ED Group ID (such as Internal-Group ID, TMGI, IMSI-Group), and optionally list of ED IDs (e.g. SUPI, GPSI, TMSI).

The AMF 308 may distribute the N1 SM and/or N2 SM messages received from the SMF 310 to (R)AN nodes 302. From the information in N11 Multicast Distribution Request and the information in the MB Session Context of AMF, ED Context or ED Group Context, the AMF 308 identifies the (R)AN nodes 302 to send the N1 SM messages and N2 SM messages, shown at 882. The AMF 308 sends the N1 SM message and the N2 SM message to the identified (R)AN nodes 302. The AMF 308 may include an N2 MM Session Release Request message that includes the list of ED IDs (e.g. SUPI, IMSI, GPSI), MB Session ID, ED Group ID (such as TMGI, and/or Internal Group ID).

From the information received in the N2 Common MB SM Session Release Request and the MB Session Context of (R)AN node, the (R)AN node 302 may identify the ED IDs in case the N1 SM message is received together with the N2 SM message. The (R)AN 302 may perform AN-specific procedure 883 to release the radio resources with the EDs 102. The (R)AN 302 may send the (common) N1 SM MB Session Release Request to the EDs if the N1 SM MB Session Release Request is received.

Each (R)AN node 302 sends to the AMF 308 an N2 SM MB Session Release Response 884. The (R)AN node 302 may or may not wait for the ED Response before sending the N2 SM MB Session Release Response.

The AMF 308 forwards the N2 SM MB Session Release Response 884 to the SMF 310 as message 885. The message may include MB Session ID and the list of ED IDs. Alternatively, the AMF 308 may collect all the responses from the (R)AN nodes 302 and send only one N11 Multicast Distribution Response to the SMF 310. After receiving the N11 Multicast Distribution Response from the AMF 308, the SMF 310 may start a timer, which is used for the SMF 310 to wait for responses from the EDs 102 in case the SMF 310 has sent the N1 SM Request message in 881 and the SMF 310 expects that each ED 102 will send a response message for the N1 SM Request message.

For embodiments in which the N1 SM message (e.g. N1 SM MB Session Release Request) is sent to the ED 102, each ED 102 may send an N1 SM MB Session Release Response 886 to the SMF 310 via (R)AN 302.

The (R)AN 302 forwards the N1 SM message 886 to the AMF 308 as message 887 via N2 interface.

The AMF 308 forwards the N1 SM message 887 to the SMF 310 as message 888. Alternatively, the AMF 308 may collect all the responses from the (R)AN nodes 302 and EDs, and send only one N11 Multicast Distribution Response to the SMF 310.

The SMF 310 may send an N11 Session Release Request 889 to the AMF 308 immediately after receiving message 885, or alternatively after receiving all N2 SM MB Session Release Response from (R)AN node(s) 302, or alternatively after the timer set in step 885 expires, or alternatively after receiving all N1 SM MB Session Release Response from EDs 102 and N2 SM MB Session Release Response from (R)AN node(s) 302.

For embodiments in which the N1 SM message, (e.g. N1 SM MB Session Release Request) is sent to the ED 102, each ED may not need to send an N1 SM MB Session Release Response 886 to the SMF 310.

The AMF 308 deletes the MB Session Context and may send unsubscribe messages to the CP functions, e.g. UDM, PCF, NEF, if the AMF 308 subscribed to notification services of these functions for notifications related to the MB Session and/or the notifications related to the EDs that joint the MB Session. The AMF 308 may send an N11 Session Release Response 890 to the SMF 310. The message may include the MB Session ID.

Note that if the ED 102 sends N1 SM Response message 886 to the SMF 310, but the AMF 308 has deleted the MB Session context, the AMF 308 may not know the serving SMF 310. In this case, the AMF 308 may drop the N1 SM Response message. Similarly, if an ED 102 sends N1 SM Response message to the SMF 310, but the (R)AN 302 has deleted the MB Session Context, the (R)AN 302 may not know the AMF address that serves the MB Session or the AMF Address that the ED 102 registered. In this case the (R)AN 302 may drop the N1 SM Response message.

Figure 8I:
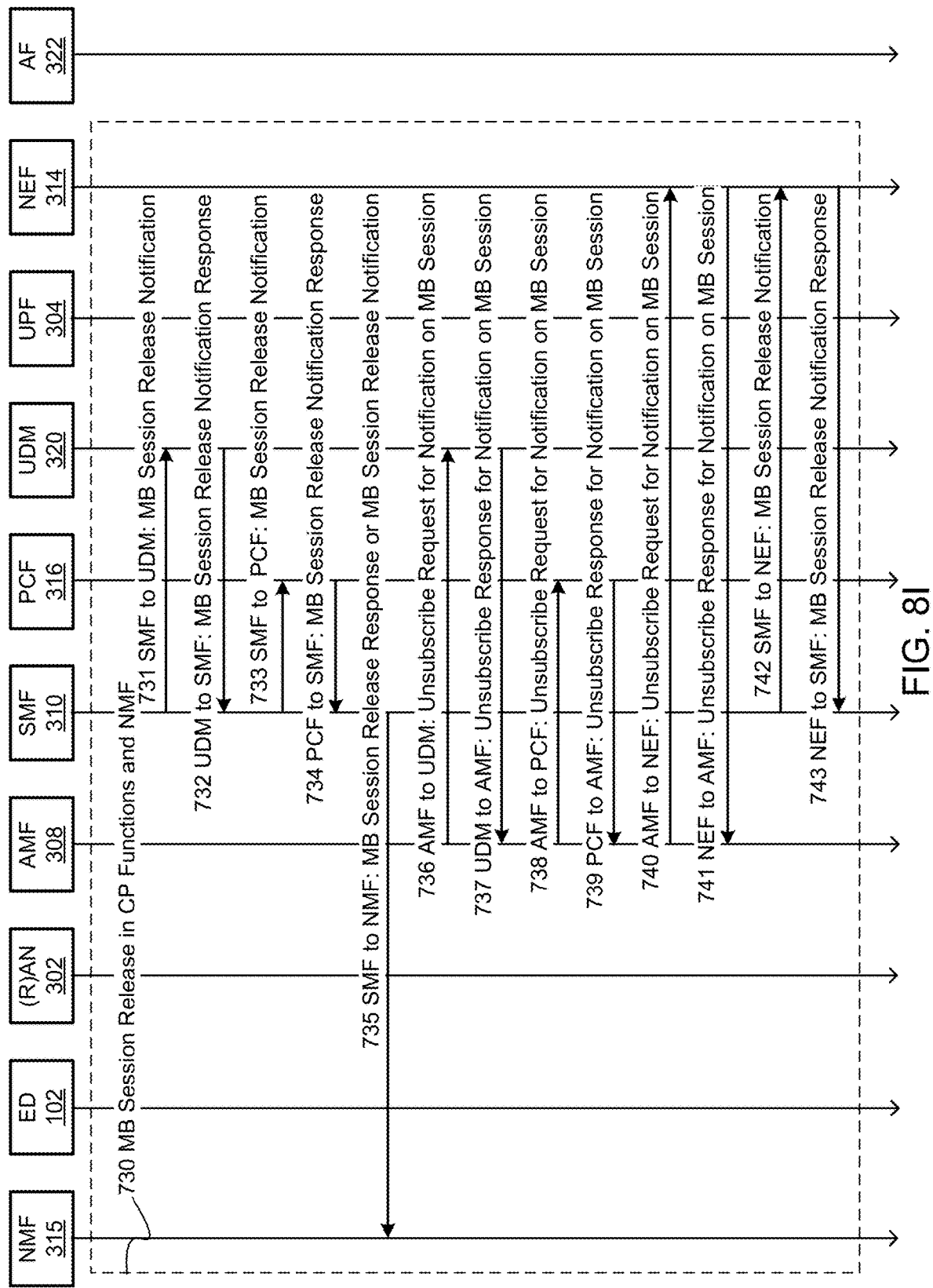

FIG. 8I illustrates call flows for Step 730 which involves MB Session Release in CP functions and the NMF 315.

The SMF 310 may send an MB Session Release Notification message 731 to UDM 320 to inform the release of MB session. The message 731 may include the ED Group ID (e.g. Internal-Group ID, TMGI, IMSI-Group ID) and/or MB Session ID. This message is also to de-register the SMF 310 as a serving SMF for the MB Session. This message is also for the SMF 310 to unsubscribe all notification services of the UDM 320 that the SMF 310 has subscribed to get notifications for the MB Session.

The UDM 320 may send an MB Session Release Notification Acknowledgment 732 to the SMF 310.

The SMF 310 may send an MB Session Release Notification 733 message to PCF 316 to inform the release of multicast session. The message may include the ED Group ID (e.g. Internal-Group ID, TMGI, IMSI-Group ID) and MB Session ID. This message is also to de-register the SMF 310 as a serving SMF for the MB Session or to release the SMF-PCF association for the MB Session. This message is also for the SMF 310 to unsubscribe all notification services of the PCF 316 that the SMF 310 has subscribed to get notifications for the MB Session and/or for the ED that joint the MB Session.

The PCF 316 then send an MB Session Release Notification Acknowledgment 734 message to the SMF 310 to confirm the release of MB-CAN connection.

The SMF 310 may send a message 735 to the NMF 315 to response for the message in step 701 or to notify the NMF 315 about the MB Session release. The message 735 may include the SMF ID, the MB Session ID, the ED Group ID (e.g. Internal-Group ID, TMGI, IMSI-Group), Cause. The Cause is to indicate the reason to release the MB Session, such as End of MB Session, network maintenance, network errors, the function that requests MB Session release (e.g. AF, AMF, SMF, (R)AN).

The NMF 315 may send an acknowledgment message to the SMF, which is not shown in FIG. 8I.

The AMF 308 may subscribe to the notification services of UDM 320, PCF 316, NEF 314 for the MB Sessions. The AMF 308 may unsubscribe these notification services if the AMF 308 has not done in step 800. Note that there may be multiple AMF functions serving the same MB Session in different geographical locations of the same PLMN.

The AMF 308 may send Unsubscribe Request 736 to the UDM 320 to stop receiving notifications related to the MB Session, including notifications related to EDs 102 and the MB Session, notifications related to (R)AN nodes 302 and the MB Session. The message may include the information that indicate the AMF ID, the MB Session ID, Information on the ED Group ID (such as Internal-Group ID, TMGI, IMSI-Group).

The UDM 320 may send a response message, such as Unsubscribe Response 737, to the AMF 308.

The AMF 308 may send Unsubscribe Request 738 to the PCF 316 to stop receiving notification related to the MB Session. The message 738 may include the information that indicate the AMF ID, the MB Session ID, Information on the ED Group ID (such as Internal-Group ID, TMGI, IMSI-Group).

The PCF 316 may send a response message, such as Unsubscribe Response 739, to the AMF 308.

The AMF 308 may send Unsubscribe Request 740 to the NEF 314 to stop receiving notification for the MB Session. The message 740 may include the information that indicate the AMF ID, the MB Session ID, Information on the ED Group ID (such as Internal-Group ID, TMGI, IMSI-Group).

The NEF 314 may send a response message, such as Unsubscribe Response 741, to the AMF 308.

The SMF 310 may send an MB session release notification 742 to the NEF 314. The NEF 314 can then send a response 743 to the SMF 310.

Figure 8J:
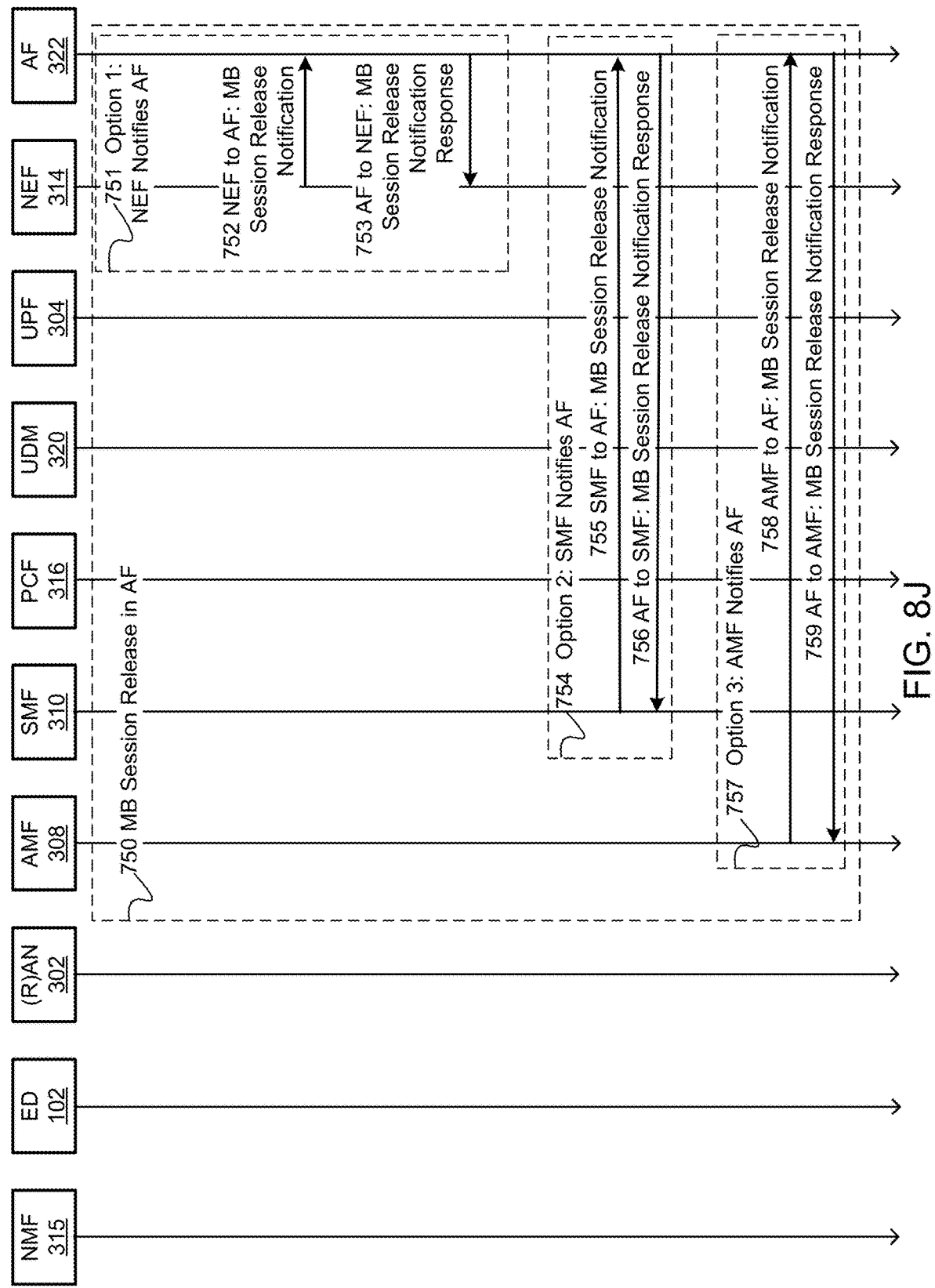
Figure 8K:
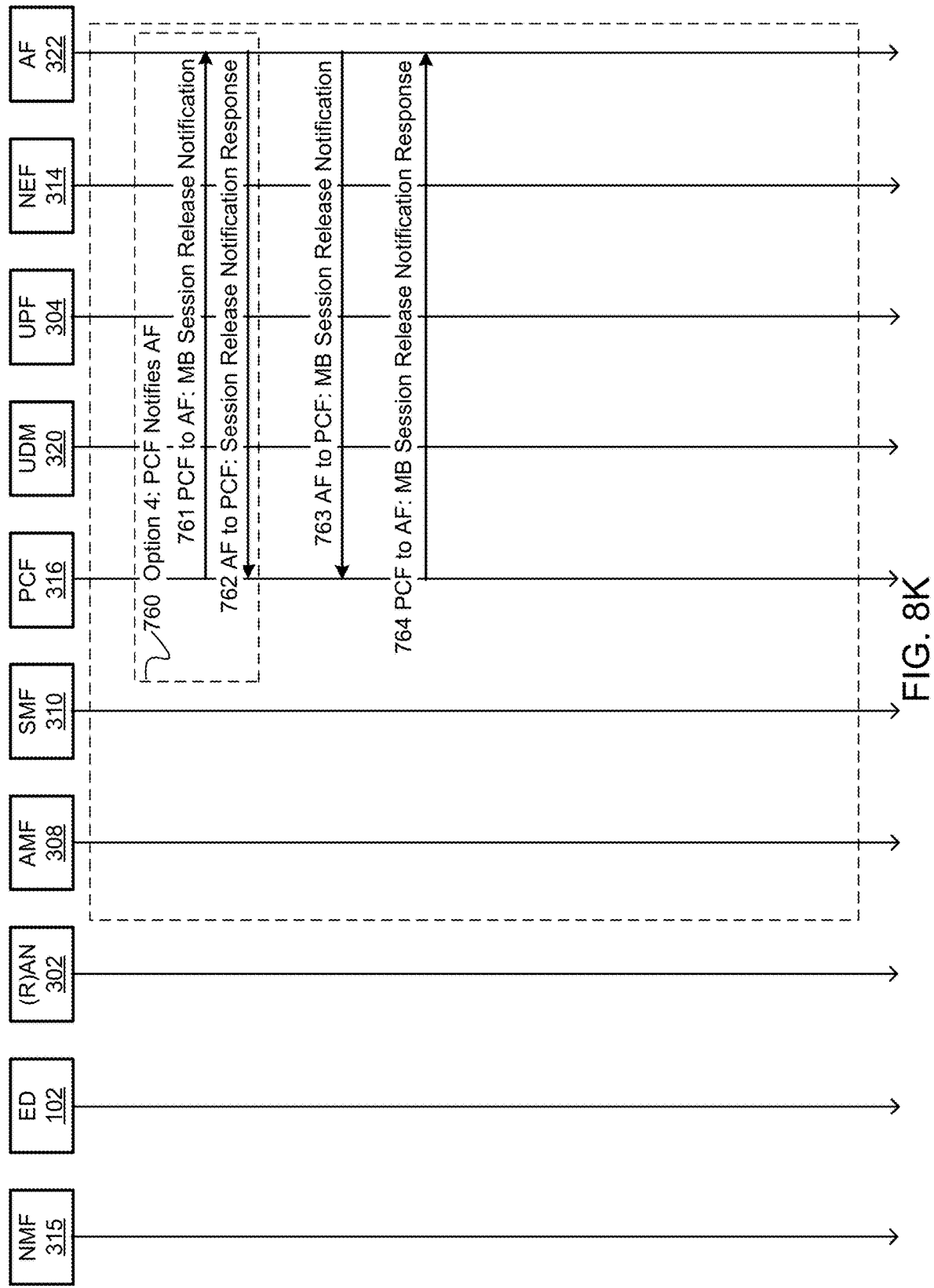

FIGS. 8J and 8K illustrate call flows for Step 750 which involves MB Session Release in the AF 322. There are some methods to notify the AF 322 that the CN functions released the MB Session. Note that there may be multiple AMF 308, or multiple SMF 310, or multiple PCF 316 involve the MB Session. The release of MB Session may happen for some geographical locations or all locations of the MB Session. Therefore, there may be some CP functions, which are serving the geographical locations but that no longer have MB Session. These CP functions release the MB Session. The remaining CP functions may continue serving remaining geographical locations. Step 750 as illustrated includes four such options, namely option 1 illustrated as step 751, option 2 illustrated as step 754, option 3 illustrated as step 757, and option 4 illustrated as step 760.

In Option 1 (step 751), the NEF 314 notifies the AF 322 about MB Session Release. The NEF 314 may send a message, such as MB Session Release Notification 752, to the AF 322 to notify the MB Session Release. The message 752 may include any combinations of the following information: CP function information (such as AMF ID (or AMF address (e.g. IP Address or FQDN)), SMF ID (or SMF address (e.g. IP Address or FQDN)), NEF ID (e.g. NEF Address (e.g. IP Address or FQDN)), PCF ID (e.g. PCF Address (e.g. IP Address or FQDN))), MB Session ID, information to identify ED Group (e.g. External-Group ID, TMGI, IMSI-Group), information to identify locations (e.g. Geographical Zone ID, (R)AN addresses (e.g. IP Address or FQDN)), and Cause. The Cause indicates reason to release the MB Session, for example network error, network maintenance, End of MB Session Time, or End of MB Data (successful MB data delivery to EDs). The AF 322 sends a message, such as MB Session Release Notification Response 753, to the NEF, confirming the reception of the message 752.

In Option 2 (step 754), the SMF 310 notifies the AF 322 about MB Session Release. The SMF 310 may send a message, such as MB Session Release Notification 755, to the AF 322 to notify the MB Session Release. The message 755 may include any combinations of the following information: CP function information (such as AMF ID (or AMF address), SMF ID (or SMF address), NEF ID (e.g. NEF Address), PCF ID (e.g. PCF Address)), MB Session ID, information to identify ED Group (e.g. External-Group ID, TMGI, IMSI-Group), information to identify locations (e.g. Geographical Zone ID, (R)AN addresses), and Cause. The Cause indicates reason to release the MB Session, for example network error, network maintenance, End of MB Session Time, or End of MB Data (successful MB data delivery to EDs). The AF 322 sends a message, such as MB Session Release Notification Response 756, to the SMF 310, confirming the reception of the message 755.

In Option 3 (step 757), the AMF 308 notifies the AF 322 about MB Session Release. The AMF 308 may send a message, such as MB Session Release Notification 758, to the AF 322 to notify the MB Session Release. The message 758 may include any combinations of the following information: CP function information (such as AMF ID (or AMF address), SMF ID (or SMF address), NEF ID (e.g. NEF Address), PCF ID (e.g. PCF Address)), MB Session ID, information to identify ED Group (e.g. External-Group ID, TMGI, IMSI-Group), information to identify locations (e.g. Geographical Zone ID, (R)AN addresses), and Cause. The Cause indicates reason to release the MB Session, for example network error, network maintenance, End of MB Session Time, or End of MB Data (successful MB data delivery to EDs). The AF may send a message, such as MB Session Release Notification Response 759, to the AMF 308, confirming the reception of the message 758.

In Option 4 (step 760), the PCF 316 notifies the AF 322 about MB Session Release. The PCF 316 may send a message, such as MB Session Release Notification 761, to the AF 322 to notify the MB Session Release. The message 761 may include any combinations of the following information: CP function information (such as AMF ID (or AMF address), SMF ID (or SMF address), NEF ID (e.g. NEF Address), PCF ID (e.g. PCF Address)), MB Session ID, information to identify ED Group (e.g. External-Group ID, TMGI, IMSI-Group), information to identify locations (e.g. Geographical Zone ID, (R)AN addresses), and Cause. The Cause indicates reason to release the MB Session, for example network error, network maintenance, End of MB Session Time, or End of MB Data (successful MB data delivery to EDs). The AF 322 sends a message, such as MB Session Release Notification Response 762, to the PCF 316, confirming the reception of the message 761.

As a further option illustrated in FIG. 8K, The AF 322 may notify the PCF about MB Session Release if Option 4 (step 760) is not implemented. In which case, the AF 322 may send a message, such as MB Session Release Notification 763, to the PCF 316 to notify the PCF 316 about MB Session release. The message 763 may include any combinations of the following information: the information of ED Group (e.g. External Group ID, TMGI, IMSI-Group), information of the AF 322 (e.g. AF ID, AF Address, AF-Service-Identifier), location information (e.g. Geographical Zone IDs). The message may be used for the AF to unsubscribe some or all the notification services related to the ED Group ID, the Application, the location information. The PCF 316 may send to the AF 322 a response message, such as MB Session Release Notification response 764, to confirm the receipt of message 763.

In step 750, the AMF 308, SMF 310, and PCF 316 may communicate with the AF 322 directly. The AMF 308, SMF 310 and PCF 316 can do so by sending a group identifier recognized by the AF 322.

Alternatively, not shown, the AMF 308, PCF 316 and SMF 310 may communicate with the AF 322 via NEF 314. The AMF 308, SMF 310 and PCF 316 may include in the message an internal ED group identifier (such as Internal-Group ID). The AF 322 may receive the message, insert an ED group identifier (e.g. External Group ID) that is known by the AF 322. Then the NEF 314 sends the message to the AF 322.

After releasing MB Session, all the network functions such as (R)AN 302, UPF 304, SMF 310, delete their MB Session Context. Some other functions, such as AMF 308, UDM 320, PCF 316, NEF 314, AF 322 may delete the MB Session information related to the released functions. If the MB Session is completely released, all network functions may delete all MB Session Context information.

The preceding procedures are implemented using messages exchanged among network functions over the point-to-point interfaces. These procedures can be implemented in 5G system using the current or newly designed service-based interface messages, in which the network functions provide services for other functions. The address of a network function can be represented by e.g. IP Address or FQDN. Each request message sent from the AF 322 to CN functions may include an identifier, such as transaction ID, so that the CN functions may use the transaction ID when communicating with the AF 322 later.

In some embodiments, the above described methods can be used for other purposes, for example to release PDU Sessions of multiple EDs. For example, the SMF 310 may send an N11 message to the AMF 308 indicating release of all PDU sessions of a network slice instance. The AMF 308 may send a paging message to the EDs to release the PDU Session (e.g. IoT PDU Sessions) of all EDs. Another example is that the SMF 310 may send one N11 message to the AMF 308 indicating the modification of certain QoS parameters of all PDU sessions of a ED group. The AMF 308 may forward this message to the (R)AN 302 that serve EDs of ED group; and the (R)AN 302 will modify the PDU session of all the EDs in the ED group.

Based on the foregoing description, it will be seen that embodiments of the present invention may provide any one or more of methods to modify or release MB Session, that has been established, to deliver packets and data file between an Application Server and a defined group of one or more EDs, or any EDs in a defined geographical location. Embodiments of the present invention may further provide for functionalities of UPF to support the modification or release of an MB Session.

Embodiments of the present invention may further provide for functionalities of SMF to support the modification or release of an MB Session which may, for example, include: Handle the request from NMF and NEF to establish/modify/release an MB Session; Messaging to send MB session information from SMF to ED; Selection of AMF for establishing connection to the (R)AN nodes, and messaging to AMF to modify or release an MB session. Further functionalities of SMF may include Select and configure UPF(s) to serve modified MB Session using NEF Address Information. If a (R)AN node can be connected to multiple UPFs, the SMF selects and configures or releases a UPF, and its connections to the (R)AN node for a modified MB Session. Further functionalities of SMF may include Establish and modify in response to a modification request, a control channel, N2-AP between AMF and (R)AN node for sending MB Session control message between the (R)AN and the AMF and SMF. The N2-AP control channel could be represented by a ED Group ID (such as Internal-Group ID, IMSI Group, TMGI). Further functionalities of SMF may include modify mapping of Geographical Zone ID and (R)AN Address (such as IP Address); Receive one or more triggers to modify or release an MB Session in multiple (R)AN nodes, and generate multiple control message to send to multiple (R)AN nodes, e.g. to modify and/or MB Session Context in multiple (R)AN nodes.

Embodiments of the present invention may further provide for functionalities of AMF, which may, for example, include: Establish a control channel between (R)AN and AMF to send to and receive control messages from the (R)AN for MB Session; Receive request from SMF to send one session management message to multiple (R)AN nodes; Send one session management message to multiple (R)AN nodes by using multicast transmission over control channels to (R)AN nodes; Receive request from SMF to send one session management message to multiple EDs; Send one session management message to multiple EDs nodes by using multicast transmission over control channels to (R)AN nodes; Send one session management message to multiple EDs nodes by using paging method to send control message on paging channels of radio nodes.

Embodiments of the present invention may further provide for functionalities of PCF, which may, for example, include: Provide policy updates related to MB Session and EDs that join the MB Session for CP functions, such as AMF and SMF; Provide trigger to release the MB Session.

Embodiments of the present invention may further provide for functionalities of UDR, which may, for example, include: Store ED Group information, including MB data session; Create MB Session Context and store it in a storage medium accessible by the PCF. This MB Session Context may contain some or all the information related MB Session known by the PCF.

Embodiments of the present invention may further provide for functionalities of UDM, which may, for example, include: Store ED Group information, including MB data session; Store mapping of Geographical Zone ID and (R)AN Address (such as IP Address); Generate ED Group ID, for example Internal-Group ID or TMGI, for MB Session.

Embodiments of the present invention may further provide for functionalities of NRF, which may, for example, include: Provide AMF selection service using ED Group information (ED Group ID, ED ID (e.g. SUPI)), Geographical Zone ID, Location information (e.g. (R)AN Address), DNAI, application information (e.g. AF-Service-Identifier), Network Slice Information (e.g. S-NSSAI), NEF information; Allow SMF selection using ED Group information (e.g. Internal-Group ID, TMGI), Geographical Zone ID, NEF ID, Location information (e.g. Geographical Zone ID, (R)AN Address), DNAI, application information (e.g. AF-Service-Identifier), Network Slice Information (e.g. S-NSSAI), NEF information.

An aspect of the disclosure provides a method of change in a multicast/broadcast (MB) session to a plurality of electronic devices (EDs) connected to a (radio) access network (R)AN node. The method includes receiving, by a session management function (SMF), a request message for change in the MB Session. The method further includes responsive to the request message, configuring, by the SMF, any needed changes in the user plane functions (UPF) associated with the MB session. The method further includes responsive to the request message, sending, by the SMF, instructions to an access and mobility management function (AMF) for any needed changes to the (R)AN nodes and EDs. The method further includes responsive to the request message, sending, by the SMF, instructions to other network functions for changes resulting from the request message. In some embodiments, the change in the MB session is a MB session modification. In some embodiments, the change in the MB session is a MB session release. In some embodiments, the receiving, by the SMF, a request message for change in the MB Session includes receiving a request message from one of: an application function (AF) via a network exposure function (NEF), an AF, a unified data management function (UDM), a policy control function (PCF), an ED via a (R)AN node and the AMF, a (R)AN node via the AMF, the AMF, a network management function (NMF), a UPF, and the SMF. In some embodiments, the method further includes responsive to the request message, sending, by the SMF, a request to a control plane function (CPF) for further information. In some embodiments, the CPF is an AMF and the further information is one or more of: (R)AN node address and list of ED identifiers that are being served by the corresponding (R)AN node. In some embodiments, the CPF is a PCF and the further information is policy and charging control rules. In some embodiments, the CPF is a unified data management function (UDM) function and the further information is one or more of: ED information and MB Session information. In some embodiments, the responsive to the request message, configuring, by the SMF, any needed changes in the UPF associated with the MB session includes sending, by the SMF, an MB session request message to an intermediate UPF (I-UPF). In some embodiments, the responsive to the request message, configuring, by the SMF, any needed changes in the UPF associated with the MB session further includes receiving, by the SMF, an MB session response message from I-UPF. In some embodiments, the method further includes sending, by the SMF, an MB session request message to the UPF. In some embodiments, the method further includes receiving, by the SMF, an MB session response message from the UPF. In some embodiments, the method further includes responsive to the request message, reading, by the SMF, the request message to add additional network functions to the MB session. In some embodiments, the additional network functions includes additional (R)AN nodes. In some embodiments, the method further includes responsive to the request message, sending, by the SMF, MB Session data to any newly added (R)AN nodes. In some embodiments, the responsive to the request message, sending, by the SMF, instructions to an access and mobility management function (AMF) for any needed changes to the (R)AN nodes and EDs, includes sending by the SMF one or more of: multiple MB session request messages, one for each ED, multiple MB session request messages, one for each new ED, multiple MB session request messages one for each (R)AN node, multiple MB session request messages, one for each new (R)AN node, a single MB session request message, a single common request message for all EDs, and a single common request message for all (R)AN nodes. In some embodiments, the method further includes receiving, by the SMF, from the AMF, one or more of: multiple response messages, one from each ED, multiple response message, one from each (R)AN node, single response message, for all (R)AN nodes, single response message, for all EDs, and single response message, for all (R)AN nodes and EDs. In some embodiments, the method further includes after receiving all the messages from the AMF, sending, by the SMF to the AMF, a single MB session request message. In some embodiments, the method further includes receiving, by the SMF, an MB session response, from the AMF. In some embodiments, the responsive to the request message, sending, by the SMF, instructions to other network functions for changes resulting from the request message, includes sending, by the SMF, MB modification notification to one of: an application function (AF) via a network exposure function (NEF), a unified data management function (UDM), a policy control function (PCF), an NEF, and a network management function (NMF). In some embodiments, the receiving, by the SMF, a request message for a change in the MB Session includes receiving a request message from one of: a network management function (NMF), an AMF, a policy control function (PCF), a (R)AN node, an application function (AF) via a network exposure function (NEF), and the SMF. In some embodiments, the responsive to the request message, configuring, by the SMF, any needed changes in the user plane functions (UPF) associated with the MB session includes sending, by the SMF, an MB session request message to a UPF. In some embodiments, the responsive to the request message, configuring, by the SMF, any needed changes in the user plane functions (UPF) associated with the MB session further includes receiving, by the SMF, an MB session response message from the UPF. In some embodiments, the responsive to the request message, sending, by the SMF, instructions to an AMF for any needed changes to the (R)AN nodes and EDs, includes sending by the SMF one or more of: multiple MB session request messages, one for each ED, multiple MB session request messages one for each (R)AN node, a single MB session request message, and a single common request message for all EDs. In some embodiments, the method further includes receiving, by the SMF, from the AMF, one or more of: multiple response messages, one from each ED, multiple response message, one from each (R)AN node, single response message, for all (R)AN nodes, single response message, for all EDs, and single response message, for all (R)AN nodes and EDs. In some embodiments, the method further includes after receiving all the messages from the AMF, sending, by the SMF to the AMF, a single MB session request message. In some embodiments, the method further includes receiving, by the SMF, an MB session response, from the AMF. In some embodiments, the responsive to the request message, sending, by the SMF, instructions to other network functions for changes resulting from the request message, includes sending by the SMF an MB release notification to one of: a unified data management function (UDM), a policy control function (PCF), a network management function (NMF), a network exposure function (NEF), and an application function (AF). In some embodiments, the method further includes receiving, by the SMF, a notification response from one of: the UDM, the PCF, the NEF, and the AF. In some embodiments, the method further includes sending by the SMF to NMF an MB session Release response.

Another aspect of the disclosure provides a method of modifying a multicast/broadcast (MB) session to a plurality of electronic devices (EDs) connected to a (radio) access network (R)AN node. The method includes receiving, from a session management function (SMF) by a policy control function (PCF), a request for policy and charging control (PCC) rules relating to the MB session. The method further includes transmitting, by the policy control function (PCF) to the SMF, the PCC rules. In some embodiments, the method further includes transmitting, by the PCF to the SMF, a MB session modification request. In some embodiments, the method further includes receiving, from the SMF by the PCF a MB session modification notification.

Another aspect of the disclosure provides a method of change in a multicast/broadcast (MB) session to a plurality of electronic devices (EDs) connected to a (radio) access network (R)AN node. The method includes receiving, from a session management function (SMF) by an access and mobility management function (AMF), a request to change the MB session. The method further includes responsive to the request, instructing, by the AMF, (R)AN nodes to change the MB session. The method further includes responsive to feedback from the (R)AN nodes, sending by the AMF to the SMF an MB session change response. In some embodiments, the change in the MB session is a MB session modification. In some embodiments, the change in the MB session is a MB session release. In some embodiments, the method further includes responsive to the request, creating, by the AMF, connections with new (R)AN nodes to be added to the MB session. In some embodiments, the method further includes responsive to the request, sending, by the AMF, to (R)AN nodes, an MB session establishment request. In some embodiments, the method further includes receiving, by the AMF, an MB session establishment response, from the (R)AN node. In some embodiments, the method further includes sending, by the AMF, to the SMF, an MB session modification response. In some embodiments, the receiving, from a SMF by an AMF, a request to change the MB session includes an N11 message being for changing an MB session associated with one of the EDs and RAN nodes. In some embodiments, the receiving, from a SMF by an AMF, a request to change the MB session can further include receiving one or more of: multiple MB session request messages, one for each ED, multiple MB session request messages, one for each new ED, multiple MB session request messages, one for each (R)AN node, multiple MB session request messages, one for each new (R)AN node. In some embodiments, the responsive to the request, instructing, by the AMF, (R)AN nodes to change the MB session includes sending, by the AMF, to (R)AN nodes, one or more of: multiple messages, each message being for changing an MB session associated with one of the EDs, and a single message, for changing an MB session associated with the EDs. In some embodiments, the responsive to the request, instructing, by the AMF, (R)AN nodes to change the MB session can further include sending, by the AMF, to (R)AN nodes, one or more of: multiple MB session request messages, one for each ED, multiple MB session request messages, one for each new ED, multiple MB session request message, one for each (R)AN node, and multiple MB session request message, one for each new (R)AN node. In some embodiments, the receiving, from a SMF by an AMF, a request to change the MB session includes receiving a single MB session request message. In some embodiments, the responsive to the request, instructing, by the AMF, (R)AN nodes to change the MB session includes creating, by the AMF, the multiple MB session request messages, one for each (R)AN node. In some embodiments, the responsive to the request, instructing, by the AMF, (R)AN nodes to change the MB session further includes sending, by the AMF, to (R)AN nodes one or more of: multiple MB session request messages, one for each (R)AN node, multiple common MB session request messages, one for each ED, and CN paging messages, one for each ED. In some embodiments, the receiving, from a SMF by an AMF, a request to change the MB session includes, receiving a single MB session request message listing a plurality of (R)AN nodes. In some embodiments, the responsive to the request, instructing, by the AMF, (R)AN nodes to change the MB session includes creating, by the AMF multiple MB session request messages, one for each (R)AN node. In some embodiments, the responsive to the request, instructing, by the AMF, (R)AN nodes to change the MB session further includes sending, by the AMF, to (R)AN nodes: multiple MB session request messages, one for each (R)AN node, and common multiple MB session request messages, one for each ED. In some embodiments, the receiving, from a SMF by an AMF, a request to change the MB session includes, receiving a single multicast distribution request and one or more of: single common MB session request for all (R)AN nodes, and single common MB session request for all EDs. In some embodiments, the responsive to the request, instructing, by the AMF, (R)AN nodes to change the MB session includes sending, by the AMF, to (R)AN nodes MM request messages, one for each (R)AN, and one or more of: multiple MB session request one for each (R)AN, and multiple MB session request, one for each ED. In some embodiments, the responsive to feedback from the (R)AN nodes, sending by the AMF to the SMF an MB session change response includes sending by the AMF one or more of: multiple MB session response messages, one from each ED, multiple MB session response message, one from each (R)AN node, single MB session response message, for all (R)AN nodes, single MB session response message, for all EDs, single MB session response message, for all (R)AN nodes and EDs, and single multicast distribution response. In some embodiments, the method further includes receiving, by the AMF, from the SMF, a MB session modification request. In some embodiments, the method further includes sending, by the AMF, to the SMF, a MB session modification response. In some embodiments, the receiving, from a SMF by an AMF, a request to change the MB session includes, receiving: multiple MB session request messages, one for each ED, and multiple MB session request messages, one for each (R)AN node. In some embodiments, the responsive to the request, instructing, by the AMF, (R)AN nodes to change the MB session includes sending, by the AMF, to (R)AN nodes: multiple MB session request messages, one for each ED, and multiple request message, one for each (R)AN node. In some embodiments, the receiving, from a SMF by an AMF, a request to change the MB session includes, receiving multiple MB session request messages, one for each (R)AN node. In some embodiments, the responsive to the request, instructing, by the AMF, (R)AN nodes to change the MB session includes sending, by the AMF, to (R)AN nodes multiple request message, one for each (R)AN node. In some embodiments, the receiving, from a SMF by an AMF, a request to change the MB session includes, receiving one or more of a single MB session request message and multiple common MB session request. In some embodiments, the responsive to the request, instructing, by the AMF, (R)AN nodes to change the MB session includes creating, by the AMF multiple MB session request messages, one for each (R)AN node. In some embodiments, the responsive to the request, instructing, by the AMF, (R)AN nodes to change the MB session further includes sending, by the AMF, to (R)AN nodes one or more of: multiple MB session request messages, one for each (R)AN node, common multiple MB session request messages, one for each ED, and CN paging messages, one for each ED. In some embodiments, the receiving, from a SMF by an AMF, a request to change the MB session includes, receiving a single MB session request message and multiple common MB session request, one for each ED. In some embodiments, the responsive to the request, instructing, by the AMF, (R)AN nodes to change the MB session includes creating, by the AMF multiple MB session request messages, one for each (R)AN node. In some embodiments, the responsive to the request, instructing, by the AMF, (R)AN nodes to change the MB session further includes sending, by the AMF, to (R)AN nodes: multiple MB session request messages, one for each (R)AN node, and common multiple MB session request messages, one for each ED. In some embodiments, receiving, from a SMF by an AMF, a request to change the MB session includes, the receiving a single multicast distribution request and one or more of: a single common MB session request for all (R)AN nodes, and a single common MB session request for all EDs. In some embodiments, the responsive to the request, instructing, by the AMF, (R)AN nodes to change the MB session includes sending, by the AMF, to (R)AN nodes: MM request messages, one for each (R)AN node, and one or more of: multiple MB session request one for each (R)AN node and multiple MB session request, one for each ED. In some embodiments, the responsive to feedback from the (R)AN nodes, sending by the AMF to the SMF an MB session change response, includes sending by the AMF one or more of: multiple MB session response messages, one from each ED, multiple MB session response message, one from each (R)AN node, single MB session response message, for all (R)AN nodes, single MB session response message, for all EDs, single MB session response message, for all (R)AN nodes and EDs, and single multicast distribution response. In some embodiments, the method further includes receiving, by the AMF, from the SMF, a MB session release request. In some embodiments, the method further includes sending, by the AMF, to the SMF, a MB session release response. In some embodiments, the method further includes sending, by the AMF to network functions, a request to unsubscribe to notification services of the network functions related to one or more of: (R)AN nodes, the EDs, and the MB Session. In some embodiments, the method further includes receiving, by the AMF, from the network functions, a response to the request to unsubscribe. In some embodiments, the network function is one of: a unified data management (UDM) function, a policy control function (PCF), and a network exposure function (NEF). In some embodiments, the method further includes sending, by the AMF to AF, a MB session release notification. In some embodiments, the method further includes receiving, by the AMF, from the AF, a MB session release response.

Another aspect of the disclosure is a method of change in a multicast/broadcast (MB) session to a plurality of electronic devices (EDs) connected to a (radio) access network (R)AN node. The method includes receiving, from an access and mobility management function (AMF) by a (R)AN node, a request to change the MB session. The method further includes responsive to the request, instructing, by the (R)AN node, EDs to change the MB session. The method further includes responsive to feedback from the EDs, sending, by the (R)AN node, to the AMF an MB session change response. In some embodiments, the method further includes responsive to the request, performing, by the (R)AN node, one of modifying the radio resources associated with the MB session and releasing the radio resources associated with the MB session. In some embodiments, the method further includes responsive to the request, performing, by the (R)AN node, an access network (AN) specific procedure with EDs. In some embodiments, the AN specific procedure is one of: modifying the radio resources and releasing the radio releases. In some embodiments, the change in the MB session is a MB session modification. In some embodiments, the change in the MB session is a MB session release. In some embodiments, the receiving, from an AMF, by a (R)AN node, a request to change the MB session includes, receiving one or more of: multiple MB session request messages, each MB session request message being for changing an MB session associated with one of the EDs, and a single MB session request message for changing an MB session associated with the (R)AN node. In some embodiments, the receiving, from an AMF, by a (R)AN node, a request to change the MB session can further include, receiving one or more of: multiple MB session request messages, one for each ED, multiple MB session request messages, one for each new ED, an MB session request message, for each new (R)AN node, multiple common MB session request messages, one for each ED, CN paging messages, one for each ED, MM request messages, for the (R)AN node. In some embodiments, responsive to the request, instructing, by the (R)AN node, EDs to change the MB session includes, sending by the (R)AN node one or more of: multiple messages, each message being for changing an MB session associated with one of the EDs, and a single message, for changing an MB session associated with the EDs. In some embodiments, responsive to the request, instructing, by the (R)AN node, EDs to change the MB session can further include, sending by the (R)AN node one or more of: multiple MB session request messages, one for each ED, multiple MB session request messages, one for each new ED, and common MB session request message, one for each ED. In some embodiments, the MB session request message is a CN paging message. In some embodiments, the instructing, by the (R)AN node, EDs to change the MB session includes, sending by the (R)AN node paging CN messages to EDs. In some embodiments, the responsive to feedback from the EDs, sending by the (R)AN node to the AMF an MB session change response includes sending by the (R)AN node one or more of: an MB session modification response indicating the MB session associated with the (R)AN node is changed, an MB session establishment response indicating the MB session associated with the (R)AN node is established, and multiple MB session responses, each MB session response indicating that the MB session associated with one of the EDs is changed. In some embodiments, receiving, from an AMF, by a (R)AN node, a request to change the MB session includes, receiving one or more of: multiple MB session request messages, one for each ED, an MB session request message, for the (R)AN node, multiple common MB session request messages, one for each ED, CN paging messages, one for each ED, and MM MB session request messages, for the (R)AN node. In some embodiments, the responsive to the request, instructing, by the (R)AN node, EDs to change the MB session includes, sending by the (R)AN node one or more of: multiple MB session request messages, one for each ED, and common MB session request messages, one for each ED. In some embodiments, the method further includes responsive to the request, deleting, by the (R)AN node, the MB session context. In some embodiments, the receiving, from an AMF, by a (R)AN node, a request to change the MB session includes, receiving a CN paging messages, one for each ED. In some embodiments, the responsive to the request, performing, by the (R)AN node, an access network (AN) specific procedure includes paging CN messages to EDs. In some embodiments, the MB session request message is an MM request message transmitted by the AMF after the AMF receives an N11 message from a SMF, the N11 message being for changing an MB session associated with one of the EDs and the RAN node. In some embodiments, responsive to feedback from the EDs, sending by the (R)AN node to the AMF an MB session change response includes sending by the (R)AN node one or more of: an MB session release response for the (R)AN node, and multiple MB session release response, one for each ED.

Another aspect of the disclosure provides for an electronic device (ED) for use in a communication network. The ED includes at least one processor. The ED further includes a non-transitory computer readable storable medium including software instructions configured to control the at least one processor to perform steps. The steps include receiving, by a session management function (SMF), a request message for a multicast/broadcast (MB) session modification. The steps further include responsive to the request message, configuring, by the SMF, any needed changes in the user plane functions associated with the MB session. The steps further include responsive to the request message, sending, by the SMF, instructions to an access and mobility management function (AMF) for any needed changes to the radio access network ((R)AN) nodes and EDs. The steps further includes responsive to the request message, sending, by the SMF, instructions to other network functions for changes resulting from the request message.

Another aspect of the disclosure provides for a (radio) access network (R)AN node for use in a communication network. The (R)AN node includes at least at least one processor. The (R)AN node further includes a non-transitory computer readable storable medium including software instructions configured to control the at least one processor to perform steps. The steps include receiving, from an access and mobility management function (AMF), a request to change a multicast/broadcast (MB) session to a plurality of electronic devices (EDs). The steps further include responsive to the request, instructing EDs to change the MB session. The steps further include responsive to feedback from the EDs, sending to the AMF an MB session change response. In some embodiments, the request to change the MB session includes at least one of: MB Session ID, information to identify ED Group, information to identify specific EDs, and Parameters to be changed and their new values.

Another aspect of the disclosure provides for an access and mobility management function (AMF). The AMF includes at least one processor. The AMF further includes a non-transitory computer readable storable medium including software instructions configured to control the at least one processor to perform steps. The steps include receiving from a session management function (SMF) a request to change a multicast/broadcast (MB) session to a plurality of electronic devices (EDs) connected to a (radio) access network (R)AN node. The steps further include responsive to the request, instructing (R)AN nodes to change the MB session. The steps further include responsive to feedback from the (R)AN nodes, sending to the SMF an MB session change response.

Another aspect of the disclosure provides for an electronic device for use in a communication network. The electronic device includes at least one processor. The electronic device further includes a non-transitory computer readable storable medium including software instructions configured to control the at least one processor to implement any of the methods and network functions described herein.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of change in a multicast/broadcast (MB) session to a plurality of electronic devices (EDs) connected to a (radio) access network (R)AN node, the method comprising:
   receiving, from an access and mobility management function (AMF) by the (R)AN node, a request to change the MB session;
   responsive to the request, instructing, by the (R)AN node, the plurality of EDs to change the MB session; and
   responsive to feedback from the plurality of EDs, sending by the (R)AN node to the AMF an MB session change response.

2. The method of claim 1 further comprising,
   responsive to the request, performing, by the (R)AN node, one of modifying radio resources associated with the MB session and releasing the radio resources associated with the MB session.

3. The method of claim 2, wherein:
   receiving, from an AMF, by the (R)AN node, a request to change the MB session comprises, receiving one or more of:
   multiple MB session request messages, each MB session request message being for changing an MB session associated with one of the plurality of EDs;
   a single MB session request message for changing an MB session associated with the (R)AN node.

4. The method of claim 3, wherein the responsive to the request, instructing, by the (R)AN node, the plurality of EDs to change the MB session comprises;
   sending by the (R)AN node one or more of:
   multiple messages, each message being for changing an MB session associated with one of the plurality of EDs; and
   a single message, for changing an MB session associated with the plurality of EDs.

5. The method of claim 3, wherein:
   the one or more of the MB session request messages are core network (CN) paging messages; and
   the instructing, by the (R)AN node, the plurality of EDs to change the MB session comprises; sending by the (R)AN node paging CN messages to the EDs.

6. The method of claim 3, wherein the responsive to feedback from the plurality of EDs, sending by the (R)AN node to the AMF an MB session change response comprises sending by the (R)AN node one or more of:
   an MB session modification response indicating that the MB session associated with the (R)AN node is changed;
   an MB session establishment response indicating that the MB session associated with the (R)AN node is established; and
   multiple MB session responses, each MB session response indicating that the MB session associated with one of the plurality of EDs has changed.

7. The method of claim 3, wherein the one or more of MB session request messages are mobility management (MM) request messages transmitted by the AMF after the AMF receives an N11 message from a session management function (SMF), the N11 message being for changing an MB session associated with one of the plurality of EDs and the (R)AN node.

8. A method of change in a multicast/broadcast (MB) session to a plurality of electronic devices (EDs) connected to a (radio) access network (R)AN node, the method comprising:
   sending, by a session management function (SMF) to an access and mobility management function (AM F), a request to change the MB session;
   responsive to the request, instructing, by the AMF, (R)AN nodes to change the MB session; and
   responsive to feedback from the (R)AN nodes, sending by the AMF to the SMF an MB session change response.

9. The method of claim 8 further comprising:
   responsive to the request, creating, by the AMF, connections with new (R)AN nodes to be added to the MB session;
   responsive to the request, sending, by the AMF, to the new (R)AN nodes, an MB session establishment request;
   receiving, by the AMF, an MB session establishment response, from the new (R)AN nodes; and
   sending, by the AMF, to the SMF, an MB session modification response.

10. The method of claim 8 wherein:
    the request to change the MB session comprises an N11 message being for changing an MB session associated with one of the plurality of EDs and the RAN nodes.

11. The method of claim 10, wherein the responsive to the request, instructing, by the AMF, (R)AN nodes to change the MB session comprises: sending, by the AMF, to the (R)AN nodes, one or more of:

multiple messages, each message being for changing an MB session associated with one of the plurality of EDs; and a single message, for changing an MB session associated with the plurality of EDs.

12. The method of claim 8 wherein:

the sending, by a SMF to an AMF, a request to change the MB session comprises: sending a single MB session request message;

the responsive to the request, instructing, by the AMF, (R)AN nodes to change the MB session comprises:

creating, by the AMF, multiple MB session request messages, one for each (R)AN node; and sending, by the AMF, to the (R)AN nodes one or more of:

the multiple MB session request messages, one for each (R)AN node;

multiple common MB session request messages, one for each ED; and core network (CN) paging messages, one for each ED.

13. The method of claim 8 wherein:

the sending, by a SMF to an AMF, a request to change the MB session comprises: sending a single MB session request message listing a plurality of (R)AN nodes;

the responsive to the request, instructing, by the AMF, (R)AN nodes to change the MB session comprises:

creating, by the AMF multiple MB session request messages, one for each (R)AN node;

sending, by the AMF, to the (R)AN nodes one or more of:

the multiple MB session request messages, one for each (R)AN node; and multiple MB session request messages, one for each ED.

14. The method of claim 8 wherein:

the sending, by an SMF to an AMF, a request to change the MB session comprises: sending a single multicast distribution request and one or more of: a single common MB session request for all the (R)AN nodes, and a single common MB session request for the plurality of EDs;

the responsive to the request, instructing, by the AMF, (R)AN nodes to change the MB session comprises:

sending, by the AMF, to the (R)AN nodes: multiple mobility management (MM) request messages, one for each (R)AN node; and one or more of: multiple MB session requests, one for each (R)AN node; and multiple MB session requests, one for each ED.

15. The method of claim 8 wherein:

the responsive to feedback from the (R)AN nodes, sending by the AMF to the SMF an MB session change response comprises: sending by the AMF one or more of:

multiple MB session response messages, one from each ED;

multiple MB session response messages, one from each (R)AN node;

a single MB session response message, for all the (R)AN nodes;

a single MB session response message, for the plurality of EDs;

a single MB session response message, for all the (R)AN nodes and the plurality of EDs; and a single multicast distribution response.

16. The method of claim 8 further comprising:

receiving, by the AMF, from the SMF, a MB session modification request; and sending, by the AMF, to the SMF, a MB session modification response.

17. The method of claim 9 wherein:

the sending, by a SMF to an AMF, a request to change the MB session comprises: sending:

multiple MB session request messages, one for each ED; and multiple MB session request messages, one for each (R)AN node;

the responsive to the request, instructing, by the AMF, (R)AN nodes to change the MB session comprises:

sending, by the AMF, to the (R)AN nodes:

multiple MB session request messages, one for each ED; and multiple request messages, one for each (R)AN node.

18. The method of claim 9 wherein the sending, by an SMF to an AMF, a request to change the MB session comprises:

sending multiple MB session request messages, one for each (R)AN node; and the responsive to the request, instructing, by the AMF, (R)AN nodes to change the MB session comprises: sending, by the AMF, to the (R)AN nodes multiple request messages, one for each (R)AN node.

19. The method of claim 9 wherein:

the sending, by an SMF to an AMF, a request to change the MB session comprises: sending one or more of a single MB session request message and multiple common MB session requests; and the responsive to the request, instructing, by the AMF, (R)AN nodes to change the MB session comprises:

creating, by the AMF, multiple MB session request messages, one for each (R)AN node; and sending, by the AMF, to the (R)AN nodes one or more of:

the multiple MB session request messages, one for each (R)AN node;

common multiple MB session request messages, one for each ED; and core network (CN) paging messages, one for each ED.

20. The method of claim 8 further comprising:

receiving, by the AMF, from the SMF, an MB session release request; and sending, by the AMF, to the SMF, an MB session release response.

21. The method of claim 8 further comprising:

sending, by the AMF to one or more network functions, a request to unsubscribe to notification services of the one or more network functions related to one or more of: the (R)AN nodes, the plurality of EDs, and the MB Session; and receiving, by the AMF, from the one or more network functions, a response to the request to unsubscribe.

22. The method of claim 21, wherein the one or more network functions comprise:

a unified data management (UDM) function;

a policy control function (PCF); and a network exposure function (NEF).

23. The method of claim 8 further comprising:

sending, by the AMF to an application function (AF), an MB session release notification; and receiving, by the AMF, from the AF, an MB session release response.

24. A (radio) access network (R)AN node for use in a communication network, the (R)AN node comprising:
- at least one processor; and
- a non-transitory computer readable storable medium including software instructions configured to control the at least one processor to perform steps of:
  - receiving, from an access and mobility management function (AMF), a request to change a multicast/broadcast (MB) session to a plurality of electronic devices (EDs);
  - responsive to the request, instructing the plurality of EDs to change the MB session; and
  - responsive to feedback from the plurality of EDs, sending to the AMF an MB session change response.

25. The (R)AN node of claim 24 wherein the request to change the MB session comprises at least one of: an MB Session identifier (ID); information to identify an ED Group; information to identify specific EDs; and parameters to be changed and their new values.

26. A system comprising a session management function (SMF) and an access and mobility management function (AMF), wherein
the AMF is configured to:
- receive, from the SMF, a request to change a multicast/broad (MB) session between a plurality of electronic devices (EDs) and at least one network function;
- responsive to the request, instruct at least one (R)AN node associated with the MB session to change the MB session; and
- responsive to feedback from the at least one (R)AN node, send to the SMF an MB session change response;

the SMF is configured to:
- send the request to the AMF; and
- receive the MB session change response from the AMF.

27. The system of claim 26, wherein the AMF is further configured to:
- responsive to the request, create connections with new (R)AN nodes to be added to the MB session;
- responsive to the request, send, to the new (R)AN nodes, an MB session establishment request;
- receive an MB session establishment response from the new (R)AN nodes; and
- send, to the SMF, an MB session modification response.

28. The system of claim 26, wherein the request to change a MB session comprises an N11 message being for changing an MB session associated with one of the plurality of EDs and the at least one (R)AN node.

29. The system of claim 28, wherein the configuration to responsive to the request, instruct at least one (R)AN node associated with the MB session to change the MB session comprises:
sending to the at least one (R)AN node, one or more of:
- multiple messages, each message being for changing an MB session associated with one of the plurality of EDs; and
- a single message, for changing an MB session associated with the plurality of EDs.

30. The system of claim 26, wherein the configuration to responsive to feedback from the at least one (R)AN node, send to the SMF an MB session change response comprises: sending one or more of:
- multiple MB session response messages, one from each ED;
- multiple MB session response messages, one from each (R)AN node;
- a single MB session response message, for the at least one (R)AN node;
- a single MB session response message, for the plurality of EDs;
- a single MB session response message, for the at least one (R)AN node and the plurality of EDs; and
- a single multicast distribution response.

31. The system of claim 27, wherein:
- the configuration to send the request to the AMF comprises: sending multiple MB session request messages, one for each (R)AN node; and
- the configuration to responsive to the request, instruct at least one (R)AN node associated with the MB session to change the MB session comprises: sending, to the at least one (R)AN node, multiple request messages, one for each (R)AN node.

* * * * *